United States Patent
Kim et al.

(10) Patent No.: US 12,532,058 B2
(45) Date of Patent: Jan. 20, 2026

(54) ELECTRONIC DEVICE HAVING FLEXIBLE DISPLAY AND IMAGE-CAPTURING METHOD ACCORDING TO CHANGES IN STATE OF SAME

(71) Applicant: Samsung Electronics Co., Ltd., Suwon-si (KR)

(72) Inventors: Youngrim Kim, Suwon-si (KR); Won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 18/322,093

(22) Filed: May 23, 2023

(65) Prior Publication Data

US 2023/0300435 A1  Sep. 21, 2023

Related U.S. Application Data

(63) Continuation of application No. PCT/KR2021/018301, filed on Dec. 3, 2021.

(30) Foreign Application Priority Data

Dec. 3, 2020  (KR) ......................... 10-2020-0167878

(51) Int. Cl.
  *H04N 23/53*  (2023.01)
  *G06F 1/16*  (2006.01)
  (Continued)

(52) U.S. Cl.
  CPC ........... *H04N 23/53* (2023.01); *G06F 1/1652* (2013.01); *H04M 1/0235* (2013.01);
  (Continued)

(58) Field of Classification Search
  CPC ........ H04N 23/50; H04N 23/51; H04N 23/54; H04N 23/57; H04N 23/53; H04N 23/531;
  (Continued)

(56) References Cited

U.S. PATENT DOCUMENTS

| | | | |
|---|---|---|---|
| 8,174,628 B2 | 5/2012 | Matsushita et al. | |
| 2013/0265221 A1* | 10/2013 | Lee | H04N 21/4222 345/156 |
| 2014/0285476 A1* | 9/2014 | Cho | H04M 1/0247 345/204 |

(Continued)

FOREIGN PATENT DOCUMENTS

| | | |
|---|---|---|
| CN | 107770440 A | 3/2018 |
| KR | 10-2015-0084484 A | 7/2015 |

(Continued)

OTHER PUBLICATIONS

International Search Report dated Mar. 4, 2022, issued in International Patent Application No. PCT/KR2021/018301.
Korean Office Action dated Jun. 19, 2025, issued in Korean Patent Application No. 10-2020-0167878.

*Primary Examiner* — Twyler L Haskins
*Assistant Examiner* — Akshay Trehan
(74) *Attorney, Agent, or Firm* — Jefferson IP Law, LLP

(57) ABSTRACT

An electronic device having a flexible display and an image-capturing method according to changes in the state of same are provided. The electronic device includes a camera, a display, and a processor. The processor captures an image on the basis of an output resolution designated in a first state of the display, displays a preview screen based on a first preview resolution according to the first state of the display, senses a state change of the display switching from the first to second state, displays a preview screen based on a second preview resolution according to the second state of the display, identifies a hidden region based on the amount of change of the display, and acquires and provide a first image based on the output resolution and a second image based on the hidden region based on changes in the state of the display while image capturing is performed.

18 Claims, 29 Drawing Sheets

(51) Int. Cl.
*H04M 1/02* (2006.01)
*H04N 5/268* (2006.01)
*H04N 23/63* (2023.01)
*H04N 23/667* (2023.01)
*H04N 23/80* (2023.01)

(52) U.S. Cl.
CPC ....... *H04M 1/0241* (2013.01); *H04M 1/0264* (2013.01); *H04M 1/0268* (2013.01); *H04N 5/268* (2013.01); *H04N 23/63* (2023.01); *H04N 23/631* (2023.01); *H04N 23/635* (2023.01); *H04N 23/667* (2023.01); *H04N 23/80* (2023.01); *G06F 1/1686* (2013.01); *H04M 2201/34* (2013.01); *H04M 2250/52* (2013.01)

(58) Field of Classification Search
CPC ......... H04N 23/63–635; H04N 23/667; H04N 23/80; H04N 23/815; H04N 5/268; H04M 1/0235; H04M 1/0241; H04M 1/0264; H04M 1/0268; H04M 2201/34; H04M 2250/52; G06F 1/1652; G06F 1/1686; G06F 1/1624
See application file for complete search history.

(56) References Cited

U.S. PATENT DOCUMENTS

| | | | |
|---|---|---|---|
| 2014/0340299 A1* | 11/2014 | Lee | G06F 3/147 |
| | | | 345/156 |
| 2016/0050408 A1* | 2/2016 | Lee | H04N 23/667 |
| | | | 348/47 |
| 2016/0057356 A1 | 2/2016 | Nagano et al. | |
| 2016/0373654 A1 | 12/2016 | Kwon et al. | |
| 2017/0094168 A1* | 3/2017 | Kang | H04N 23/667 |
| 2018/0270420 A1 | 9/2018 | Lee et al. | |
| 2018/0324356 A1* | 11/2018 | Sarraju | H04N 23/57 |
| 2019/0020823 A1 | 1/2019 | Jeon | |
| 2019/0261519 A1 | 8/2019 | Park et al. | |
| 2019/0373151 A1* | 12/2019 | Jia | H04M 1/0264 |
| 2020/0326754 A1* | 10/2020 | Kim | G09F 9/301 |

FOREIGN PATENT DOCUMENTS

| | | | | |
|---|---|---|---|---|
| KR | 10-2016-0021497 A | 2/2016 | | |
| KR | 10-2016-0092877 A | 8/2016 | | |
| KR | 10-2016-0150539 A | 12/2016 | | |
| KR | 10-2017-0062121 A | 6/2017 | | |
| KR | 20170062121 A * | 6/2017 | ............ | G06F 3/048 |
| KR | 10-2018-0106076 A | 10/2018 | | |
| KR | 10-2019-0008610 A | 1/2019 | | |
| KR | 10-2019-0101184 A | 8/2019 | | |

* cited by examiner

FIG. 5A
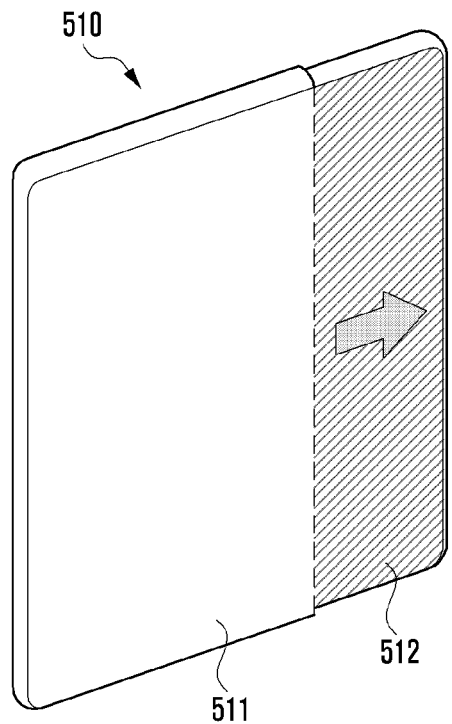
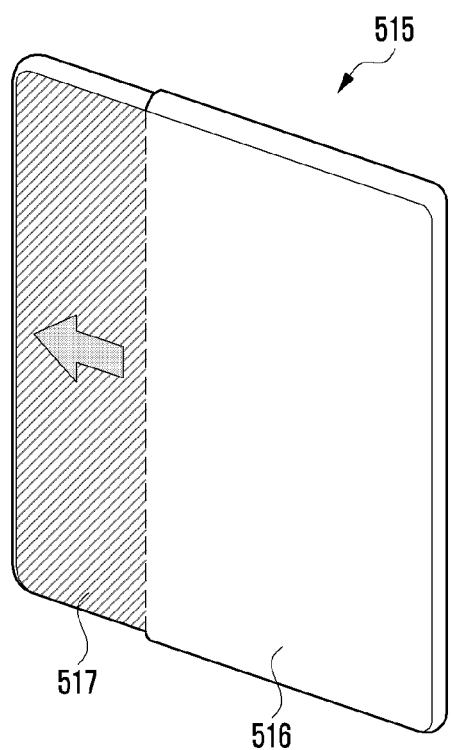

FIG. 5B
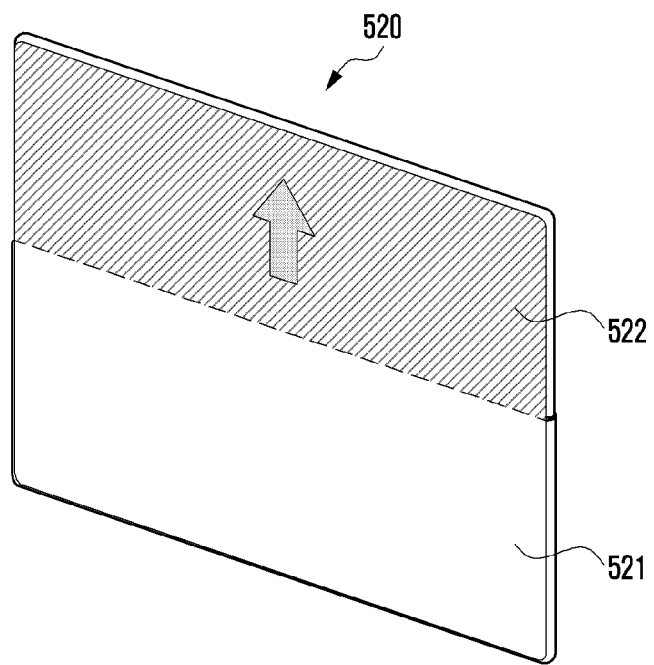
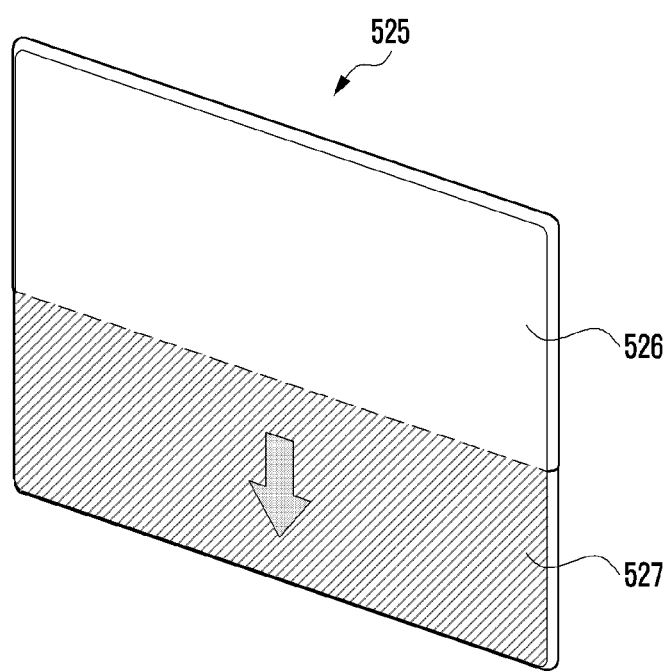

FIG. 5C
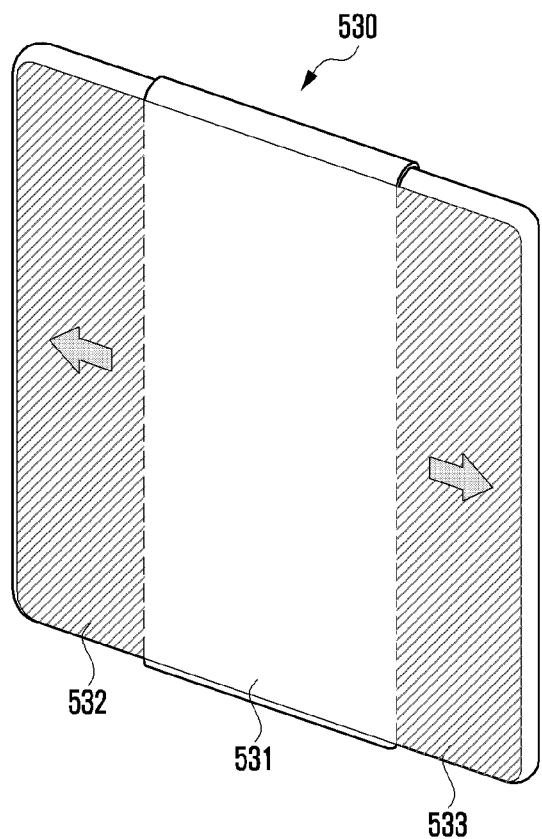
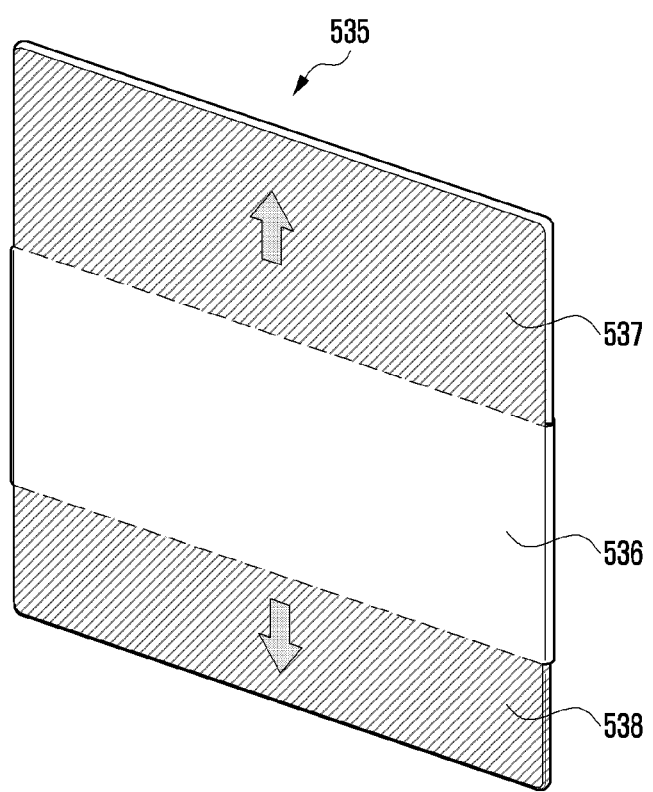

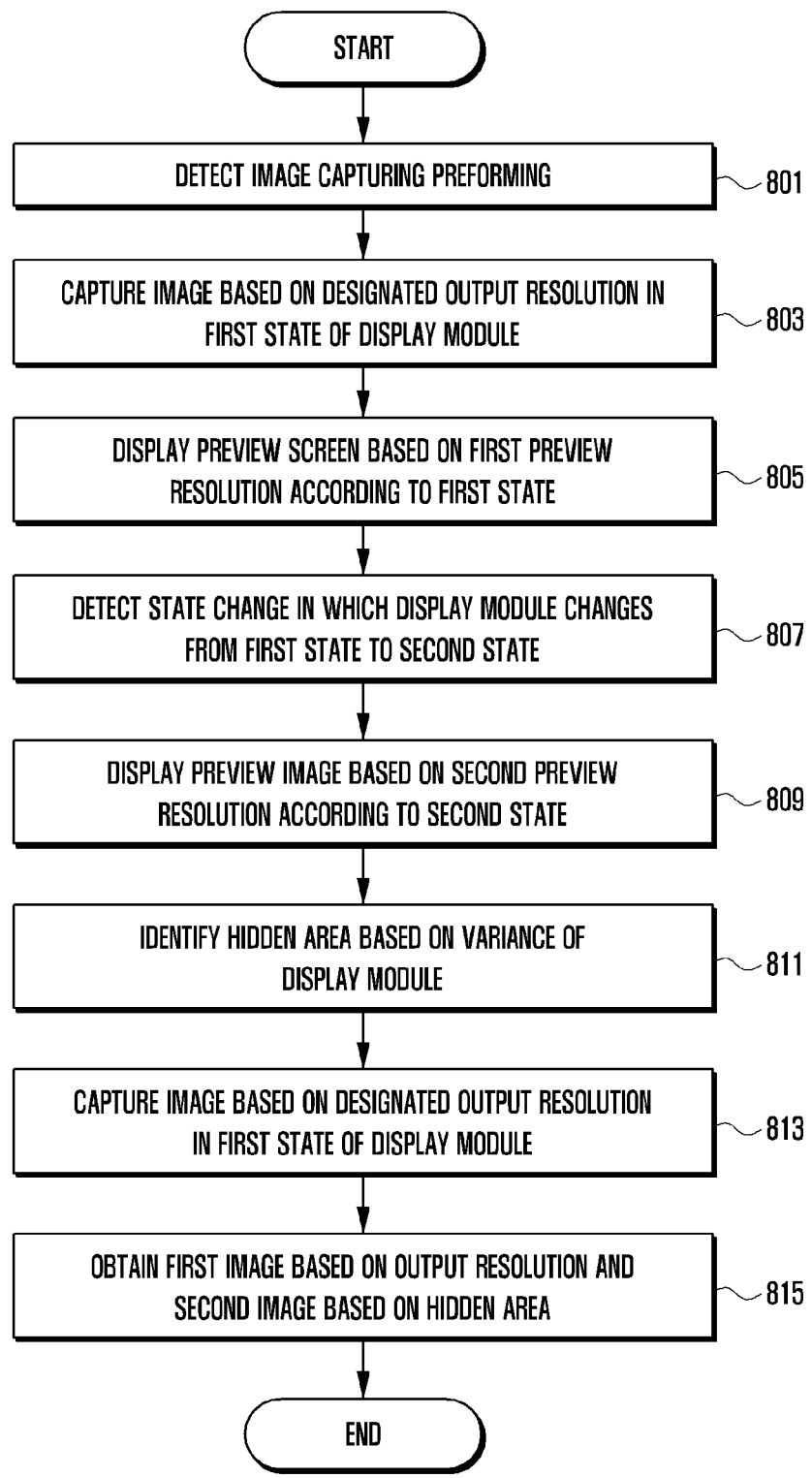

FIG. 15
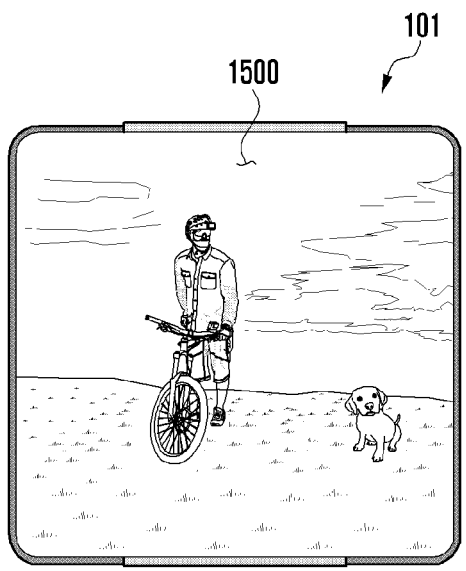
(1501)
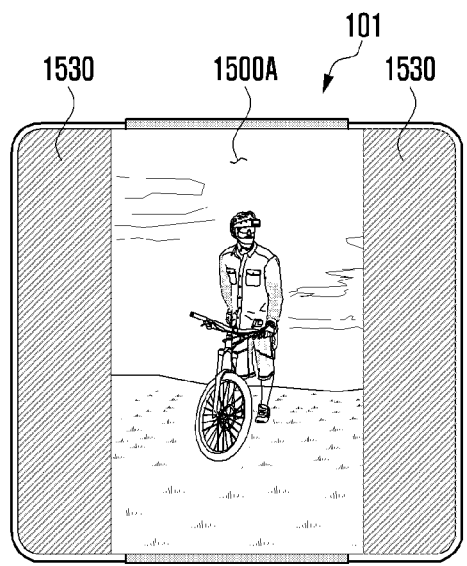
(1503)
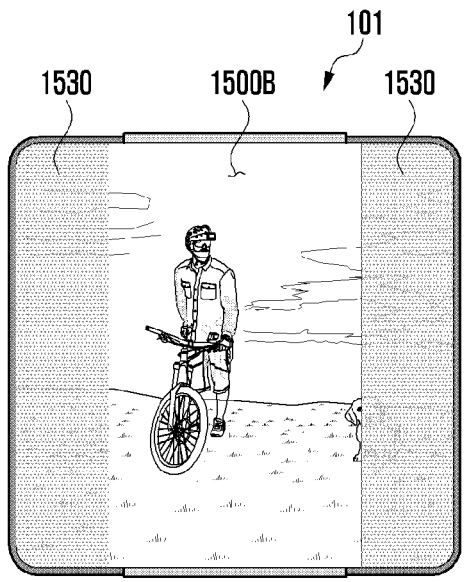
(1505)
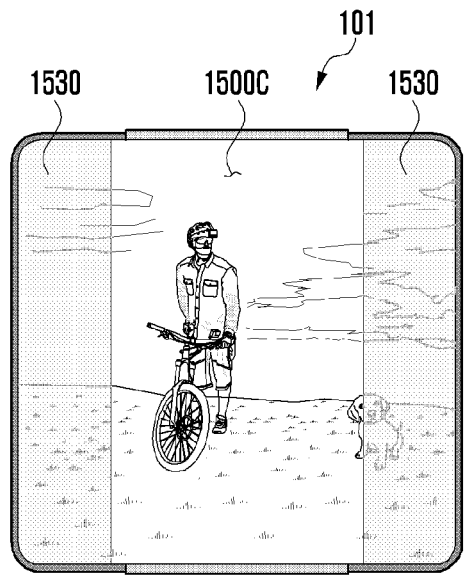
(1507)

ELECTRONIC DEVICE HAVING FLEXIBLE DISPLAY AND IMAGE-CAPTURING METHOD ACCORDING TO CHANGES IN STATE OF SAME

CROSS-REFERENCE TO RELATED APPLICATION(S)

This application is a continuation application, claiming priority under § 365(c), of an International application No. PCT/KR2021/018301, filed on Dec. 3, 2021, which is based on and claims the benefit of a Korean patent application number 10-2020-0167878, filed on Dec. 3, 2020, in the Korean Intellectual Property Office, the disclosure of each of which is incorporated by reference herein in its entirety.

BACKGROUND

1. Field

The disclosure relates to an electronic device (e.g., rollable device or slidable device) having a flexible display and a method for capturing an image according to a change in state thereof.

2. Description of Related Art

In line with development of digital technologies, various types of electronic devices such as a mobile communication terminal, a personal digital assistant (PDA), an electronic wallet, a smartphone, a tablet personal computer (PC), and/or a laptop PC have been widely used. The hardware part and/or software of such electronic devices have been continuously improved to support and enhance the functionality of the electronic devices.

An electronic device may have a limited size for portability, and the display size is accordingly limited. Therefore, various types of electronic devices have recently been developed such that the electronic devices provide more expanded screens. For example, electronic devices have been designed such that, while the display have a limited size, the screen size increases gradually, thereby providing various services (or functions) to users through large screens.

Recently, electronic devices may have a new form factor such as a rollable device and/or a slidable device. For example, an electronic device is equipped with a flexible display or a slidable display, and a part of the display may be rolled and used or unfolded and used. There has been an increasing need for development of a user interface (UI) corresponding to the new form factor of electronic devices, and operations thereof.

The above information is presented as background information only to assist with an understanding of the disclosure. No determination has been made, and no assertion is made, as to whether any of the above might be applicable as prior art with regard to the disclosure.

SUMMARY

An electronic device may be implemented such that the screen thereof can be expanded, for example, in a sliding type. For example, a part of a flexible display may be moved out of the inner space of the electronic device as if sliding or moved into the inner space of the electronic device, thereby expanding or reducing the screen. However, when capturing images by using a camera module, an electronic device may capture images with the initially configured resolution regardless of whether the screen is expanded or reduced. For example, when capturing images, an electronic device is unable to change the resolution in real time, and the resolution configure at the timepoint of initial image capture (for example, recording) may remain fixed. Therefore, while the electronic device may be expanded or reduced according to the user's intent during image capture, but images are actually captured based on the output resolution, unlike images intended by the user on the preview screen. As a result, actually captured (for example, recorded) images may be different those intended by the user on the preview screen.

Aspects of the disclosure are to address at least the above-mentioned problems and/or disadvantages and to provide at least the advantages described below. Accordingly, an aspect of the disclosure is to provide a method and a device wherein, when a display area is changed according to a change in state of a display during image capture by an electronic device including an expandable display, images can be captured and stored in response to the change in state of the display.

Another aspect of the disclosure is to provide a method and a device wherein, when a preview ratio of a display area of a display is changed by a sliding operation during image capture (for example, recording) by an electronic device including an expandable display, images can be continuously captured in response to the change in preview ratio, and original images and corrected images can be acquired when storing captured images.

Another aspect of the disclosure is to provide a method and a device wherein, the same images as intended by a user on a preview screen can be provided according to a change in state of a display during image capture by an electronic device including an expandable display.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a display, and at least one processor. The at least one processor may be configured to capture an image, based on a designated output resolution in a first state of the display, display a preview screen, based on a first preview resolution according to the first state of the display, detect a state change in which the display is switched from the first state to a second state, display a preview screen, based on a second preview resolution according to the second state of the display, identify a hidden area, based on a variance of the display, and obtain a first image based on the designated output resolution and a second image based on the hidden area, based on the state change of the display while image capturing is performed.

In accordance with another aspect of the disclosure, a method for operating an electronic device is provided. The method includes capturing an image, based on a designated output resolution in a first state of a display, displaying a preview screen, based on a first preview resolution according to the first state of the display, detecting a state change in which the display is switched from the first state to a second state, displaying a preview screen, based on a second preview resolution according to the second state of the display, identifying a hidden area, based on a variance of the display, and obtaining a first image based on the designated output resolution and a second image based on the hidden area, based on the state change of the display while image capturing is performed.

In order to solve the above problems, various embodiments of the disclosure may include a non-transitory computer-readable recording medium recording a program for causing the method to be executed by a processor.

An additional scope related to the applicability of the disclosure will become apparent from the detailed description below. However, various changes and modifications within the idea and scope of the disclosure can be clearly understood by a person skilled in the art. Therefore, it should be interpreted that a specific embodiment such as the detailed description and the preferred embodiment of the disclosure is presented only as an example.

According to an electronic device and a method for operating the same, according to an embodiment of the disclosure, when a preview ratio of a display area is changed by a sliding operation during image capture (for example, recording) by an electronic device including an expandable display, images can be captured and stored in response to the change in preview ratio. According to an embodiment of the disclosure, the same images as intended by a user on a preview screen can be provided according to a change in state of a display during image capture by an electronic device including an expandable display. According to an embodiment of the disclosure, during image capture by an electronic device including an expandable display, images corresponding to previews intended by a user may be captured according to the amount of inward/outward movement of a display and, when the corresponding images are played, continuous and natural images (for example, images with changed (corrected) size and ratio) may be provided to the user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A, 5B, 5C, 5D, 5E, 5F, and 5G are views illustrating a structure of an expandable display of an electronic device according to various embodiments of the disclosure;

FIG. 8 is a flowchart illustrating an operation method of an electronic device according to an embodiment of the disclosure;

FIG. 15 is a view illustrating an example of processing an effect on a raw image in an electronic device according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
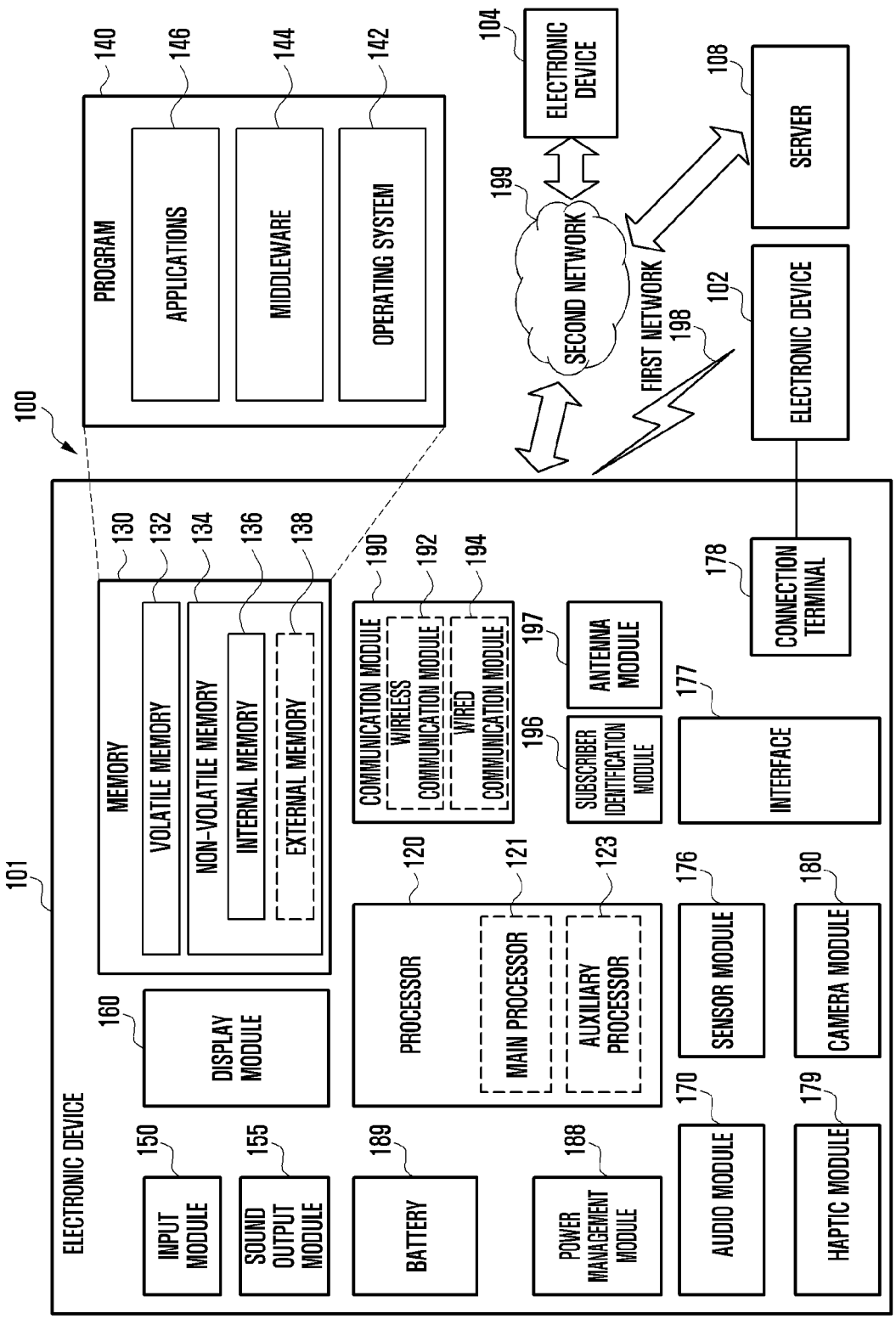
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
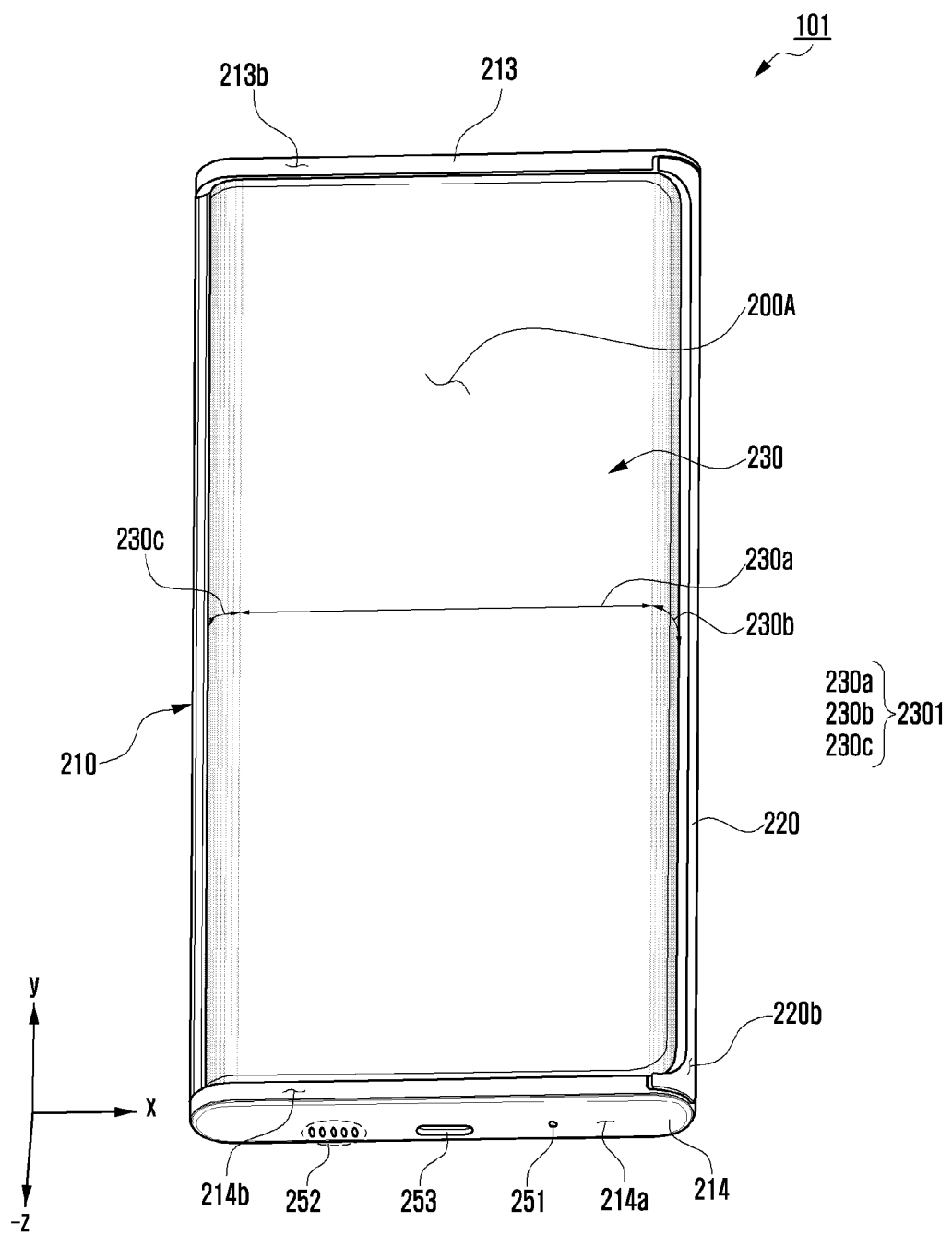
FIG. 2A is a front perspective view of an electronic device in a closed state according to an embodiment of the disclosure.

FIG. 2A is a front perspective view of an electronic device in a closed state according to an embodiment of the disclosure.

Figure 2B:
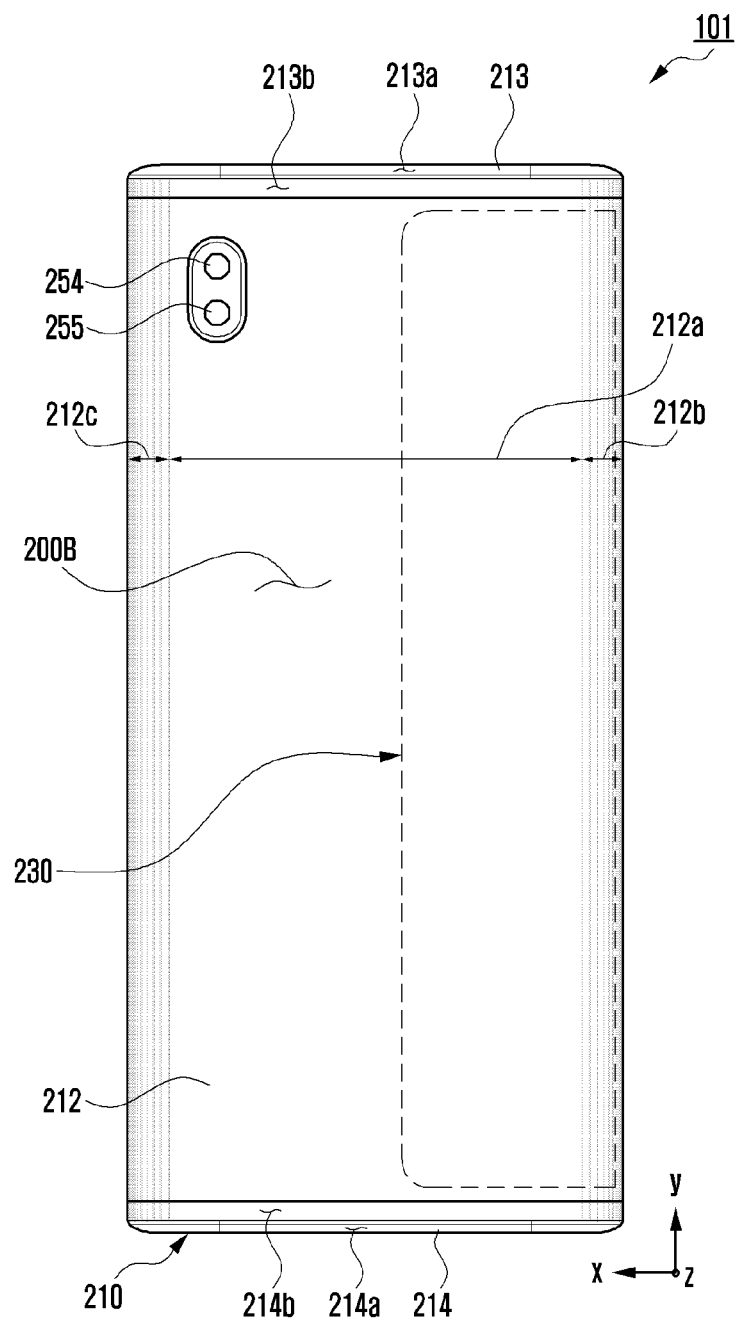
FIG. 2B is a rear perspective view of an electronic device in a closed state according to an embodiment of the disclosure.

FIG. 2B is a rear perspective view of an electronic device in a closed state according to an embodiment of the disclosure.

Figure 3A:
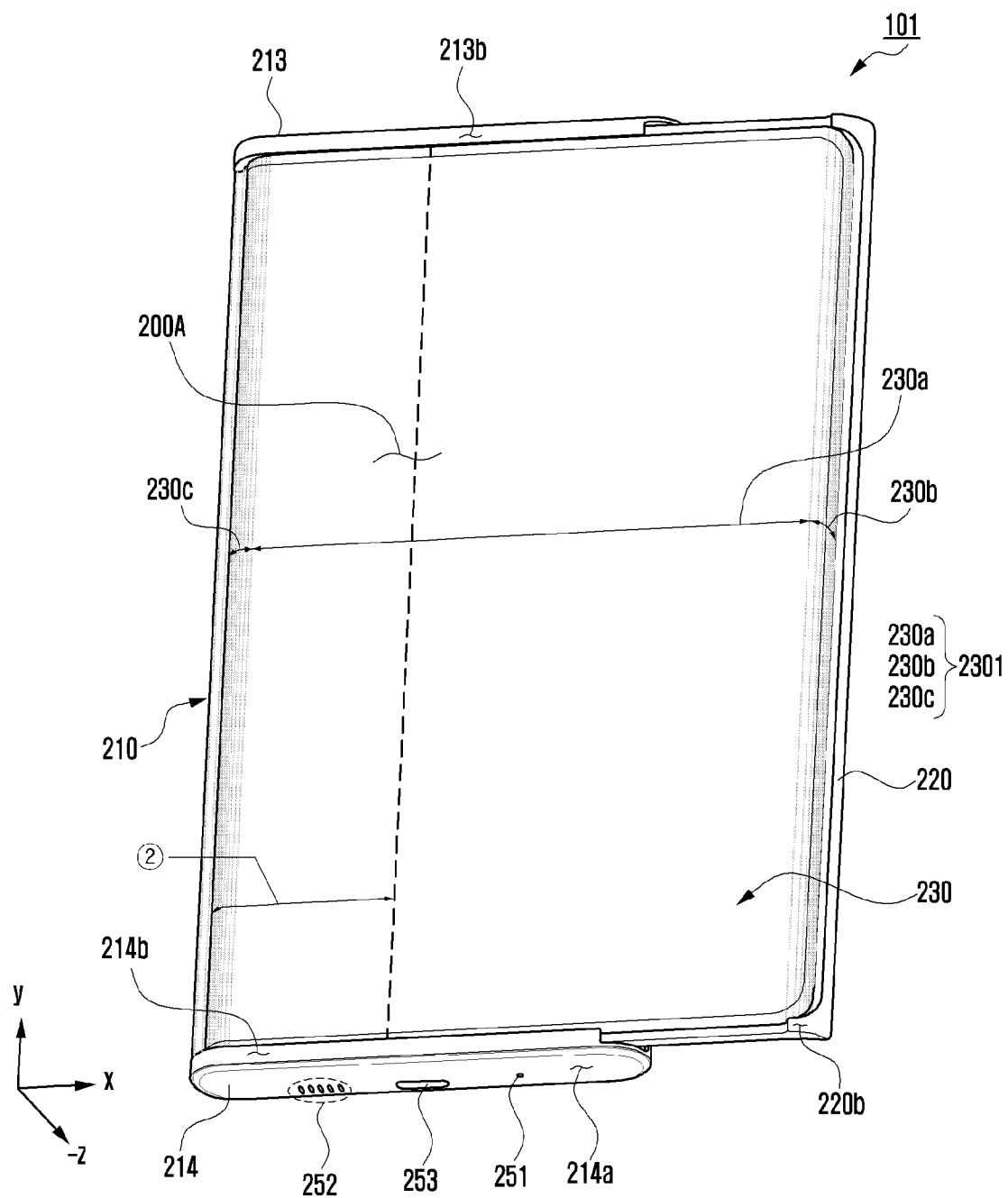
FIG. 3A is a front perspective view of an electronic device in an open state according to an embodiment of the disclosure.

FIG. 3A is a front perspective view of an electronic device in an open state according to an embodiment of the disclosure.

Figure 3B:
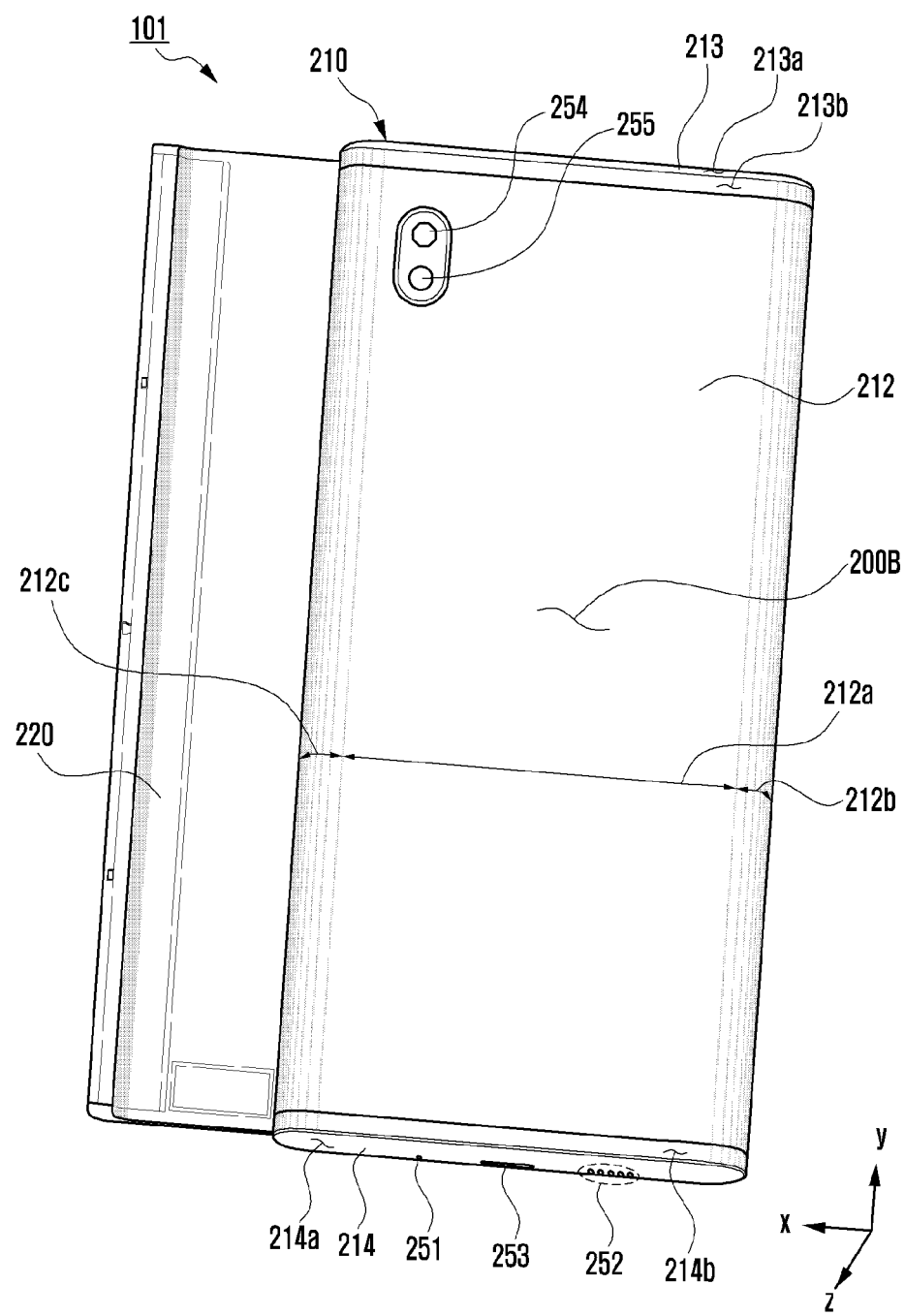
FIG. 3B is a rear perspective view of an electronic device in an open state according to an embodiment of the disclosure.

FIG. 3B is a rear perspective view of an electronic device in an open state according to an embodiment of the disclosure.

Referring to FIGS. 2A, 2B, 3A, and 3B, in an embodiment, an electronic device 101 may be implemented to expand a screen 2301 in a sliding manner. For example, the screen 2301 is an area of a flexible display 230, which is visible to the outside. FIGS. 2A and 2B illustrate the electronic device 101 in a state where the screen 2301 is not expanded, and FIGS. 3A and 3B illustrate the electronic device 101 in a state where the screen 2301 is expanded.

The state, in which the screen 2301 is not expanded, may be a state in which a sliding plate 220 for sliding motion of the flexible display 230 is not slid-out, and hereinafter, be referred to as "a closed state". The state, in which the screen 2301 is expanded, may be a state in which the screen 2301 is no longer expanded by the slide-out of the sliding plate 220, and hereinafter, be referred to as "an open state".

For example, the slide-out state when the sliding plate 220 moves at least partially in a first direction (e.g., the +x-axis direction) in case that the electronic device 101 is switched from a closed state to an open state. According to various embodiments, an open state may be defined as a state in which the screen 2301 is expanded compared with a closed state, and according to the movement position of the sliding plate 220, screens having various sizes may be provided. An intermediate state may mean a state between a closed state in FIG. 2A and an open state in FIG. 3A.

The screen 2301 may include an active area of the flexible display 230, which is visually exposed and enables an image to be output thereon, and the electronic device 101 may adjust the active area according to the movement of the sliding plate 220 or the movement of the flexible display 230. In the following description, an open state may mean a state in which the screen 2301 is maximally expanded. In some embodiments, the flexible display 230, which is disposed to be slidable in the electronic device 101 in FIG. 2A and provides the screen 2301, may also be referred to as "a slide-out display" or "an expandable display".

According to another embodiment, the electronic device 101 may include a sliding structure associated with the flexible display 230. For example, in case that the flexible display 230 is moved by a predetermined distance by an external force, by an elasticity structure included in the sliding structure, the flexible display is switched from a closed state to an open state or from an open state to a closed state even without any further external force (e.g., a semi-automatic slide operation).

According to some embodiments, in case that a signal is generated through an input device included in the electronic device 101, by a drive device such as a motor connected to the flexible display 230, the electronic device 101 may be switched from a closed state to an open state or from an open state to a closed state. For example, in case that a signal is generated through a hardware button or a software button provided through a screen, the electronic device 101 may be switched from a closed state to an open state or from an open state to a closed state.

According to yet another embodiment, when signals are generated from various sensors such as a pressure sensor, the electronic device 101 may be switched from a closed state to an open state or from an open state to a closed state. For example, the electronic device 101 is carried or gripped by hand, a squeeze gesture, in which a part (e.g., the palm of the hand or the finger) of the hand presses a part within a designated section of the electronic device 101, is detected through a sensor, and in response thereto, the electronic device 101 may be switched from a closed state to an open state or from an open state to a closed state.

According to yet another embodiment, the flexible display 230 may include a second section ② (see FIG. 3A). The second section ② may include a portion of the screen 2301 expanded when the electronic device 101 is switched from a closed state to an open state. In case that the electronic device 101 is switched from a closed state to an open state, the second section ② may be withdrawn from an inner space of the electronic device 101 in a sliding manner, and thus the screen 2301 may be expanded.

In case that the electronic device 101 is switched from an open state to a closed state, at least a part of the second section ② may be inserted into the inner space of the electronic device 101 in a sliding manner, and thus the screen 2301 may be reduced. In case that the electronic device 101 is switched from an open state to a closed state, at least a part of the second section ② may be moved to the inner space of the electronic device 101 while being bent.

For example, the flexible display 230 may include a flexible substrate (e.g., a plastic substrate) formed of a polymer material including polyimide (PI) or polyester (PET). In case that the electronic device 101 is switched between an open state and a closed state, the second section ② may be a portion which is bent in the flexible display 230, and for example, may also be referred to as a bendable section. In the following description, the second section ② may be referred to as a bendable section.

According to yet another embodiment, the electronic device 101 may include a housing 210, the sliding plate 220, or the flexible display 230.

For example, the housing (or a case) 210 includes a back cover 212, a first side cover 213, or a second side cover 214. The back cover 212, the first side cover 213, or the second side cover 214 may be connected to a support member (not shown) positioned inside the electronic device 101, and may form at least a part of the exterior of the electronic device 101.

For example, the back cover 212 may form at least a part of a rear surface 200B of the electronic device 101. In an embodiment, the back cover 212 may be substantially opaque. For example, the back cover 212 is formed of a coated or colored glass material, a ceramic material, a polymer material, or a metal (e.g., aluminum, stainless steel (STS), or magnesium) material, or formed by a combination of at least two of the materials. According to some embodiments, in the state (e.g., a closed state) where the bendable section ② of the flexible display 230 is inserted into the inner space of the housing 210, at least a part of the bendable section ② may also be disposed to be visible from the outside through the back cover 212. In this case, the back cover 212 may be formed of at least one of a transparent material or a translucent material.

According to yet another embodiment, the back cover 212 may include a flat-surface part 212a and curved-surface parts 212b and 212c positioned at the sides opposite to each other while having the flat-surface part 212a interposed therebetween. The curved-surface parts 212b and 212c may be formed adjacent to relatively long opposite edges (not shown) of the back cover 212, respectively, and may be bent toward a screen positioned at the side opposite to the back cover 212 and then extend seamlessly. According to some embodiments, the back cover 212 may include one of the curved-surface parts 212b and 212c or may be implemented without the curved-surface parts 212b and 212c.

According to yet another embodiment, the first side cover 213 and the second side cover 214 may be positioned at the sides opposite to each other. For example, the first side cover 213 and the second side cover 214 may be positioned at the sides opposite to each other while having the flexible display 230 interposed therebetween, in a second direction (e.g., the y-axis direction) orthogonal to the first direction (e.g., the +x-axis direction) of the slide-out of the sliding plate 220. The first side cover 213 may form at least a part of the first side surface 213a of the electronic device 101, and the second side cover 214 may form at least a part of the second side surface 214a of the electronic device 101, which is oriented in the direction opposite to the first side surface 213a. The first side cover 213 may include a first edge part (or a first rim) 213b extending from the edge of the first side surface 213a. For example, the first edge part 213b forms at least a part of one side bezel of the electronic device 101. The second side cover 214 may include a second edge part (or a second rim) 214b extending from the edge of the second side surface 214a. For example, the second edge part 214b forms at least a part of the other side bezel of the electronic device 101. According to an embodiment, in the closed state in FIG. 2A, the surface of the first edge part 213b, the surface of the second edge part 214b, and the surface of the sliding plate 220 are seamlessly connected to form a curved-surface part (not shown) of one side corresponding to the side of the first curved-surface part 230b of the screen 2301. According to various embodiments, the surface of the first edge part 213b or the surface of the second edge part 214b may include a curved-surface part (not shown) of the other side corresponding to the side of the second curved-surface part 230c of the screen 2301, which is positioned at the side opposite to the first curved-surface part 230b.

According to yet another embodiment, the sliding plate 220 may perform sliding motion on a support member (not shown) positioned inside the electronic device 101. At least a part of the flexible display 230 may be disposed on the sliding plate 220, and the closed state in FIG. 2A or the open state in FIG. 3A may be formed based on the position of the sliding plate 220 on the support member. According to an embodiment, the flexible display 230 may be attached to the sliding plate 220 by an adhesive member (or a bonding member) (not shown). According to an embodiment, the adhesive member may include at least one of a heat-reactive adhesive member, a photo-reactive adhesive member, a general adhesive, or a double-sided tape. According to some embodiments, the flexible display 230 may be inserted into a recess formed on the sliding plate 220 in a sliding manner, and be disposed on and fixed to the sliding plate 220. The sliding plate 220 may function to support at least a part of the flexible display 230, and in some embodiments, may also be referred to as a display support structure.

According to an embodiment, the sliding plate 220 may include a third edge part 220b forming an outer surface (e.g., a surface exposed to the outside so as to form the exterior of the electronic device 101) of the electronic device 101. For example, the third edge part 220b may form a bezel around a screen together with the first edge part 213b and the second edge part 214b in the closed state in FIG. 2A. In a closed state, the third edge part 220b may extend in the second direction (e.g., the y-axis direction) so as to connect one end of the first side cover 213 and one end of the second side cover 214. For example, in the closed state in FIG. 2A, the surface of the third edge part 220b is seamlessly connected to the surface of the first edge part 213b and/or the surface of the second edge part 214b.

According to yet another embodiment, due to the slide-out of the sliding plate 220, at least a part of the bendable section ② may be withdrawn from the inside of the electronic device 101 to the outside, and thus a state (e.g., an open state), in which the screen 2301 is expanded, may be provided as illustrated in FIG. 3A.

According to yet another embodiment, in the closed state in FIG. 2A, the screen 2301 may include a flat-surface part 230a, and a first curved-surface part 230b and/or a second curved-surface part 230c positioned at the sides opposite to each other while having the flat-surface part 230a interposed therebetween. The first curved-surface part 230b and the second curved-surface part 230c may be substantially symmetrical while having the flat-surface part 230a interposed therebetween. For example, in the closed state in FIG. 2A, the first curved-surface part 230b and/or the second curved-surface part 230c is positioned to correspond to the curved-surface parts 212b and 212c of the back cover 212, respectively, and may have a shape bent toward the back cover 212.

When being switched from the closed state in FIG. 2A to the open state in FIG. 3A, the flat-surface part 230a may be expanded. For example, in the closed state in FIG. 2A, a partial area of the bendable section ②, which forms the second curved-surface part 230c, is included in the flat-surface part 230a expanded when being switched from the closed state in FIG. 2A to the open state in FIG. 3A, and, may be formed as another area of the bendable section ②.

According to yet another embodiment, the electronic device 101 may include an opening (not shown) allowing the bendable section ② to be inserted or withdrawn therethrough, and/or a pulley (not shown) positioned in the opening. The pulley may be positioned to correspond to the bendable section ②, and in the switching between the closed state in FIG. 2A and the open state in FIG. 3A, the movement and the movement direction of the bendable section ② may be guided through the rotation of the pulley. The first curved-surface part 230b may be formed to correspond to a curved surface formed on one surface of the sliding plate 220. The second curved-surface part 230c may be formed by a portion of the bendable section ②, which corresponds to a curved surface of the pulley. In a closed state or an open state of the electronic device 101, the first curved-surface part 230b may be positioned at the side opposite to the second curved-surface part 230c, and thus may improve aesthetic impression of the screen 2301. According to some embodiments, the flat-surface part 230a may also be implemented in an expanded form without the first curved-surface part 230b.

According to yet another embodiment, the flexible display 230 may further include a touch detection circuit (e.g., a touch sensor). According to various embodiments, the flexible display 230 may be coupled or adjacently disposed to a pressure sensor capable of measuring the intensity (pressure) of touch, and/or a digitizer for detecting a magnetic field type pen input device (a stylus pen). For example, the digitizer includes a coil member disposed on a dielectric substrate so as to detect the resonance frequency of an electromagnetic induction method, which is applied from the pen input device.

According to yet another embodiment, the electronic device 101 may include a microphone hole 251 (e.g., the input module 150 in FIG. 1), a speaker hole 252 (e.g., the sound output module 155 in FIG. 1), a connector hole 253 (e.g., the connection terminal 178 in FIG. 1), a camera module 254 (e.g., the camera module 180 in FIG. 1), or a flash 255. According to various embodiments, the flash 255 may also be implemented by being included in the camera module 254. In some embodiments, at least one of elements of the electronic device 101 may be omitted, or the electronic device may additionally include other elements.

For example, the microphone hole 251 may be formed through at least a part of the second side surface 214a to correspond to a microphone (not shown) positioned inside the electronic device 101. The position of the microphone hole 251 is not limited to the embodiment of FIG. 2A, and may be various. According to some embodiments, the electronic device 101 may include multiple microphones capable of detecting the direction of sound.

For example, the speaker hole 252 is formed through at least a part of the second side surface 214a to correspond to a speaker positioned inside the electronic device 101. The position of the speaker hole 252 is not limited to the embodiment of FIG. 2A, and may be various. According to various embodiments, the electronic device 101 may include a receiver hole for phone calling. In some embodiments, the microphone hole 251 and the speaker hole 252 may be implemented as a single hole, or the speaker hole 252 may be omitted as a piezo speaker.

For example, the connector hole 253 is formed through at least a part of the second side surface 214a to correspond to a connector (e.g., a USB connector) positioned inside the electronic device 101. The electronic device 101 may transmit and/or receive power and/or data to and/or from an external electronic device electrically connected to the connector through the connector hole 253. The position of the connector hole 253 is not limited to the embodiment of FIG. 2A, and may be various.

For example, the camera module 254 and the flash 255 is positioned on the rear surface 200B of the electronic device 101. The camera module 254 may include one lens or multiple lenses, an image sensor, and/or an image signal processor. For example, the flash 255 includes a light-emitting diode or a xenon lamp. In some embodiments, two or more lenses (e.g., an infrared camera lens, a wide-angle lens, and a telephoto lens) and image sensors may be arranged on one surface of the electronic device 101. According to an embodiment, the electronic device 101 may include multiple camera modules without being limited to the embodiment of FIG. 2B or 3B. The camera module 254 may be one of multiple camera modules.

For example, the electronic device 101 includes multiple camera modules (e.g., a dual camera or a triple camera) having different properties (e.g., view angles) or functions. For example, a camera module (e.g., the camera module 254) including lenses having different view angles may be numerously configured, and the electronic device 101 controls to change a view angle of a camera module, which is performed in the electronic device 101, based on a user selection. In addition, multiple camera modules may include at least one of a wide-angle camera, a telephoto camera, a color camera, a monochrome camera, or an infrared (IR) camera (e.g., a time of flight (TOF) camera or a structured light camera). According to an embodiment, the IR camera may also operate as at least a part of a sensor module (not shown).

According to yet another embodiment, the electronic device 101 may further include a camera module (e.g., a front camera) which receives light through one surface (e.g., the front surface 200A), placed in a direction in which the screen 2301 is oriented, of the electronic device 101, and generates an image signal, based on the received light. For example, the camera module 254 is not limited to the embodiment of FIG. 2B or 3B, and may be positioned inside the housing 210 while being aligned with an opening (e.g., a through-hole or a notch) formed through the flexible display 230. The camera module 254 may receive light through an opening and a partial area of a transparent cover overlapping the opening, and then generate an image signal. The transparent cover may function to protect the flexible display 230 from the outside, and for example, includes a material such as polyimide or ultra-thin glass (UTG).

According to some embodiments, the camera module 254 may be disposed at the lower end of at least a part of the screen 2301 of the flexible display 230, and may perform related functions (e.g., image capturing) while the position of the camera module 254 is not visually distinguished (exposed), without being limited to the embodiment of FIG. 2A or 2B. In this case, for example, when seen from above the screen 2301 (e.g., when seen in the −z-axis direction), the camera module 254 is disposed to overlap at least a part of the screen 2301, and thus may obtain an image of an external subject without being exposed to the outside.

According to yet another embodiment, the electronic device 101 may further include a key input device (e.g., the input module 150 in FIG. 1). For example, the key input device may be positioned on the first side surface 213a of the electronic device 101, which is formed by the first side cover 213. In some embodiments, the input device may include at least one sensor module.

According to yet another embodiment, the electronic device 101 may include various sensor modules (e.g., the sensor module 176 in FIG. 1). The sensor modules may generate electric signals or data values corresponding to an internal operation state of the electronic device 101 or an external environment state. For example (not shown), the sensor modules includes a proximity sensor generating a signal associated with the proximity of an external object, based on light received through the front surface 200A of the electronic device 101, which is placed in a direction in which the screen 2301 is oriented.

For another example, the sensor module may include various biometric sensors, such as a fingerprint sensor or a heart rate monitor (HRM) sensor, for detecting information on a living body, based on light received through the front surface 200A or the rear surface 200B of the electronic device 101. The electronic device 101 may include various other modules, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

According to various embodiments, the electronic device 101 may also be implemented as a structure in which a screen is expanded from the side of the third edge part 220b when the sliding plate 220 slides out, without being limited to the embodiment of FIGS. 2A, 2B, 3A, and 3B. For example, in the closed state in FIG. 2A, a partial area of the flexible display 230, which forms the first curved-surface part 230b, may be included in the flat-surface part 230a expanded when being switched from the closed state in FIG. 2A to the open state in FIG. 3A, and is formed as another area of the flexible display 230.

Figure 4:
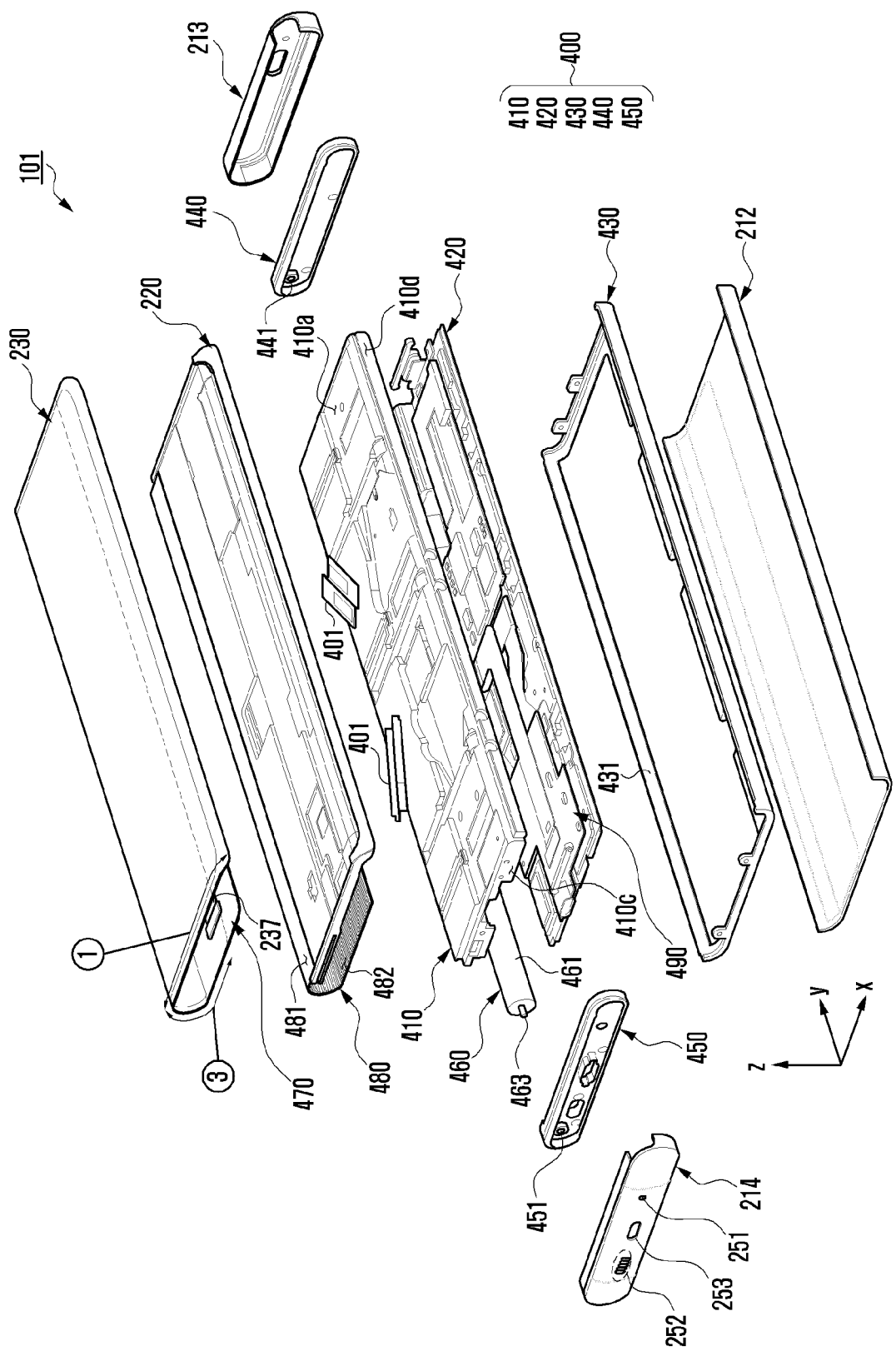
FIG. 4 is an exploded perspective view of the electronic device in FIG. 2A according to an embodiment of the disclosure.

FIG. 4 is an exploded perspective view of the electronic device in FIG. 2A according to an embodiment of the disclosure.

Referring to FIG. 4, in an embodiment, the electronic device 101 may include the back cover 212, the first side cover 213, the second side cover 214, a support member assembly 400, a pulley 460, the sliding plate 220, the flexible display 230, a support sheet 470, a multi-bar structure (or a multi-bar assembly) 480, or a printed circuit substrate 490 (e.g., a printed circuit board (PCB), a flexible PCB (FPCB), or a rigid-flexible PCB (RFPCB)). Descriptions of some of the reference numerals in FIG. 4, which are duplicate, will be omitted.

According to another embodiment, the support member assembly (or a support structure) 400 may be a frame structure capable of withstanding loads, and may contribute to durability or rigidity of the electronic device 101. At least a part of the support member assembly 400 may include a non-metal material (e.g., polymer) or a metal material. The housing 210 (e.g., see FIG. 2A) including the back cover 212, the first side cover 213, or the second side cover 214, the pulley 460, the sliding plate 220, the flexible display 230, the support sheet 470, the multi-bar structure 480, or the printed circuit substrate 490 may be disposed on or coupled to the support member assembly 400.

According to yet another embodiment, the support member assembly 400 may include a first support member 410, a second support member 420, a third support member 430, a fourth support member 440, or a fifth support member 450.

For example, the first support member (or a first bracket) 410 is a plate shape. The sliding plate 220 may be disposed on one side (i.e., surface 410a) of the first support member 410. For example, when seen in the z-axis direction, the second support member (or a second bracket) 420 is a plate shape overlapping at least a part of the first support member 410, or may be coupled to the first support member 410 and/or the third support member 430. The second support member 420 may be positioned between the first support member 410 and the third support member 430. The third support member 430 may be coupled to the first support member 410 while having the second support member 420 interposed therebetween, and/or to the second support member 420.

The printed circuit substrate 490 may be disposed on the second support member 420, between the first support member 410 and the second support member 420. The fourth support member 440 may be coupled to one side of an assembly (or a structure) (not shown) to which the first support member 410, the second support member 420, and the third support member 430 are coupled. The fifth support member 450 may be coupled to the other side of the assembly (or structure) (not shown) to which the first support member 410, the second support member 420, and the third support member 430 are coupled, and may be positioned at the side opposite to the fourth support member 440.

The first side cover 213 may be coupled to the support member assembly 400 from the side of the fourth support member 440. The second side cover 214 may be coupled to the support member assembly 400 from the side of the fifth support member 450. The back cover 212 may be coupled to the support member assembly 400 from the side of the third support member 430. At least a part of the first support member 410, the second support member 420, the third support member 430, the fourth support member 440, or the fifth support member 450 may include a metal material and/or a non-metal material (e.g., polymer).

According to yet another embodiment, at least two of the first support member 410, the second support member 420, the third support member 430, the fourth support member 440, and the fifth support member 450 may be integrally implemented. According to some embodiments, the support member assembly 400 may also refer to a structure forming at least a part of the first support member 410, the second support member 420, the third support member 430, the fourth support member 440, and the fifth support member 450. According to some embodiments, a part of the first support member 410, the second support member 420, the third support member 430, the fourth support member 440, and the fifth support member 450 may also be omitted.

For example, the first support member 410 includes a first side surface (not shown) facing the fourth support member 440, a second side surface 410c which faces the fifth support member 450 and is positioned at the side opposite to the first side surface, a third side surface (not shown) for connecting one end of the first side surface and one end of the second side surface 410c, or a fourth side surface 410d which connects the other end of the first side surface and the other end of the second side surface 410c and is positioned at the side opposite to the third side surface.

According to yet another embodiment, the pulley 460 may be positioned near the third side surface of first support member 410. For another example, in case of an electronic device formed to have a direction of the slide-out, which is opposite thereto, the pulley 460 may also be positioned near the fourth side surface 410d of the first support member 410. The pulley 460 may include a cylindrical roller 461 extending in a direction (e.g., the +y-axis direction) from the fifth support member 450 toward the fourth support member 440. The pulley 460 may include a first rotation shaft (not shown) and a second rotation shaft 463 which are connected to the roller 461, and the first rotation shaft and the second rotation shaft 463 may be positioned at the sides opposite to each other while having the roller 461 interposed therebetween.

The first rotation shaft may be positioned between the roller 461 and the first side cover 213, and may be connected to the fourth support member 440. The second rotation shaft 463 may be positioned between the roller 461 and the second side cover 214, and may be connected to the fifth support member 450. The fourth support member 440 may include a first through-hole 441 into which the first rotation shaft is inserted, and the fifth support member 450 may include a second through-hole 451 into which the second rotation shaft 463 is inserted. The roller 461 may be rotatable based on the first rotation shaft disposed on the fourth support member 440 and the second rotation shaft 463 disposed on the fifth support member 450.

According to yet another embodiment, the sliding plate 220 may be disposed on the support member assembly 400 so as to be slidable on the first support member 410. For example, a sliding structure is provided between the first support member 410 and the sliding plate 220 in order to support and guide the coupling therebetween and the movement of the sliding plate 220. According to yet another embodiment, the sliding structure may include at least one elasticity structure 401. For example, in case that the sliding plate 220 is moved by a predetermined distance by an external force, by at least one elasticity structure 401, the sliding plate is switched from the closed state in FIG. 2A to the open state in FIG. 3A or from the open state to the closed state even without any further external force.

For example, the at least one elasticity structure 401 includes various elasticity members such as a torsion spring. For example, the torsion spring as the elasticity structure 401 includes one end connected to the sliding plate 220, the other end connected to the first support member 410, and a spring part between the one end and the other end.

In case that the sliding plate 220 is moved by a predetermined distance in the first direction (e.g., the +x-axis direction) of the slide-out by an external force, the position of the one end relative to the other end may be changed. In case that the position of the one end relative to the other end is changed, the sliding plate 220 may be moved in the first direction due to the elasticity of the spring part even without any further external force, and thus may be switched from the closed state in FIG. 2A to the open state in FIG. 3A. In case that the sliding plate 220 is moved by a predetermined distance in the second direction (e.g., the −x-axis direction) opposite to the first direction by an external force, the position of the one end relative to the other end may be changed. In case that the position of the one end relative to the other end is changed, the sliding plate 220 may be moved in the second direction due to the elasticity of the spring part even without any further external force, and thus may be switched from the open state in FIG. 3A to the closed state in FIG. 2A.

According to yet another embodiment, the housing 210 may be defined to further include at least a part of the support member assembly 400. For example, the housing 210 includes one surface (e.g., the one surface 410a formed by the first support member 410) oriented in the first direction (e.g., the +z-axis direction), and the other surface (e.g., the rear surface 200B in FIG. 2B) oriented in the second direction (e.g., the −z-axis direction) opposite to the first surface 410a. The display support structure (i.e., the sliding plate 220) may be disposed on one surface (e.g., the one surface 410a formed by the first support member 410) of the housing 210 so as to be slidable in a third direction (e.g., the x-axis direction) perpendicular to the first direction.

According to yet another embodiment, the flexible display 230 may include a first section ① extending from the bendable section ②. The first section ① may be disposed on the sliding plate 220.

In case of being switched from the closed state in FIG. 2A to the open state in FIG. 3A, a screen (see the screen 2301 in FIG. 3A) may be expanded since the bendable section ② connected to the first section ① slides out to the outside by the movement of the sliding plate 220. In case of being switched from the open state in FIG. 3A to the closed state in FIG. 2A, a screen (see the screen 2301 in FIG. 2A) may be reduced since at least a part of the bendable section ② slides into the inside of the electronic device 101 by the movement of the sliding plate 220.

The support member assembly 400 may include an opening (not shown) allowing the bendable section ② to be inserted and withdrawn therethrough, and the pulley 460 may be positioned in the opening. The opening may include a gap in one side between the first support member 410 and the third support member 430, and a part 431 of the third support member 430, which is adjacent to the opening, may be formed to have a curved shape corresponding to the curved surface of the roller 461. The pulley 460 may be positioned to correspond to the bendable section ②, and in the switching between the closed state in FIG. 2A and the open state in FIG. 3A, the pulley 460 may be rotated by the movement of the bendable section ②.

According to yet another embodiment, the support sheet 470 may be attached to the rear surface of the flexible display 230. The rear surface of the flexible display 230 may indicate a surface positioned opposite to a surface, from which light is emitted, of a display panel including multiple pixels. The support sheet 470 may contribute to durability of the flexible display 230. The support sheet 470 may reduce the influence of load or stress, which may occur in the switching between the closed state in FIG. 2A and the open state in FIG. 3A, on the flexible display 230. The support sheet 470 may prevent the flexible display 230 from being damaged by the force transmitted therefrom when the sliding plate 220 is moved.

Although not illustrated, the flexible display 230 may include a first layer including multiple pixels and a second layer coupled to the first layer.

For example, the first layer includes a light-emitting layer (e.g., a display panel) including multiple pixels implemented as a light-emitting element such as an organic light-emitting diode (OLED) or a micro light-emitting diode (LED) and various other layers (e.g., an optical layer, such as a polarization layer, for improving screen quality or outdoor visibility). According to yet another embodiment, the optical layer may selectively transmit light which is generated from a light source of the light-emitting layer and vibrates in a predetermined direction.

According to yet another embodiment, when seen from above the screen 2301 (e.g., when seen in the −z-axis direction), multiple pixels may not be arranged in a partial area of the flexible display 230, which at least partially overlaps at least one electronic component (e.g., a camera module or a sensor module) included in the electronic device 101. According some embodiments, when seen from above the screen 2301, a partial area of the flexible display 230, which at least partially overlaps at least one electronic component (e.g., a camera module or a sensor module) included in the electronic device 101, may include a different pixel structure and/or a different wiring structure compared with other areas.

For example, a partial area of the flexible display 230, which at least partially overlaps the at least one electronic component (e.g., a camera module or a sensor module), has a different pixel density compared with other areas. For example, a partial area of the flexible display 230, which at least partially overlaps the at least one electronic component (e.g., a camera module or a sensor module), is implemented as a substantially transparent area formed by changing a pixel structure and/or a wiring structure even though not including an opening.

The second layer may include various layers which function to support and protect the first layer (e.g., a cushion), to block light, to absorb or block electromagnetic waves, or to diffuse, disperse, or dissipate heat. According to yet another embodiment, at least a part of the second layer may be a conductive member (e.g., a metal plate), and may help the rigidity reinforcement of the electronic device 101, block ambient noise, and be used to disperse heat emitted from a heat dissipation component (e.g., a display drive circuit) therearound. According to yet another embodiment, the conductive member may include at least one of copper (CU), aluminum (Al), stainless steel (SUS), or a CLAD (e.g., a lamination member in which SUS and Al are alternately arranged).

The support sheet 470 may be attached to the rear surface of the second layer so as to cover at least a part of the second layer of the flexible display 230. The support sheet 470 may be formed of various metal materials and/or non-metallic materials (e.g., polymer). According to yet another embodiment, the support sheet 470 may include stainless steel. According to some embodiments, the support sheet 470 may include engineering plastic. According to some embodiments, the support sheet 470 may be integrally implemented with the flexible display 230.

According to yet another embodiment, the support sheet 470 may include a lattice structure (not shown) which at least partially overlaps a portion (e.g., the bendable section ② in FIG. 3A or 4, or the first curved-surface part 230b in FIG. 2A or 3A) at which the flexible display 230 is bent and disposed. The lattice structure may include multiple openings or multiple slits, and may contribute to flexibility of the flexible display 230. According to yet another embodiment, the support sheet 470 may include a recess pattern (not shown) including multiple recesses in place of the lattice structure, and the recess pattern may contribute to flexibility of the flexible display 230. According to yet another embodiment, the lattice structure or the recess pattern may also expand to at least a part of the flat-surface part 230a in FIG. 2A or 3A. In an embodiment, the support sheet 470 including the lattice structure or the recess pattern, or a conductive member corresponding thereto may also be formed of multiple layers.

According to yet another embodiment, the multi-bar structure 480 may be connected to the sliding plate 220, and may include a first surface 481 facing the support sheet 470 and a second surface 482 positioned at the side opposite to the first surface 481. In case that the sliding plate 220 is moved, the movement and direction of the multi-bar structure 480 may be guided by a roller 461 which rotates while rubbing against the second surface 482. According to an embodiment, the second surface 482 may include a form in which multiple bars (not shown) extending in a direction (e.g., the +y-axis direction) from the second rotation shaft 463 toward the first rotation shaft (not shown)) of the pulley 460 are arranged. The multi-bar structure 480 may be bent at portions having a relatively thin thickness between multiple bars. In an embodiment, the multi-bar structure 480 may also be referred to as other terms such as a "flexible track" or "hinge rail".

According to yet another embodiment, in the closed state in FIG. 2A or the open state in FIG. 3A, at least a part of the multi-bar structure 480 may be positioned to overlap the screen 2301 (see FIG. 2A or 3A), and may support the bendable section ② to maintain the form in which the bendable section ② of the flexible display 230 is seamlessly connected to the first section ① of the flexible display 230 without lifting. The multi-bar structure 480 may contribute so that the bendable section ② is movable while being seamlessly connected to the first section ① without lifting in the switching between the closed state in FIG. 2A and the open state in FIG. 3A.

According to yet another embodiment, the support sheet 470 may prevent elements (e.g., the multi-bar structure 480) positioned inside the electronic device 101 from being substantially visible through the flexible display 230.

In a state (e.g., the open state in FIG. 3A) where the screen is expanded, a screen, which is not seamless, may be provided due to the lifting caused by the elasticity of the flexible display 230 and/or the support sheet 470. According to various embodiments, in order to prevent same, a tension structure (not shown) may be provided for the flexible display 230 and/or the support sheet 470. The tension structure may contribute to a smooth slide operation while maintaining tension.

According to yet another embodiment, a processor (e.g., the processor 120 in FIG. 1), a memory (e.g., the memory 130 in FIG. 1), and/or an interface (e.g., the interface 177 in FIG. 1) may be mounted on the printed circuit substrate 490. For example, the processor includes one or more of a central processing unit, an application processor, a graphics processing unit, an image signal processor, a sensor hub processor, and a communication processor.

For example, the memory includes a volatile memory or a non-volatile memory. For example, the interface includes a high-definition multimedia interface (HDMI), a universal serial bus (USB) interface, an SD card interface, and/or an audio interface. For example, the interface electrically or physically connects the electronic device 101 to an external electronic device, and may include a USB connector, an SD card/MMC connector, or an audio connector.

The electronic device 101 may include various other elements arranged on the printed circuit substrate 490 or electrically connected to the printed circuit substrate 490. For example, the electronic device 101 includes a battery (not shown) positioned between the first support member 410 and the second support member 420, or between the second support member 420 and the back cover 212. The battery (not shown) may be a device for supplying power to at least one element of the electronic device 101, and for example, includes a non-rechargeable primary cell, a rechargeable secondary cell, or a fuel cell. The battery (not shown) may be integrally disposed inside the electronic device 101, or may be disposed to be detachable/attachable from/to the electronic device 101.

According to yet another embodiment, the electronic device 101 may include an antenna (not shown) positioned between the first support member 410 and the second support member 420, or between the second support member 420 and the back cover 212. For example, the antenna (not shown) includes a near field communication (NFC) antenna, a wireless charging antenna, and/or a magnetic secure transmission (MST) antenna. For example, the antenna (not shown) performs a short-range communication with an external device, or may wirelessly transmit/receive a power required for charging. In another embodiment, an antenna structure may be formed by a part of the first side cover 213 and/or the second side cover 214, or a combination thereof.

According to yet another embodiment, the electronic device 101 may include a flexible printed circuit board (FPCB) 237 for electrically connecting the flexible display 230 and the printed circuit substrate 490. For example, the flexible printed circuit substrate 237 is electrically connected to the printed circuit substrate 490 through an opening (not shown) formed through the sliding plate 220 and an opening (not shown) formed through the first support member 410.

FIGS. 5A, 5B, 5C, 5D, 5E, 5F, and 5G are views illustrating a structure of an expandable display of an electronic device according to various embodiments of the disclosure.

Referring to FIGS. 5A to 5G, an electronic device (e.g., the electronic device 101 in FIG. 1) according to an embodiment may include a housing structure which allows a display to be expanded in at least one direction of up, down, left, and right.

Referring to FIG. 5A, the electronic device may be implemented to enable sliding motion in one direction. For example, the electronic device includes a display 510 expandable in a first direction (e.g., the right direction). For example, in a first state (e.g., a closed state) where display 510 is not expanded, a screen is displayed through a first display area 511, and a second display area 512 may be accommodated in a housing and thus be in an inactive state.

According to an embodiment, the electronic device may be switched from the first state to a second state by a user manipulation or a predetermined input.

According to another embodiment, in case that the electronic device is switched from the first state to the second state, the second display area 512 may be withdrawn in the first direction and thus exposed to the outside. In the second state (e.g., an open state) where the display 510 is expanded, the electronic device may switch the second display area 512 to an active state, and may display a screen through the first display area 511 and the second display area 512. According to another embodiment, in case that a second housing slides relative to a first housing in one direction (e.g., the first direction) when being switched from the first state to the second state, the electronic device may be configured such that at least a part (e.g., a part corresponding to a partial area of the left side of the first display area 511 in the illustrated drawing) of the display 510, which is accommodated in the first housing, is withdrawn, and thus the display area of the display 510 may be expanded.

In case that the second housing slides relative to the first housing in the second direction when being switched from the second state to the first state, the electronic device may be configured such that a part (e.g., a part corresponding to a partial area of the left side of the first display area 511 in the illustrated drawing) of the display 510 is inserted into the first housing, and thus the display area of the display 510 may be reduced. According to an embodiment, in the electronic device, for example, the display area (e.g., the first display area 511) of the display 510 has a ratio of 4:3 in the first state (e.g., a closed state), and for example, the display area (e.g., the first display area 511 and the second display area 512) of the display 510 is expanded to a ratio of 21:9 in the second state (e.g., an open state).

According to yet another embodiment, in the first state (e.g., a closed state) where the display 515 is not expanded, the electronic device may include a first display area 516 for displaying a screen, and a second display area 517 which is expandable in the second direction (e.g., the left direction) and displays a screen in the second state (e.g., an open state) in which the display 515 is expanded.

Referring to FIG. 5B, the electronic device may include a display which is expandable in a third direction (e.g., the upward direction) or a fifth direction (e.g., the downward direction).

According to yet another embodiment, the electronic device may include a first display area 521 for displaying a screen in the first state where the display 520 is not expanded, and a second display area 522 which is expandable in a third direction and displays a screen in the second state expanded. According to another embodiment, the electronic device may include a first display area 526 for displaying a screen in the first state where the display 525 is not expanded, and a second display area 527 which is expandable in a fourth direction and displays a screen in the second state expanded.

Referring to FIG. 5C, the electronic device may include a display which is expandable in both left and right directions or both up and down directions.

According to an embodiment, the electronic device may include a first display area 531 for displaying a screen in the first state where the display 530 is not expanded, a second display area 532 which is expandable in the first direction and displays a screen in the second state expanded, and a third display area 533 which is expandable in the second direction and displays a screen in the second state expanded. In this case, at least one of the second display area 532 and the third display area 533 may be expanded according to a user manipulation, a predetermined input, or the type of output content.

According to another embodiment, the electronic device having the housing structure illustrated in FIG. 5C may be implemented to enable sliding motion in both directions. In the electronic device, for example, the display area (e.g., the first display area 531) of the display 530 has a ratio of 21:9 in the first state (e.g., a closed state), and for example, the display area (e.g., the first display area 531, the second display area 532, and the third display area 533) of the display 530 is expanded to a ratio of 4:3 in the second state (e.g., an open state).

In case that the second housing and the third housing slide relative to the first housing in both directions, for example, in the first direction (e.g., the left direction) and the second direction (e.g., the right direction), respectively, when being switched from the first state to the second state, the electronic device is configured such that a part (e.g., the second display area 532) of the display 515, which is accommodated in the first housing, is withdrawn in the first direction, and the other a part (e.g., the third display area 533) is withdrawn in the second direction, and thus the display area of the display 530 may be expanded. Although not illustrated in the drawing, the electronic device may be configured such that only a part (e.g., the first display area 531 and the second display area 532) of the display 530 is expanded in the first direction, or only the other a part (e.g., the first display area 531 and the third display area 533) of the display 530 is expanded in the second direction.

According to yet another embodiment, the electronic device may include a first display area 536 for displaying a screen in the first state where the display 535 is not expanded, a second display area 537 which is expandable in the third direction and displays a screen in the second state expanded, and a third display area 538 which is expandable in the fourth direction and displays a screen in the second state expanded.

According to yet another embodiment, an electronic device may include a display which is expandable in both the upward direction (or the downward direction) and the right direction (or the left direction).

Figure 5D:
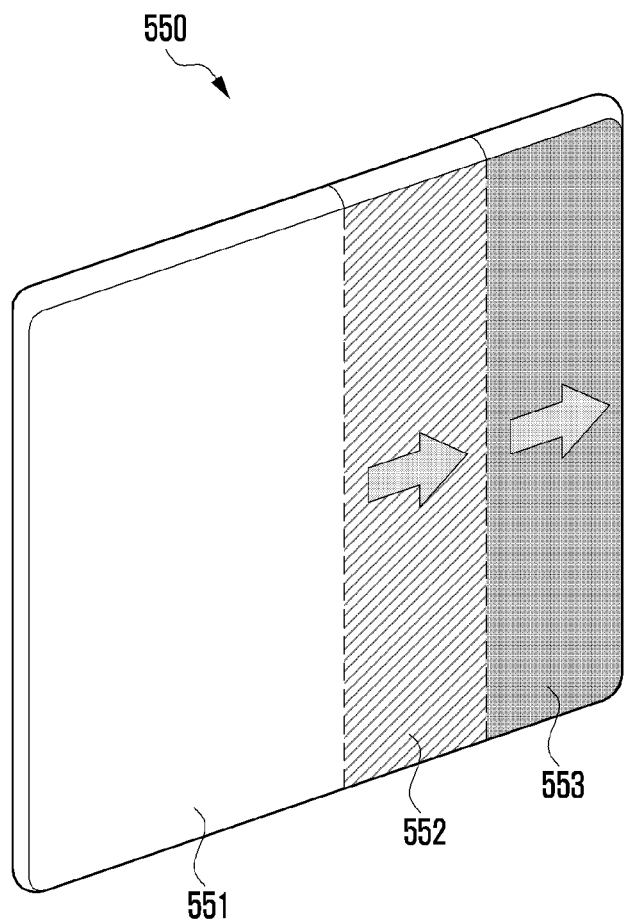

Referring to FIG. 5D, the electronic device may include a display which is expandable step by step, and the display may be partially expanded.

According to an embodiment, the electronic device may include a first display area 551, a second display area 552, and a third display area 553. The first display area 551 may indicate an area for displaying a screen in the first state in which the display 550 is not expanded. The second display area 552 may indicate an area provided in the second state expanded in the first direction (e.g., the right direction) in the first state. The third display area 553 may indicate an area provided in the third state additionally expanded in the first direction (e.g., the right direction) in the second state.

According to another embodiment, the electronic device may activate only the second display area 552 of the display 550 to display a screen. According to another embodiment, the electronic device may activate both the second display area 552 and the third display area 553 of the display 550 to display a screen. For example, the display 550 is fixed through a support structure in case of being expanded to the second display area 552, and may be expanded from the second display area 552 to the third display area 553 according to an additional force.

Figure 5E:
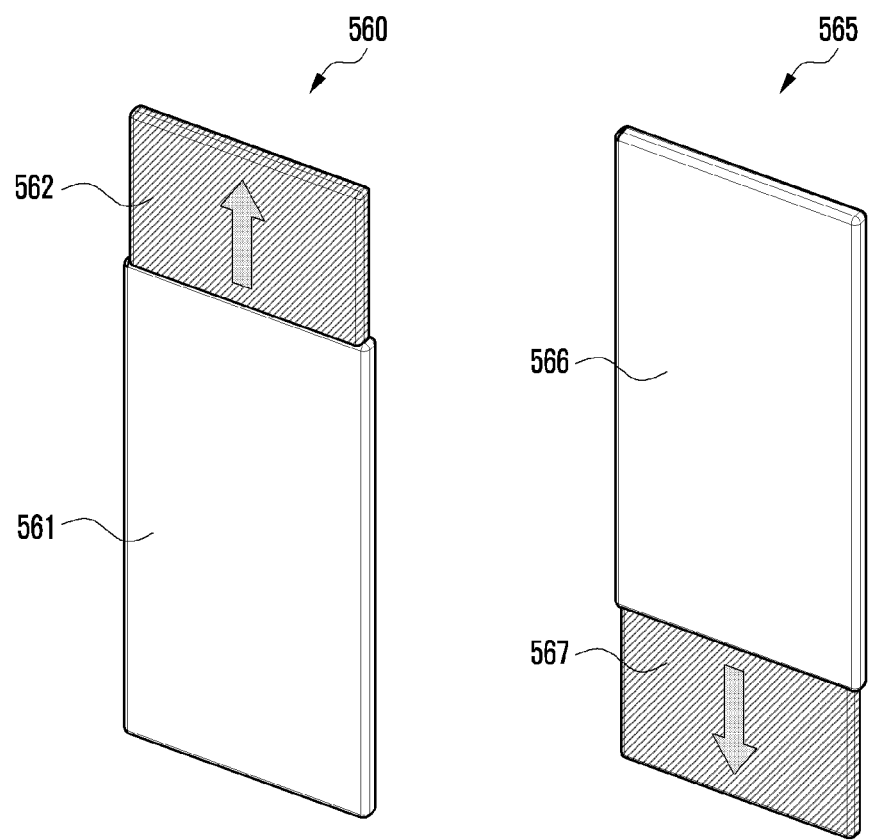

Referring to FIG. 5E, the electronic device may include a display which is expandable in the third direction (e.g., the upward direction) or the fourth direction (e.g., the downward direction). According to an embodiment, the electronic device illustrated in FIG. 5E may include a bar-type form factor in a closed state.

According to an embodiment, the electronic device may include a first display area 561 for displaying a screen in the first state where the display 560 is not expanded, and a second display area 562 which is expandable in a third direction and displays a screen in the second state expanded. According to another embodiment, the electronic device may include a first display area 566 for displaying a screen in the first state where the display 565 is not expanded, and a second display area 567 which is expandable in a fourth direction and displays a screen in the second state expanded.

Figure 5F:
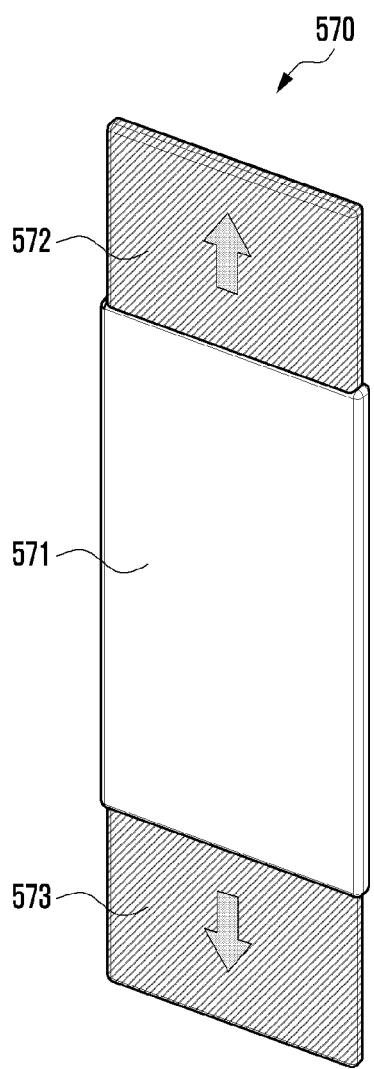

Referring to FIG. 5F, the electronic device may include a display which is expandable in both up and down directions. According to an embodiment, the electronic device illustrated in FIG. 5F may include a bar-type form factor in a closed state.

According to an embodiment, the electronic device may include a first display area 571 for displaying a screen in the first state where the display 570 is not expanded, a second display area 572 which is expandable in the third direction and displays a screen in the second state expanded, and a third display area 573 which is expandable in the fourth direction and displays a screen in the second state expanded. In this case, at least one of the second display area 532 and the third display area 533 may be expanded according to a user manipulation, a predetermined input, or the type of output content.

In various embodiments to be described later, the electronic device 101 may include a display having at least one structure of FIGS. 2A to 5F. According to various embodiments, in addition to the form factors illustrated in FIGS. 2A to 5F, various form factors, in which the display is expandable in various forms, may be included therein.

According to various embodiments, in addition to the form factors of the electronic device in FIGS. 5A to 5F, the electronic device 101 may be implemented to have various form factors in response to various sliding motions of the display. The example thereof is illustrated in FIG. 5G.

Figure 5G:
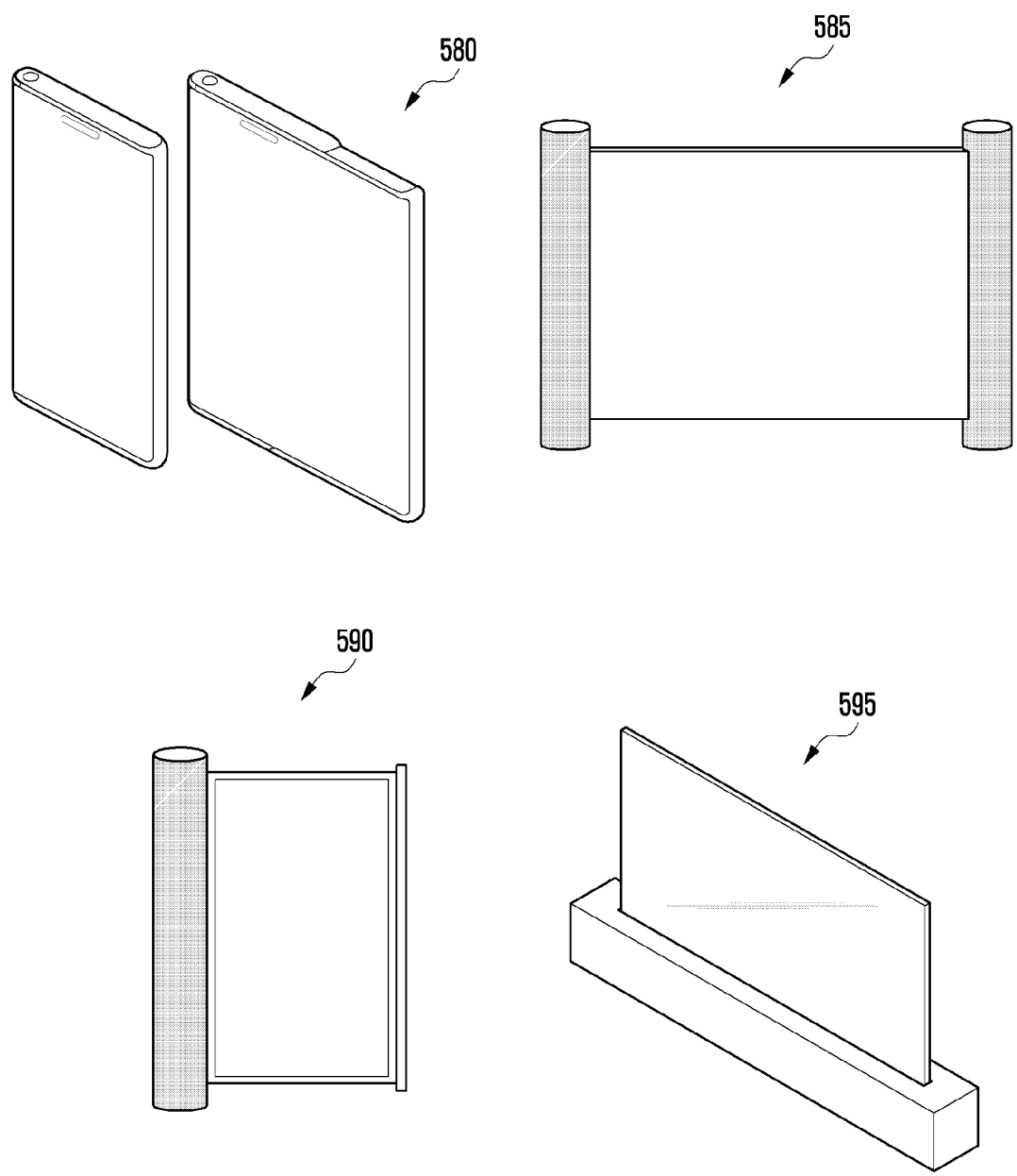

Referring to FIG. 5G, the electronic device may include various form factors such as a rollable (or slidable) device 580, 585, 590, or 595 in which an area of the display is expandable in a rolling and/or a slide manner. According to an embodiment, as illustrated in FIG. 5G, the electronic devices may be implemented in various forms, and a display may be provided in various types according to an implementation form of an electronic device.

According to another embodiment, the electronic device (e.g., 580, 585, 590, or 595) may include a roll-up type display (e.g., a rollable display) in a housing. According to an embodiment, the electronic device may mean an electronic device in which at least one portion thereof can be wound (or rolled) or be accommodated inside a housing (not shown) due to a display capable of bending deformation. According to user needs, the electronic device may have a display which is unfoldable or has a larger area exposed to the outside, so as to expand and then use a screen display area. For example, the electronic device 101 is configured such that the area, in which a display is exposed to the outside, varies according to the extent to which a user unfolds the display.

According to yet another embodiment, the electronic device 101 may include a housing structure for protecting a display rolled in a circular shape, and may operate as a structure in which the display is opened (e.g., expanded) inside a housing. For example, as illustrated in FIG. 5G, at least a part of a display is accommodated in a cylindrical housing or a flat-plate housing.

According to yet another embodiment, in a state change (e.g., an open state, an intermediate state, or a closed state) of a display, the electronic device 101 may be manually switched by a user, or be automatically switched through a drive mechanism (e.g., a drive motor, a reduction gear module, and/or a gear assembly) disposed inside a housing. According to an embodiment, an operation of the drive mechanism may be triggered based on a user input.

According to yet another embodiment, a user input for triggering an operation of the drive mechanism may include a touch input, a force touch input, and/or a gesture input through a display module 160. For example, in case that signals are generated from various sensors such as a pressure sensor, the electronic device 101 is switched from a closed state to an open state or from an open state to a closed state. For example, the electronic device 101 is carried or gripped by hand, a squeeze gesture, in which a part (e.g., the palm of the hand or the finger) of the hand presses a part within a designated section of the electronic device 101, is detected through a sensor, and in response thereto, the electronic device 101 may be switched from a closed state to an open state or from an open state to a closed state.

In another embodiment, a user input for triggering an operation of the drive mechanism may include a sound input (or voice input) or an input through a physical button which is visually exposed to the outside of a housing.

As described above, according to various embodiments, the electronic device 101 may be implemented as a device capable of changing a display area of a display in various rolling (or slide) methods.

Figure 6:
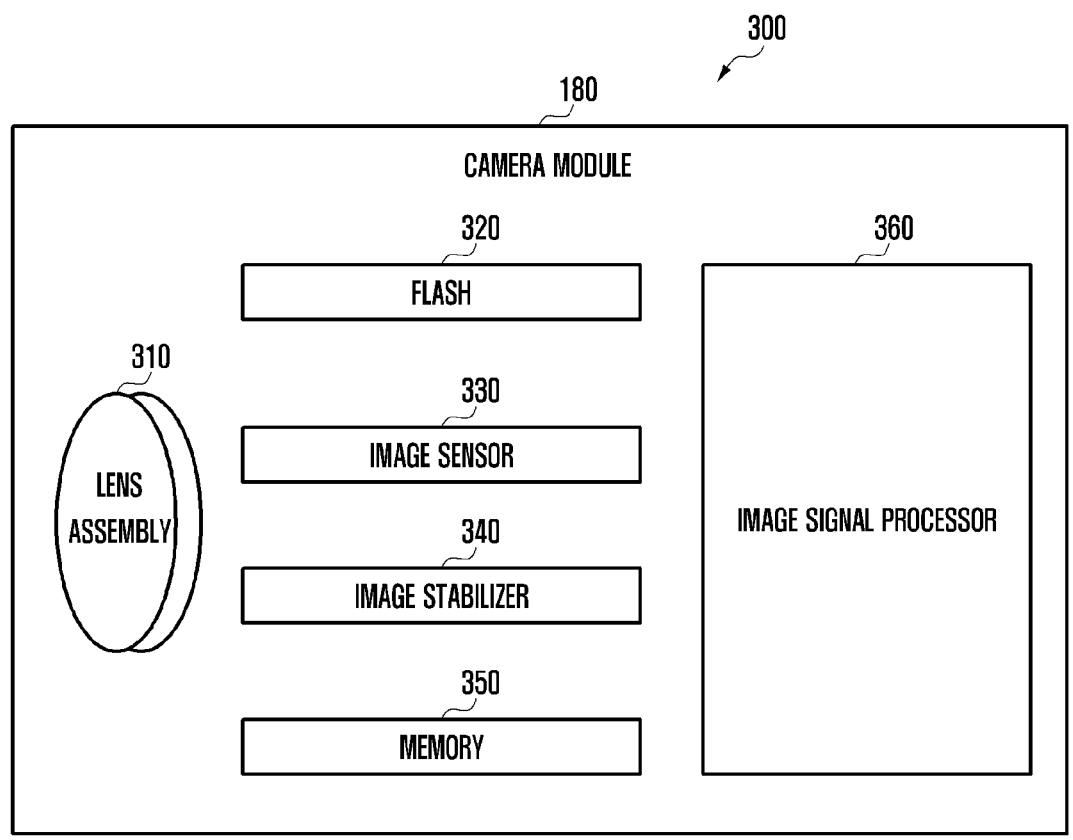
FIG. 6 is a block diagram illustrating a camera module according to an embodiment of the disclosure.

FIG. 6 is a block diagram illustrating the camera module according to an embodiment of the disclosure.

Referring to FIG. 6, in a diagram 300, the camera module 180 may include a lens assembly 310, a flash 320, an image sensor 330, an image stabilizer 340, memory 350 (e.g., buffer memory), or an image signal processor 360.

The lens assembly 310 may collect light emitted or reflected from an object whose image is to be taken. The lens assembly 310 may include one or more lenses. According to an embodiment, the camera module 180 may include a plurality of lens assemblies 310. In such a case, the camera module 180 may form, for example, a dual camera, a 360-degree camera, or a spherical camera. Some of the plurality of lens assemblies 310 may have the same lens attribute (e.g., view angle, focal length, auto-focusing, f number, or optical zoom), or at least one lens assembly may have one or more lens attributes different from those of another lens assembly. The lens assembly 310 may include, for example, a wide-angle lens or a telephoto lens.

The flash 320 may emit light that is used to reinforce light reflected from an object. According to an embodiment, the flash 320 may include one or more light emitting diodes (LEDs) (e.g., a red-green-blue (RGB) LED, a white LED, an infrared (IR) LED, or an ultraviolet (UV) LED) or a xenon lamp.

The image sensor 330 may obtain an image corresponding to an object by converting light emitted or reflected from the object and transmitted via the lens assembly 310 into an electrical signal. According to an embodiment, the image sensor 330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 330 may be implemented using, for example, a charged coupled device (CCD) sensor or a complementary metal oxide semiconductor (CMOS) sensor.

The image stabilizer 340 may move the image sensor 330 or at least one lens included in the lens assembly 310 in a particular direction, or control an operational attribute (e.g., adjust the read-out timing) of the image sensor 330 in response to the movement of the camera module 180 or the electronic device 101 including the camera module 180. This allows compensating for at least part of a negative effect (e.g., image blurring) by the movement on an image being captured. According to an embodiment, the image stabilizer 340 may sense such a movement by the camera module 180 or the electronic device 101 using a gyro sensor (not shown) or an acceleration sensor (not shown) disposed inside or outside the camera module 180. According to an embodiment, the image stabilizer 340 may be implemented, for example, as an optical image stabilizer.

The memory 350 may store, at least temporarily, at least part of an image obtained via the image sensor 330 for a subsequent image processing task. For example, if image photographing is delayed due to shutter lag or multiple images are quickly captured, a raw image obtained (e.g., a Bayer-patterned image, a high-resolution image) may be stored in the memory 350, and its corresponding copy image (e.g., a low-resolution image) may be previewed via the display device 160. Thereafter, if a specified condition is met (e.g., by a user's input or system command), at least part of the raw image stored in the memory 350 may be obtained and processed, for example, by the image signal processor 360. According to an embodiment, the memory 350 may be configured as at least part of the memory 130 or as a separate memory that is operated independently from the memory 130.

The image signal processor 360 may perform one or more image processing with respect to an image obtained via the image sensor 330 or an image stored in the memory 350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 360 may perform control (e.g., exposure time control or read-out timing control) with respect to at least one (e.g., the image sensor 330) of the components included in the camera module 180. An image processed by the image signal processor 360 may be stored back in the memory 350 for further processing, or may be provided to an external component (e.g., the memory 130, the display device 160, the electronic device 102, the electronic device 104, or the server 108) outside the camera module 180. According to an embodiment, the image signal processor 360 may be configured as at least part of the processor 120, or as a separate processor that is operated independently from the processor 120. If the image signal processor 360 is configured as a separate processor from the processor 120, at least one image processed by the image signal processor 360 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 7:
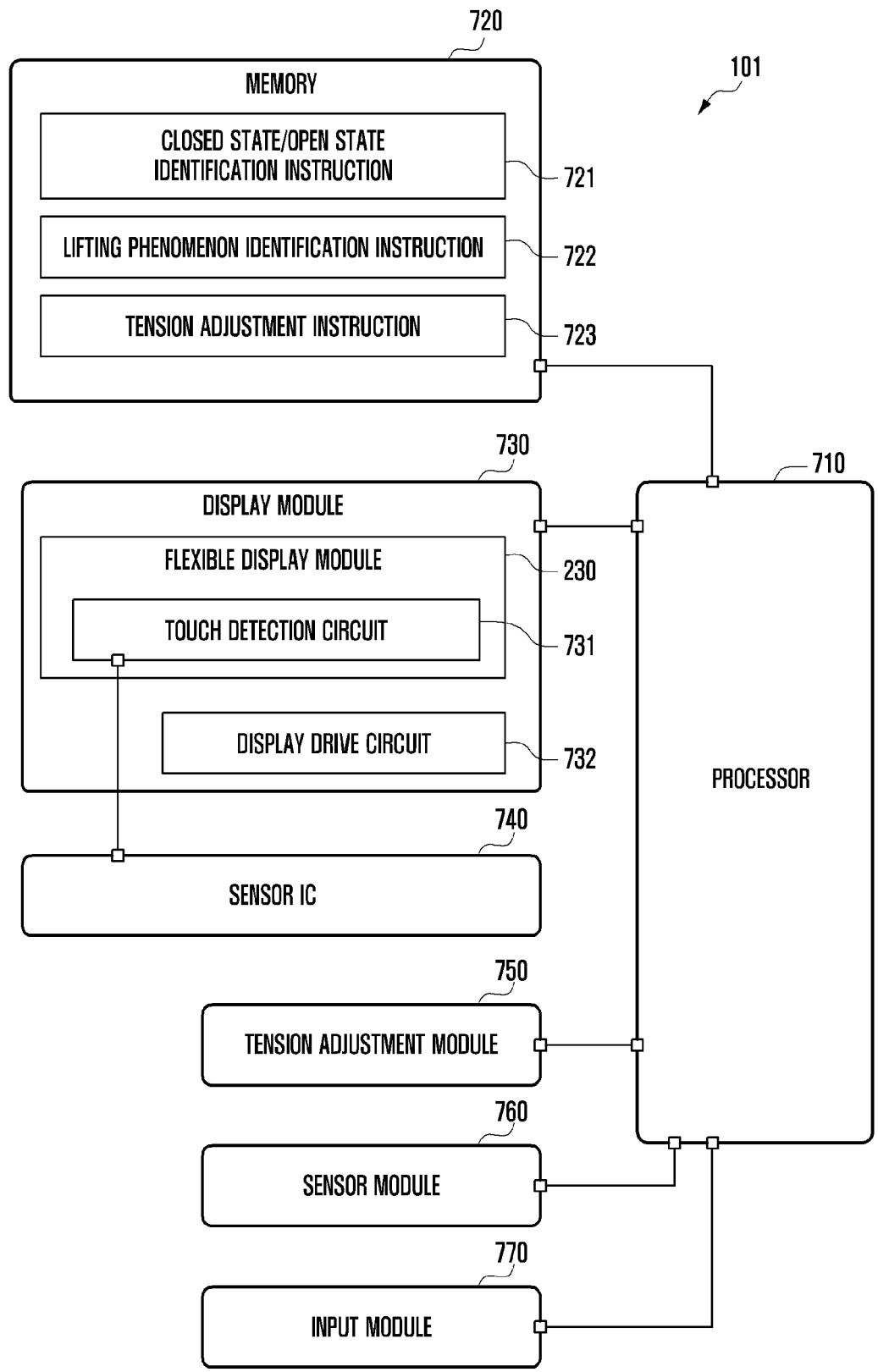
FIG. 7 is a block diagram of the electronic device in FIG. 2A according to an embodiment of the disclosure.

FIG. 7 is a block diagram of the electronic device in FIG. 2A according to an embodiment of the disclosure.

Referring to FIG. 7, in an embodiment, the electronic device 101 may include a processor 710 (e.g., the processor 120 in FIG. 1), a memory 720 (e.g., the memory 130 in FIG. 1), a display module 730 (e.g., the display module 160 in FIG. 1), a sensor integrated circuit (IC) 740, a tension adjustment module 750, a sensor module 760 (e.g., the sensor module 176 in FIG. 1), or an input module 770 (e.g., the input module 150 in FIG. 1). According to various embodiments, the electronic device 101 may be the electronic device 101 in FIG. 1, or may be implemented by including at least a part of elements of the electronic device 101 in FIG. 1 or by additionally including other elements. According to some embodiments, the electronic device 101 may be implemented by omitting a part of elements of the electronic device 101 in FIG. 1.

For example, the processor 710 (e.g., the processor 120 in FIG. 1) includes a micro controller unit (MCU), and may drive an operating system (OS) or an embedded software program to control multiple hardware elements connected to the processor 710. For example, the processor 710 controls multiple hardware elements according to instructions (e.g., the program 140 in FIG. 1) stored in the memory 720 (e.g., the memory 130 in FIG. 1).

According to another embodiment, the processor 710 (e.g., the processor 120 in FIG. 1) may capture an image, based on a designated output resolution in the first state (e.g., an open state or a closed state) of the display module 160. According to an embodiment, the processor 710 may display a preview screen, based on a first preview resolution according to the first state of the display module 160. According to an embodiment, the processor 710 may detect a state change in which the display module 160 is switched from a first state to a second state while a preview screen is displayed. According to an embodiment, the processor 710, based on the detection of the state, may display a preview screen, based on a second preview resolution according to the second state of the display module 160.

According to yet another embodiment, the processor 710 may identify a hidden area, based on a variance (e.g., a contraction amount or an expansion amount) of the display module 160. According to an embodiment, the processor 710 may obtain a first image based on an output resolution and a second image based on a hidden area and then provide (e.g., store) same, based on the state change of the display module 160 while image capturing is performed. According to an embodiment, the processor 120 may capture an image corresponding to a preview intended by a user according to a variance (e.g., a contraction amount or an expansion amount) of the display module 160 when image capturing is performed in the electronic device 101 including the expandable display module 160, and may provide a continuous and natural image (e.g., an image of which the size and ratio have been corrected) to the user at the time of image playback corresponding thereto.

For example, the display module 730 (e.g., the display module 160 in FIG. 1) includes the flexible display 230 or a display drive circuit 732.

According to yet another embodiment, the flexible display 230 may have a part (e.g., the bendable section ② in FIG. 4) implemented to be withdrawn from the inner space of the electronic device 101. For example, in case that the electronic device 101 is switched from a closed state (see FIG. 2A) to an open state (see FIG. 3A), the bendable section ② of the flexible display 230 is withdrawn from the inner space of the electronic device 101 in a sliding manner, and thus a screen may be expanded. In case that the electronic device 101 is switched from an open state to a closed state, the bendable section ② may be inserted into the inner space of the electronic device 101 in a sliding manner, and thus a screen may be reduced.

According to yet another embodiment, the display drive circuit 732 may be a circuit for controlling the flexible display 230, and for example, includes a display drive integrated circuit (DDI) or a DDI chip. According to an embodiment, the display drive circuit 732 may include a touch display driver IC (TDDI) disposed in a chip on panel (COP) manner or a chip on film (COF) manner. The processor 710 (e.g., an AP) may be disposed on the printed circuit substrate 490 in FIG. 4, and a signal commanded by the processor 710 may be delivered to the display drive circuit 732. The display drive circuit 732 may function as a signal passage between the flexible display 230 and the processor 710 so as to control pixels through TFTs in the flexible display 230. For example, the display drive circuit 732 has a function of turning on or off pixels included in the flexible display 230, and be electrically connected to gate electrodes of the TFTs.

The display drive circuit 732 may have a function of adjusting the amount of RGB (red, green, blue) signals of a pixel to make a color difference, and be electrically connected to source electrodes of the TFTs. The TFT may have a gate line for electrically connecting the display drive circuit 732 and the gate electrode of the TFT, and a source line (or a data line) for electrically connecting the display drive circuit 732 and the source electrode of the TFT. According to various embodiments, the display drive circuit 732 may also operate in response to a red, green, blue, white (RGBW) type in which a white pixel is added to an RGB pixel.

According to yet another embodiment, the display drive circuit 732 may be a DDI package. The DDI package may include a DDI (or a DDI chip), a timing controller (T-CON), a graphic RAM (GRAM), or power generating circuits. According to an embodiment, the graphic RAM may be omitted, or a memory, which is separately provided from the display drive circuit 732, may be utilized therefor.

The timing controller may convert a data signal input from the processor 710 into a signal required by the DDI. The timing controller may perform a function of adjusting input data information to a signal suitable for a gate driver (or a gate IC) and a source driver (or a source IC) of the DDI.

The graphic RAM may function as a memory for temporarily storing data to be input to a driver (or IC) of the DDI. The graphic RAM may store an input signal and again send same to the driver of the DDI, and at this time, the signal may be processed by interacting with the timing controller.

The power generating circuits may generate voltages for driving the flexible display 230 so as to supply required voltages to the gate driver and the source driver of the DDI.

According to yet another embodiment, the flexible display 230 may include a touch detection circuit (or a touch sensor) 731. For example, the touch detection circuit 731 includes a transmitter (Tx) including multiple first electrode lines (or multiple drive electrodes), and a receiver (Rx) including multiple second electrode lines (or multiple receiving electrodes).

According to yet another embodiment, the sensor integrated circuit (IC) 740 may supply a current (e.g., an alternating current) to the touch detection circuit 731, and an electric field may be formed between the transmitter and the receiver of the touch detection circuit 731. The sensor IC 740 may convert an analog signal obtained through the touch detection circuit 731 into a digital signal. For example, in case that a finger touches a screen (see the screen 2301 in FIG. 2A or 3A), or reaches within a critical distance from the screen, a change in an electric field may occur, and a change in capacitance (or a voltage drop) in response thereto may occur. In case that the change in capacitance is equal to or more than a threshold value, the sensor IC 740 may generate an electrical signal associated with a coordinate on a screen as a valid touch input or a hovering input so as to output same to the processor 710. The processor 710 may recognize a coordinate on the screen, based on an electrical signal received from the sensor IC 740. The sensor IC 740 may be disposed on the printed circuit substrate 490 in FIG. 4.

According to yet another embodiment, the sensor IC 740 may include a touch controller integrated circuit (IC). The touch controller IC may perform various functions such as noise filtering, noise removal, and sensing data extraction in relation to the touch detection circuit 731. According to various embodiments, the touch controller IC may include various circuits such as at least one of an analog-digital converter (ADC), a digital signal processor (DSP), or a micro control unit (MCU).

According to yet another embodiment, for example, the tension adjustment module 750 is included in a tension structure for providing tension which acts on the flexible display 230, or is connected to the tension structure. The tension adjustment module 750 may adjust tension acting on the flexible display 230 according to a control signal from the processor 710.

For example, the sensor module 760 (e.g., the sensor module 176 in FIG. 1) measures a physical quantity or detect an operation state of the electronic device 101 so as to generate an electrical signal or a data value corresponding thereto. According to an embodiment, for example, the sensor module 760 includes a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. According to various embodiments, the sensor module 760 may further include at least one control circuit for controlling at least one sensor included therein.

According to yet another embodiment, the sensor module 760 may be a device for detecting an inclined angle of the electronic device 101 with respect to at least one of the ground or a direction in which the electronic device 101 is oriented in a 3D coordinate system, by using sensing data obtained from at least one sensor among multiple sensors. However, the sensor module is not limited thereto, and various sensors capable of obtaining information (e.g., azimuth) on a tilted angle of the electronic device 101 may be used. For example, an acceleration sensor senses information on a linear movement of at least one of the electronic device 101 or a 3-axis acceleration of the electronic device 101. A gyro sensor may sense information related to rotation of the electronic device 101, and a geomagnetic sensor may sense information on a direction in which the electronic device 101 is oriented in an absolute coordinate system.

According to yet another embodiment, the processor 710 may use 9-axis motion data obtained using the gyro sensor and the geomagnetic sensor. For example, the processor 710 may form a virtual coordinate space, based on the azimuth (e.g., a yaw, pitch, and/or roll value) measured in the 9-axis motion data, to divide one area of the virtual coordinate space into horizontal direction (landscape) ranges, and may divide the other an area into vertical direction (portrait) ranges.

For example, the input module 770 (e.g., the input module 150 in FIG. 1) receives a user input. For example, the input module 770 includes a key input device. According to an embodiment, for example, the key input device includes various types of keys such as a physical key, a capacitive key, or an optical key. The input module 770 may include other various types of user interfaces.

According to yet another embodiment, the memory 720 (e.g., the memory 130 in FIG. 1) may store a closed state/open state identification instruction 721, a lifting phenomenon identification instruction 722, or a tension adjustment instruction 723.

According to yet another embodiment, the closed state/open state identification instruction 721 may include instructions which cause the processor 710 to identify a closed state (e.g., see FIG. 2A), an open state (e.g., see FIG. 3A), or the switching between a closed state and an open state of the electronic device 101, by using at least one sensor included in the sensor module 760.

For example, the processor 710 identifies a closed state, an open state, or the switching between a closed state and an open state of the electronic device 101, by using a magnetic sensor (e.g., a Hall IC) of the sensor module 760. The magnetic sensor may be disposed in the support member assembly 400 (e.g., the first support member 410) in FIG. 4. A magnetic body (e.g., a magnet) may be disposed on the sliding plate 220 in FIG. 4. In case that the electronic device 101 is in an open state, compared with a closed state, the magnetic sensor becomes farther away from the magnetic body, and thus may be difficult to detect the magnetic body. In case that the electronic device 101 is in a closed state, the magnetic sensor is positioned to be adjacent to or face the magnetic body, and thus may detect the magnetic body. The magnetic sensor may provide an electrical signal generated by detecting the magnetic body to the processor 710, and the processor 710 may identify the closed state of the electronic device 101, based on the electrical signal from the magnetic sensor.

According to yet another embodiment, the magnetic sensor may be continuously driven or periodically driven using normal power. In case that an electrical signal from a magnetic sensor is continuously or periodically detected, the processor 710 may identify a closed state of the electronic device 101. According to an embodiment, the processor 710 may identify that the electronic device 700 is switched from an open state to a closed state or from a closed state to an open state, by using the magnetic sensor. According to some embodiments, in case that the electronic device 700 is in an open state, the magnetic sensor may be positioned to be adjacent to or to face a magnetic body, and thus be implemented to detect the magnetic body. According to various embodiments, the magnetic sensor may be positioned on the sliding plate 220 in FIG. 4, and the magnetic body may be positioned in the support member assembly 400 in FIG. 4.

According to yet another embodiment, a first magnetic sensor and a second magnetic sensor may be arranged at different positions of the support member assembly 400 (e.g., the first support member 410) in FIG. 4. The magnetic body may be disposed on the sliding plate 220 in FIG. 4. In case that the electronic device 101 is in a closed state, the first magnetic sensor may be positioned to be adjacent to or face the magnetic body, and thus may detect the magnetic body. In case that the electronic device 101 is in an open state, the second magnetic sensor may be positioned to be adjacent to or face the magnetic body, and thus may detect the magnetic body. In case that an electrical signal from the first magnetic sensor is detected, the processor 710 may identify a closed state of the electronic device 101. In case that an electrical signal from the second magnetic sensor is detected, the processor 710 may identify an open state of the electronic device 101.

According to various embodiments, a closed state, an open state, or the switching between a closed state and an open state of the electronic device 101 may be identified using various other sensors. For example, referring to FIG. 4, a sensor capable of detecting at least one of the position or movement of the sliding plate 220, the flexible display 230, or the support sheet 470 is utilized. For another example, referring to FIG. 4, a sensor for detecting rotation of the pulley 460 may be utilized.

According to some embodiments (not shown), a first contact may be disposed in the support member assembly 400 (e.g., the first support member 410) in FIG. 4, and a second contact may be disposed on the sliding plate 220 in FIG. 4. In case that the electronic device 101 is in a closed state or an open state, the first contact and the second contact may be physically touched and be electrified with each other. The processor 710 may identify a closed state, an open state, or the switching between a closed state and an open state of the electronic device 101, based on a current flow between the first contact and the second contact.

According to yet another embodiment, the lifting phenomenon identification instruction 722 may include instructions which cause the processor 710 to identify whether there is a lifting phenomenon for the bendable section ② (e.g., see FIG. 4) of the flexible display 230, by using the touch detection circuit 731 and the sensor IC 740. The processor 710 may detect a lifting phenomenon for the bendable section ② of the flexible display 230, based on the lifting phenomenon identification instruction 722.

According to yet another embodiment, the tension adjustment instruction 723 may include instructions which cause the processor 710 to adjust the tension of the flexible display 230, by using the tension adjustment module 750.

The electronic device 101 according to an embodiment of the disclosure may include a camera module (e.g., the camera module 180 in FIG. 1), a display module (e.g., the display module 160 in FIG. 1), and a processor (e.g., the processor 120 in FIG. 1 or the processor 710 in FIG. 7), and the processor 120 may be configured to capture an image, based on a designated output resolution in the first state of the display module 160, display a preview screen, based on a first preview resolution according to the first state of the display module 160, detect a state change in which the display module 160 is switched from the first state to the second state, display a preview screen, based on a second preview resolution according to the second state of the display module 160, identify a hidden area, based on a variance of the display module 160, and obtain a first image based on the output resolution and a second image based on the hidden area, based on a state change of the display module 160 while image capturing is performed.

According to yet another embodiment, the processor 120 may be configured to control the camera module 180 so as to capture an image, based on the designated output resolution while image capturing is performed. According to various embodiments of the disclosure, the output resolution may include a resolution corresponding to the entire preview screen corresponding to an open state of the display module 160, or an initial image resolution configured in response to the first state at the time point of photographing.

According to yet another embodiment, the processor 120 may be configured to control the display module 160 so as to display a preview screen associated with an image obtained through the camera module 180, based on a first preview resolution according to the first state in case that image capturing is executed. According to various embodiments of the disclosure, the processor 120, based on the state change while image capturing is executed, may be configured to control the display module 160 so as to display a preview screen associated with an image obtained through the camera module 180, based on a second preview resolution according to the second state.

According to yet another embodiment, the state change may include a change in which a display ratio of a display area of the display module 160 is changed, based on the switching of the display module 160 from an open state to a closed state or from a closed state to an open state while the image capturing is performed.

According to yet another embodiment, the processor 120 may be configured to generate the hidden area, based on a contraction amount of the display module 160 in case that the display module 160 is in a state change from an open state to a closed state. According to various embodiments of the disclosure, the processor 120 may be configured to generate the hidden area, based on an expansion amount of the display module 160 in case that the display module 160 is in a state change of the switching from a closed state to an open state.

According to yet another embodiment, the processor 120 may be configured to process so as to hide the remaining areas other than a preview area within the output resolution area in case that the display module 160 module is in a state change of the switching from an open state to a closed state. According to various embodiments of the disclosure, the processor 120 may be configured to expand a preview area within the output resolution area, and hide the expanded preview area in case that the display module 160 is in a state change of the switching from a closed state to an open state.

According to yet another embodiment, the processor 120 may be configured to maintain the output resolution, based on the state change, and generate a hidden area corresponding to the state change of the display module 160. According to various embodiments of the disclosure, the hidden area may include an area which is variable according to the variance of the display module and is not visible as a preview, in addition to an area corresponding to the preview screen, and may indicate an object area in which at least one of a designated effect of blackout, blur, or mono is processed.

According to yet another embodiment, the processor 120, while image capturing is performed, may be configured to obtain a first image captured according to the output resolution, and obtain a second image, based on a post-processing correction of an area corresponding to the hidden area in the first image.

According to yet another embodiment, the first image may include an image captured based on the output resolution. According to various embodiments of the disclosure, the second image may include an image portion captured based on the output resolution, and an image portion in which a designated effect has been processed on the hidden area according to the state change of the display module.

According to yet another embodiment, the processor 120, while the image capturing is performed, may be configured to simultaneously capture a first image captured according to the output resolution and a second image excluding the hidden area, and separately save the first image and second image at the end of image capturing.

Hereinafter, an operation method of the electronic device 101 will be described in detail. The operations performed in the electronic device 101 to be described below may be executed by a processor (e.g., the processor 120 in FIG. 1 and/or the processor 710 in FIG. 7) (hereinafter, referred to as the "processor 120") including at least one processing circuitry of the electronic device 101. According to an embodiment, the operations performed in the electronic device 101 may be stored in the memory 130, and, when being executed, may be executed by instructions which cause the processor 120 to operate.

FIG. 8 is a flowchart illustrating an operation method of an electronic device according to an embodiment of the disclosure.

Referring to FIG. 8, in operation 801, the processor 120 of the electronic device 101 may detect the performing of image capturing. According to an embodiment, the processor 120 may detect a state in which an execution screen (or a user interface) (e.g., a preview) of an application (e.g., a camera application) associated with image capturing is displayed through the display module 160. According to another embodiment, the processor 120 may detect the performing of image capturing, based on a user input for executing image capturing (e.g., video capturing) while the execution screen of the application is displayed through the display module 160.

In operation 803, the processor 120 may capture an image, based on a designated output resolution (or an initial resolution) in the first state of the display module 160. According to an embodiment, in case that image capturing is executed, the processor 120 may control the camera module 180 so as to capture an image, based on an output resolution corresponding to a first state (e.g., an open state, an intermediate state, or a closed state). According to yet another embodiment, the output resolution may include a resolution corresponding to the entire preview screen corresponding to an open state of display module 160, or an initial image resolution corresponding to a current state (e.g., the first state) at the time point of photographing.

Figure 9A:
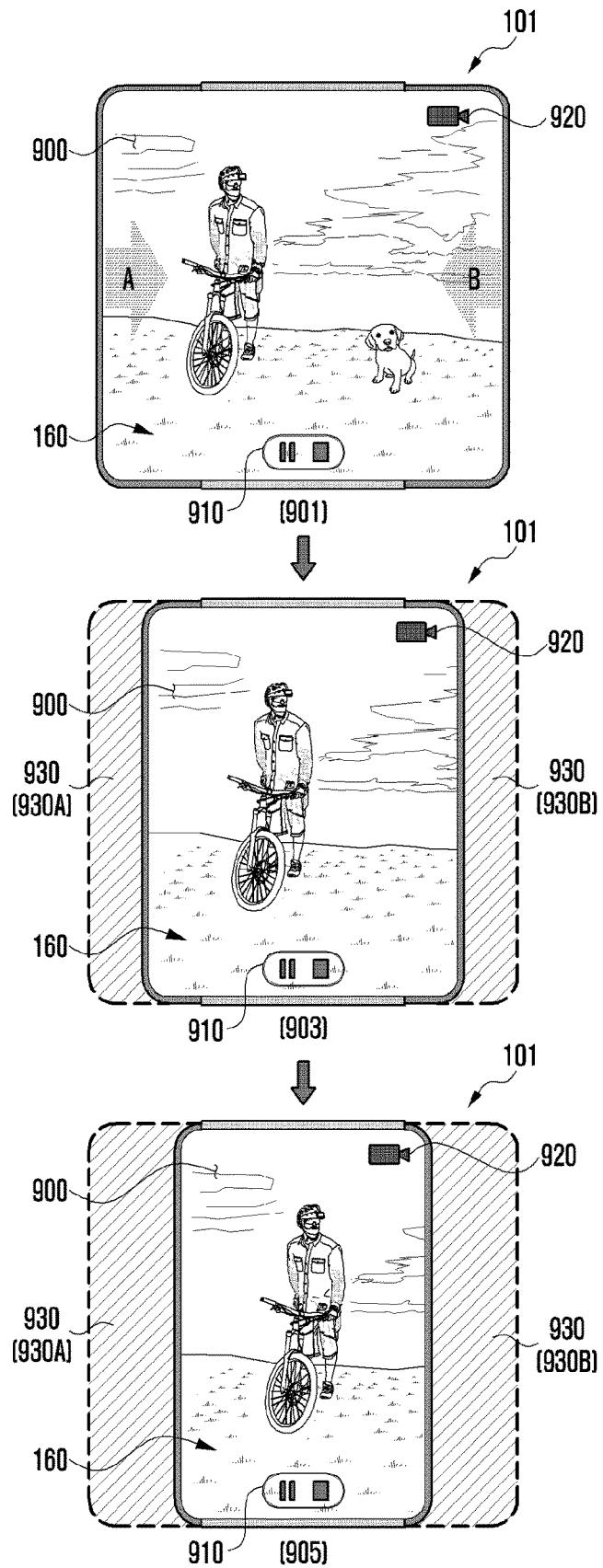
FIGS. 9A and 9B are views illustrating state changes of a display while photographing is performed and photographing examples according thereto, in an electronic device according to various embodiments of the disclosure.
Figure 9B:
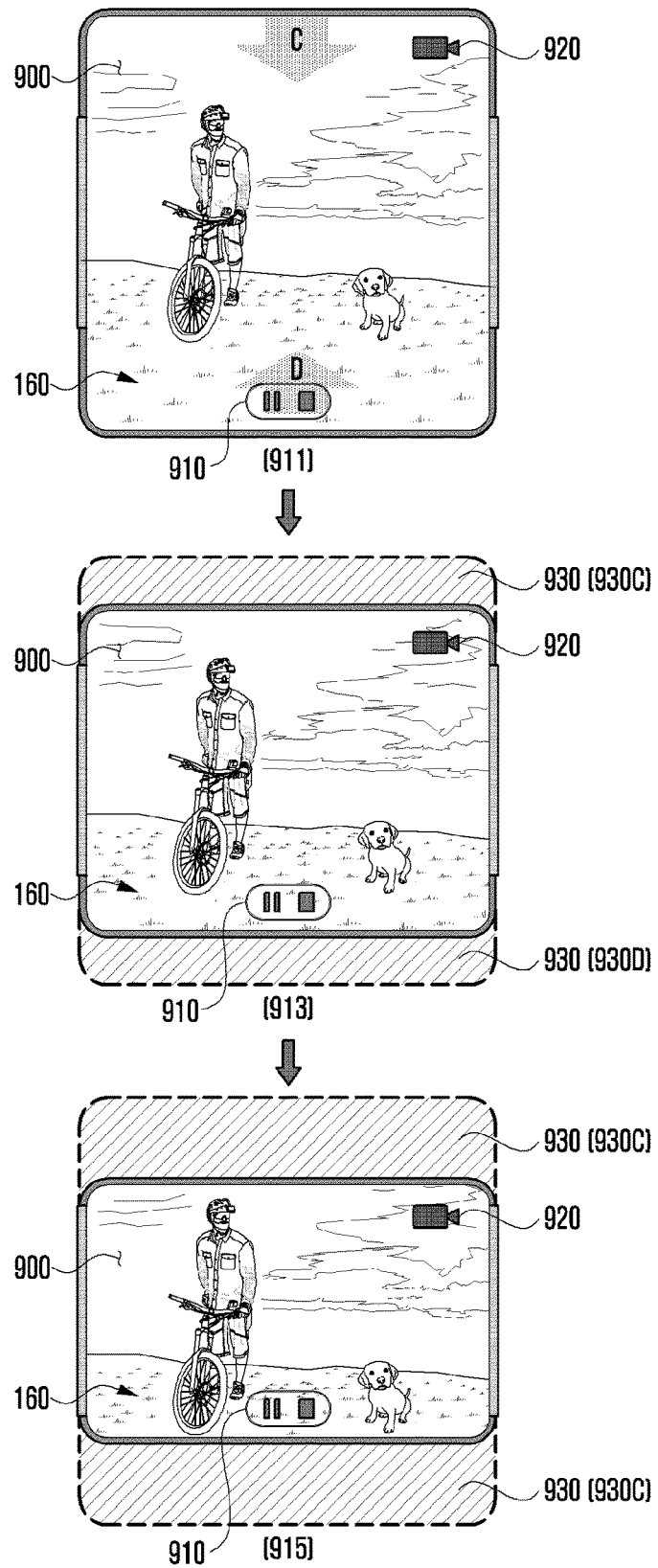

In operation 805, the processor 120 may display a preview screen, based on a first preview resolution according to the first state of the display module 160. According to yet another embodiment, in case that image capturing is performed, the processor 120 may control the display module 160 so as to display a preview screen associated with an image obtained through the camera module 180, based on the first preview resolution (e.g., a preview resolution in an open state, a preview resolution in an intermediate state, or a preview resolution in a closed state) according to the first state (or a current state) (e.g., an open state, an intermediate state, or a closed state) of the electronic device 101. Examples thereof are illustrated in FIGS. 9A and 9B and/or FIGS. 12A and 12B.

According to yet another embodiment, operation 803 and operation 805 are illustrated for convenience of explanation, and the order of operation 803 and operation 805 is not limited to the illustrated order. For example, operation 803 and operation 805 are performed in parallel or simultaneously, based on the time point of executing image capturing.

In operation 807, the processor 120 may detect a state change in which the display module 160 is changed from the first state (or a current state) (e.g., an open state, an intermediate state, or a closed state) to the second state (or a state different from the first state) (e.g., a closed state, an intermediate state or an open state). For example, the processor 120 detects a state change in which the preview resolution of the display module 160 is changed (or the display ratio of the display area is changed) while image capturing is performed.

According to yet another embodiment, the processor 120 may identify that the display module 160 is switched from an open state to a closed state or from a closed state to an open state while image capturing is performed. According to an embodiment, the state change may include a change in which a display ratio of a display area of display module 160 is changed, based on the switching of the display module 160 from an open state to a closed state or from a closed state to an open state while image capturing is performed.

In operation 809, the processor 120 may display a preview screen, based on a second preview resolution according to the second state of the display module 160. According to yet another embodiment, while image capturing is performed, the processor 120 may control the display module 160 so as to display a preview screen associated with an image obtained through the camera module 180, based on the second preview resolution according to the second state (e.g., a state different from the first state) (e.g., the change from an open state to a closed state or from a closed state to an open state) of the electronic device 101. Examples thereof are illustrated in FIGS. 9A and 9B and/or FIGS. 12A and 12B.

In operation 811, the processor 120 may identify a hidden area, based on a variance (e.g., an expansion amount or a contraction amount) of the display module 160. According to yet another embodiment, in case that the change from the first state to the second state of the display module 160 is a state change in which the display module is switched from an open state to a closed state, the processor 120 may generate a hidden area, based on (or in proportion to) a contraction amount (or a preview ratio reduced and thus changed) of the display module 160. According to another embodiment, in case that the change from the first state to the second state of the display module 160 is a state change in which the display module is switched from a closed state to an open state, the processor 120 may generate a hidden area, based on (or in proportion to) an expansion amount (or a preview ratio expanded and thus changed) of the display module 160.

According to yet another embodiment, the hidden area may be generated based on an output resolution in actual photographing and a preview resolution (e.g., a preview ratio), and in the entire area corresponding to the output resolution, may include the remaining areas (or an area which is not visible as a preview) which are variable according to the variance of the display module 160, in addition to an area corresponding to the preview screen. According to an embodiment, the hidden area may indicate a processing object area in which a designated effect (e.g., blackout, blur, and/or mono) is processed. According to yet another embodiment, the hidden area will be described with reference to drawings to be described later.

In operation 813, the processor 120 may capture an image, based on the designated output resolution in the first state of the display module 160. According to an embodiment, the processor 120 may capture an image (e.g., a raw image), based on the output resolution (or an initial resolution) which is initially set at the time point of image capturing.

In operation 815, the processor 120 may obtain a first image based on the output resolution and a second image based on the hidden area. According to an embodiment, as an image actually obtained at the time of image capturing (or storage), the processor 120 may generate a first image (e.g., a raw image) captured according to the output resolution, and a second image (e.g., a correction image) in which the first image is processed using post-processing (e.g., designated effect processing) according to the hidden area, and may save at least one of the first image or the second image. According to another embodiment, the processor 120 may simultaneously capture (e.g., record) the first image and the second image excluding the hidden area at the time of image capturing, and may also separately save the first image and the second image at the time of saving.

FIGS. 9A and 9B are views illustrating state changes of a display while photographing is performed, and photographing examples according thereto, in an electronic device according to various embodiments of the disclosure.

According to an embodiment, FIGS. 9A and 9B may represent examples in which the electronic device 101 starts image capturing in an open state of the display module 160, and a preview screen is changed and photographing is performed as the display module 160 is switched from an open state to a closed state during image capturing. According to an embodiment, FIG. 9A may represent examples in which the display module 160 of the electronic device 101 is reduced (slid-in), based on image capturing in the vertical direction in an open state. According to an embodiment, FIG. 9B may represent examples in which the display module 160 of the electronic device 101 is reduced in the vertical direction, based on image capturing in the vertical direction in an open state.

Referring to FIG. 9A, in example <901>, the electronic device 101 may perform image capturing, based on the horizontal direction in an open state of the display module 160 according to a user intention. According to another embodiment, when image capturing is performed, the electronic device 101 may provide various objects 910 and 920 associated with the image capturing through a preview screen 900. For example, the electronic device 101 arranges, on a designated area on the preview screen 900, a first object 910 (e.g., a control object) capable of controlling functions such as at least one of pause, restart, or end of image capturing, or a second object 920 (e.g., a recording object) representing a state (e.g., a recording state) in which image is capturing, and thus may provide same.

According to yet another embodiment, the electronic device 101 may be switched from an open state to a closed state, based on a user input. For example, in the electronic device 101, an area of the display is reduced in at least one of a rolling manner or a sliding manner in direction A and/or direction B. In a state change (e.g., the switching from an open state to a closed state) of the display module 160, the electronic device 101 may be manually switched by a user, or be automatically switched through a drive mechanism (e.g., a drive motor, a reduction gear module, and/or a gear assembly) disposed inside a housing.

Example <903> may represent an intermediate state in which the electronic device 101 is switching from an open state to a closed state. Example <905> may represent a closed state of the electronic device 101. In an embodiment, an intermediate state may represent all operable states between the open state of example <901> and the closed state of example <905>.

In example <903> and example <905>, the electronic device 101 may reduce the preview screen 900 in the horizontal direction according to a state change (e.g., rolling or slide) of the display module 160. According to an embodiment, in case that a state of the display module 160 is changed, the electronic device 101 may maintain an output resolution (e.g., a resolution corresponding to an area of the entire preview screen 900 in an open state) in actual photographing as it is, and may set the remaining areas (e.g., an invisible area) excluding an area of the preview screen 900, among the entire area corresponding to the output resolution, as the hidden area 930.

According to yet another embodiment, as in example <901>, the electronic device 101 may be set to have an output resolution, based on the preview screen 900 of the full screen size at the time point of image capturing (e.g., recording start). According to an embodiment, as in example <903> and example <905>, when a state changes, the electronic device 101 may internally process (or may background-process) the hidden area 930 for a correction image in response to the preview screen 900 (or a display ratio of the display area) reduced according to a user intention while continuously performing image capturing in a state of fixing the output resolution set at the time point of the image capturing. According to an embodiment, the hidden area 930 may have a size differently set according to a variance (e.g., a contraction amount or an expansion amount) of the display module 160. For example, as illustrated in FIGS. 9A and 9B, the hidden area 930 may be variable (e.g., expanded) in proportion to the contraction amount of the display module 160.

According to yet another embodiment, the hidden area 930 may be variously set according to the form factor (or rolling or sliding) type of the electronic device 101. For example, in case that the electronic device 101 has a form factor in which the electronic device slides in any one direction, the hidden area 930 is integrated into one area (e.g., an area corresponding to the first hidden area 930A or the second hidden area 930B) in one direction or in a direction opposite to the one direction, in response to a state change in any one direction of the display module 160. For another example, in case that the electronic device 101 has a form factor in which the electronic device slides in both directions, the hidden area 930 may be divided into two areas (e.g., areas corresponding to the first hidden area 930A and the second hidden area 930B) in both directions, in response to a state change in both directions of the display module 160.

According to yet another embodiment, in case that the display module 160 is switched from an open state to a closed state, the electronic device 101 may display the preview screen 900 excluding an area corresponding to the hidden area 930 in response to the preview resolution of the display module 160 reduced in the horizontal direction, while continuously performing photographing, based on the output resolution set at the time point of image capturing.

Referring to FIG. 9B, in example <911>, the electronic device 101 may perform image capturing, based on the vertical direction in an open state of the display module 160 according to a user intention. According to an embodiment, when image capturing is performed, the electronic device 101 may provide various objects 910 and 920 associated with the image capturing through a preview screen 900. For example, the electronic device 101 arranges, on a designated area on the preview screen 900, a first object 910 (e.g., a control object) capable of controlling functions such as pause, restart, and/or end of image capturing, and/or a second object 920 (e.g., a recording object) representing a state (e.g., a recording state) in which image is capturing, and then may provide same.

According to another embodiment, the electronic device 101 may be switched from an open state to a closed state, based on a user input. For example, in the electronic device 101, the area of the display is reduced in a rolling manner and/or a sliding manner in direction C and/or direction D. In a state change (e.g., the switching from an open state to a closed state) of the display module 160, the electronic device 101 may be manually switched by a user, or be automatically switched through a drive mechanism (e.g., a drive motor, a reduction gear module, and/or a gear assembly) disposed inside a housing.

Example <913> may represent an intermediate state in which the electronic device 101 is switching from an open state to a closed state. Example <915> may represent a closed state of the electronic device 101. In an embodiment, an intermediate state may represent all operable states between the open state of example <911> and the closed state of example <915>.

In example <913> and example <915>, the electronic device 101 may reduce the preview screen 900 in the vertical direction according to a state change (e.g., rolling or slide) of the display module 160. According to an embodiment, in case that a state of the display module 160 is changed, the electronic device 101 may maintain an output resolution (e.g., a resolution corresponding to an area of the entire preview screen 900 in an open state) in actual photographing as it is, and may set the remaining areas (e.g., an invisible area) excluding an area of the preview screen 900, among the entire area corresponding to the output resolution, as the hidden area 930.

According to yet another embodiment, as in example <911>, the electronic device 101 may be set to have an output resolution, based on the preview screen 900 of the full screen size at the time point of image capturing (e.g., recording start). According to an embodiment, as in example <913> and example <915>, when a state changes, the electronic device 101 may internally process (may background-process) the hidden area 930 for a correction image in response to the preview screen 900 (or a display ratio of the display area) reduced according to a user intention while continuously performing image capturing in a state of fixing the output resolution set at the time point of the image capturing. According to an embodiment, the hidden area 930 may have a size differently set according to a variance (e.g., a contraction amount or an expansion amount) of the display module 160. For example, as illustrated in FIGS. 9A and 9B, the hidden area 930 is variable (e.g., expanded) in proportion to the contraction amount of the display module 160.

According to yet another embodiment, the hidden area 930 may be variously set according to the form factor (or rolling or sliding) type of the electronic device 101. For example, in case that the electronic device 101 has a form factor in which the electronic device slides in any one direction, the hidden area 930 is integrated into one area (e.g., an area corresponding to the third hidden area 930C or the fourth hidden area 930D) in one direction or in a direction opposite to the one direction, in response to a state change in any one direction of the display module 160. For another example, in case that the electronic device 101 has a form factor in which the electronic device slides in both directions, the hidden area 930 may be divided into two areas (e.g., areas corresponding to the third hidden area 930C and the fourth hidden area 930D) in both directions, in response to a state change in both directions of the display module 160.

According to yet another embodiment, in case that the display module 160 is switched from an open state to a closed state, the electronic device 101 may display the preview screen 900 excluding an area corresponding to the hidden area 930 in response to the preview resolution of the display module 160 reduced in the vertical direction, while continuously performing photographing, based on the output resolution set at the time point of image capturing.

Figure 10A:
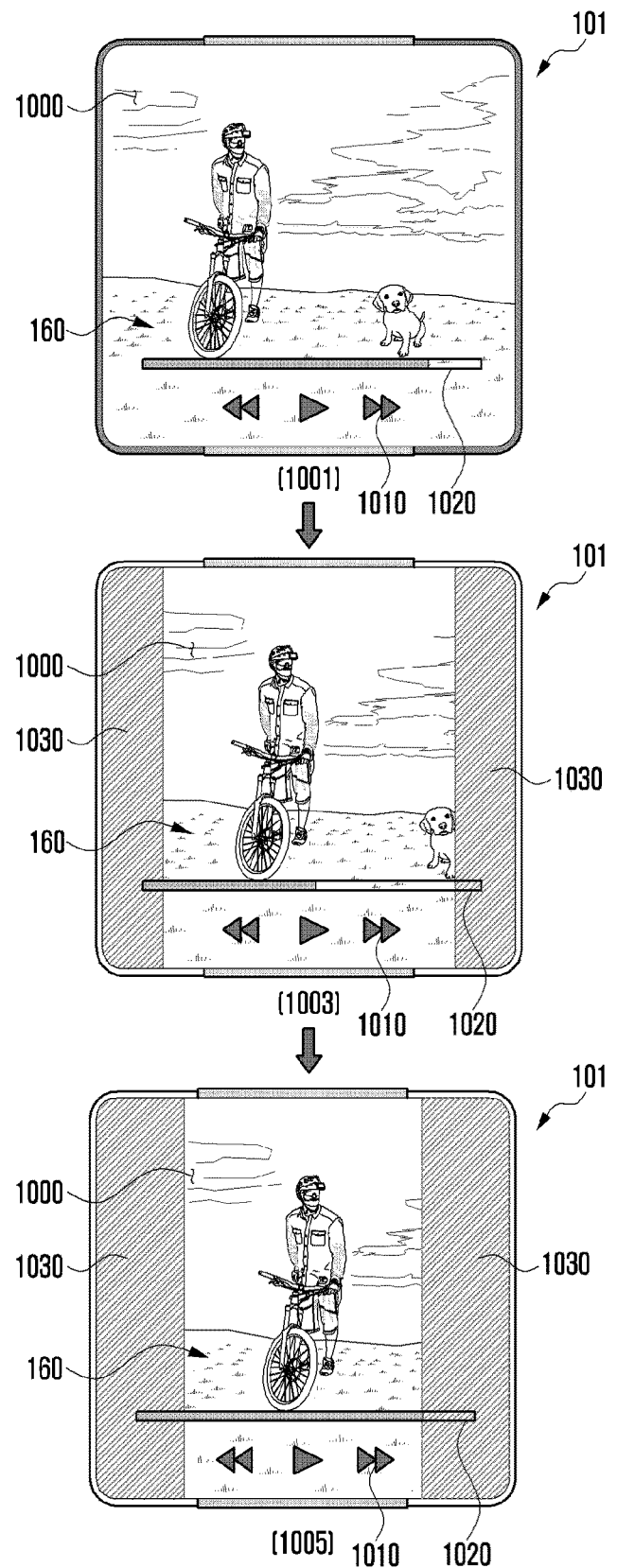
FIGS. 10A and 10B are views illustrating playback examples of images captured according to a state change of a display in an electronic device according to various embodiments of the disclosure.
Figure 10B:
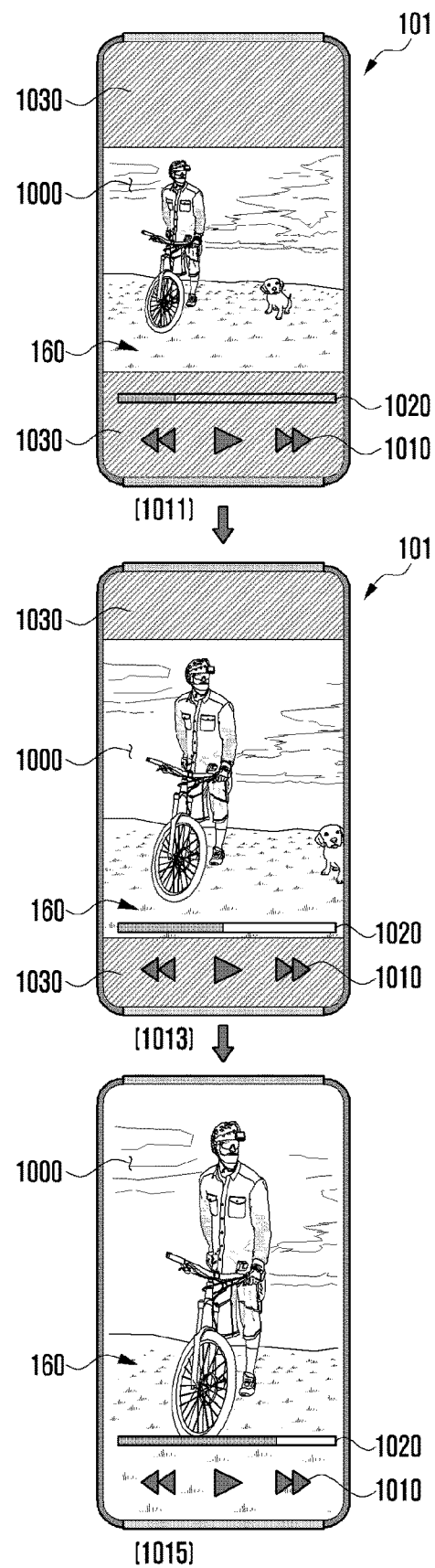

FIGS. 10A and 10B are views illustrating playback examples of images captured according to a state change of a display, in an electronic device according to various embodiments of the disclosure.

According to an embodiment, as illustrated in FIG. 9A, FIGS. 10A and 10B may represent examples in which the electronic device 101 starts image capturing in the vertical direction in an open state of the display module 160, and the image captured as the display module 160 is switched from an open state to a closed state in the horizontal direction (e.g., direction A and/or direction B) during image capturing is reproduced. According to an embodiment, FIG. 10A may represent an example in which the electronic device 101 reproduces an image in an open state. According to an embodiment, FIG. 10A may represent an example in which the electronic device 101 reproduces an image in a closed state.

Referring to FIG. 10A, in example <1001>, the electronic device 101 may perform image playback, in an open state of the display module 160 according to a user input. According to an embodiment, when image playback is performed, the electronic device 101 may provide various objects 1010 and 1020 associated with the image playback through a playback screen 1000. For example, the electronic device 101 arranges, on a designated area on the playback screen 1000, a third object 1010 (e.g., a control object) capable of controlling functions such as pause, restart, rewinding, and/or forward winding, and/or a fourth object 1020 (e.g., a progress bar object) representing a state (e.g., a recording state) in which image is reproducing, and then may provide same.

Example <1003> may represent an example in which the electronic device 101 reproduces a portion corresponding to the image captured in an intermediate state where the display module 160 is switching from an open state to a closed state. Example <1005> may represent an example in which the electronic device 101 reproduces a portion corresponding to the image captured in a closed state of the display module 160.

In example <1003> and example <1005>, the electronic device 101 may provide the playback screen 1000 in which a display area of an image is variable, based on photographing according to a state change (e.g., rolling or slide) of the display module 160.

According to yet another embodiment, in example <1001>, the electronic device 101 may display the playback screen 1000, based on the full screen (e.g., the full screen corresponding to the display area of the display module 160) of the display module 160. According to an embodiment, in example <1003> and example <1005>, the electronic device 101 may provide a correction image (e.g., a reduced screen of the display area of the display module 160, which has a blank) corresponding to the preview screen 900 (or a display ratio of the display area) reduced during photographing, except for (or effect-processing) an area (e.g., the correction area 1030 or the blank area) set as the hidden area 930 of the entire area corresponding to the output resolution.

According to yet another embodiment, the correction area 1030 may correspond to the size of the hidden area 930, which is differently set according to a variance (e.g., a contraction amount or an expansion amount) of the display module 160 during image capturing. For example, as illustrated in FIG. 10A, in an open state of the display module 160, the correction area 1030 is variable (e.g., expanded) to correspond to a change in the hidden area 930.

According to yet another embodiment, in case that the image captured while the display module 160 is switched from an open state to a closed state is reproduced in an open state, the electronic device 101 may display the playback screen 1000 as the full screen (e.g., the example <1001> of FIG. 10A) of the display module 160. According to yet another embodiment, for example, while the playback screen 1000 is displayed as the full screen, the electronic device 101 displays as if focus were concentrated on a specific subject (e.g., the example <1005> of FIG. 10A) while both edge areas (e.g., the correction area 1030) of the playback screen 1000 are processed by blackout (or processed by a designated effect) and then gradually expanded (e.g., the example <1003> of FIG. 10A), as playback progresses.

Referring to FIG. 10B, in example <1011>, the electronic device 101 may perform image playback, in a closed state of the display module 160 according to a user input. According to yet another embodiment, when image playback is performed, the electronic device 101 may provide various objects 1010 and 1020 associated with the image playback through a playback screen 1000. For example, the electronic device 101 arranges, on a designated area on the playback screen 1000, a third object 1010 (e.g., a control object) capable of controlling functions such as pause, restart, rewinding, and/or forward winding, and/or a fourth object 1020 (e.g., a progress bar object) representing a state (e.g., a recording state) in which image is reproducing, and then may provide same.

Example <1013> may represent an example in which the electronic device 101 reproduces a portion corresponding to the image captured in an intermediate state where the display module 160 is switching from an open state to a closed state. Example <1015> may represent an example in which the electronic device 101 reproduces a portion corresponding to the image captured in a closed state of the display module 160.

In example <1013> and example <1015>, the electronic device 101 may provide the playback screen 1000 in which a display area of an image is variable, based on photographing according to a state change (e.g., rolling or slide) of the display module 160. According to yet another embodiment, in example <1011>, the electronic device 101 may display the playback screen 1000, based on a screen (e.g., a reduced screen of the display area of the display module 160, which has a blank) of the display module 160. According to yet another embodiment, in example <1013> and example <1015>, the electronic device 101 may provide a correction image (e.g., the full screen corresponding to the display area of the display module 160) corresponding to the preview screen 900 (or a display ratio of the display area) reduced during photographing, except for (or effect-processing) an area (e.g., the correction area 1030) set as the hidden area 930 of the entire area corresponding to the output resolution.

According to yet another embodiment, the correction area 1030 may correspond to the size of the hidden area 930, which is differently set according to a variance (e.g., a contraction amount or an expansion amount) of the display module 160 during image capturing. For example, as illustrated in FIG. 10B, in a closed state of the display module 160, the correction area 1030 is variable (e.g., reduced) to correspond to a change in the hidden area 930.

According to yet another embodiment, in case that the image captured as the display module 160 is switched from an open state to a closed state is reproduced in a closed state, the electronic device 101 may perform blackout processing (or designated effect processing) on both edge areas (e.g., the correction area 1030) of the playback screen 1000, and thus may display same as a screen (e.g., the example <1011> of FIG. 10B) of the display module 160 (e.g., may display a reduced screen resized to fit the width of the display module 160 in a closed state). According to yet another embodiment, for example, while the playback screen 1000 is displayed as a screen of the display module 160, as playback progresses, the electronic device 101 displays (e.g., the example <1015> of FIG. 10B) (e.g., may display the full screen resized to fit the width of the display module 160 in a closed state) as if focus were concentrated on a specific subject while both edge areas (e.g., the correction area 1030) of the playback screen 1000 are gradually reduced (e.g., the example <1013> of FIG. 10B).

As illustrated in FIGS. 10A and 10B, the electronic device 101 may adaptively provide the playback screen 1000 according to an open state or a closed state of the display module 160 when the captured image is reproduced as illustrated in FIG. 9A. For example, the electronic device 101 resizes the playback screen 1000 to fit a display ratio (e.g., the width) of the display area of the display module 160, so that the entire playback screen 1000 is displayed within the display area. For example, the electronic device 101 maintains and resizes (e.g., reduce or expand) the ratio of the playback screen 1100 to correspond to the initial output resolution and then may provide same.

Figure 11A:
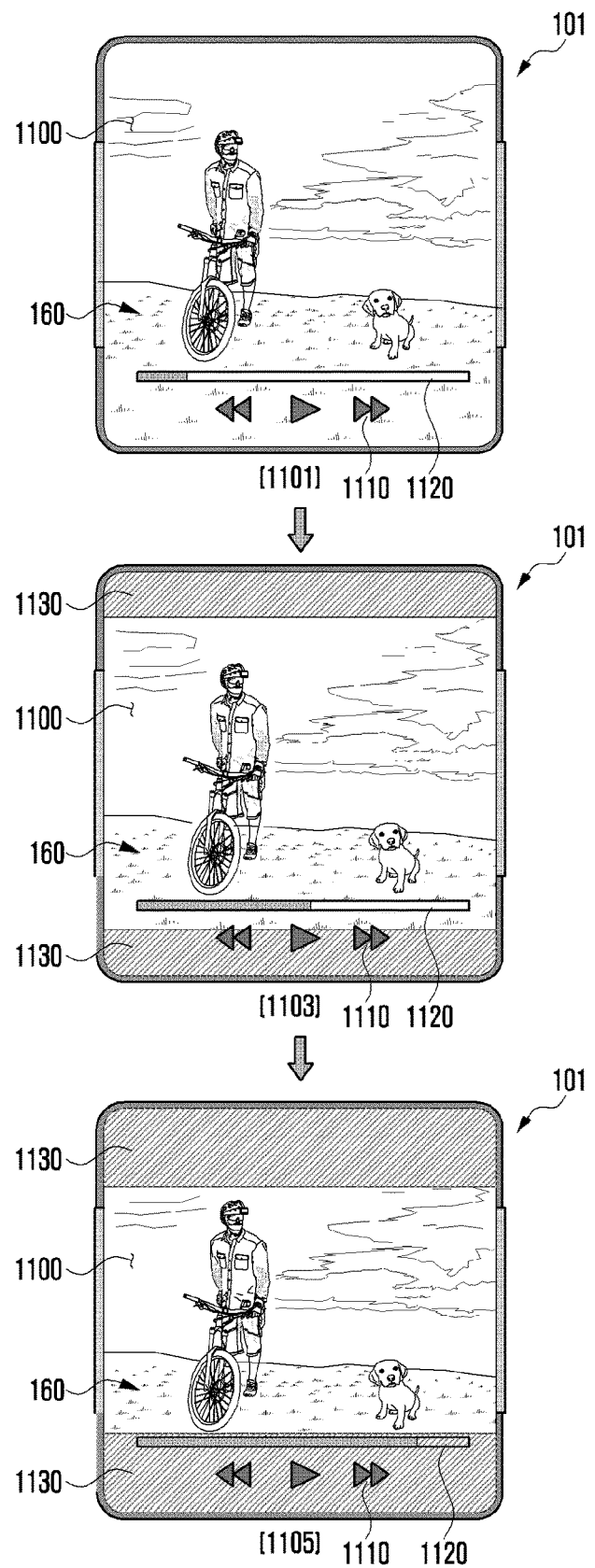
FIGS. 11A and 11B are views illustrating playback examples of images captured according to a state change of a display in an electronic device according to various embodiments of the disclosure.
Figure 11B:
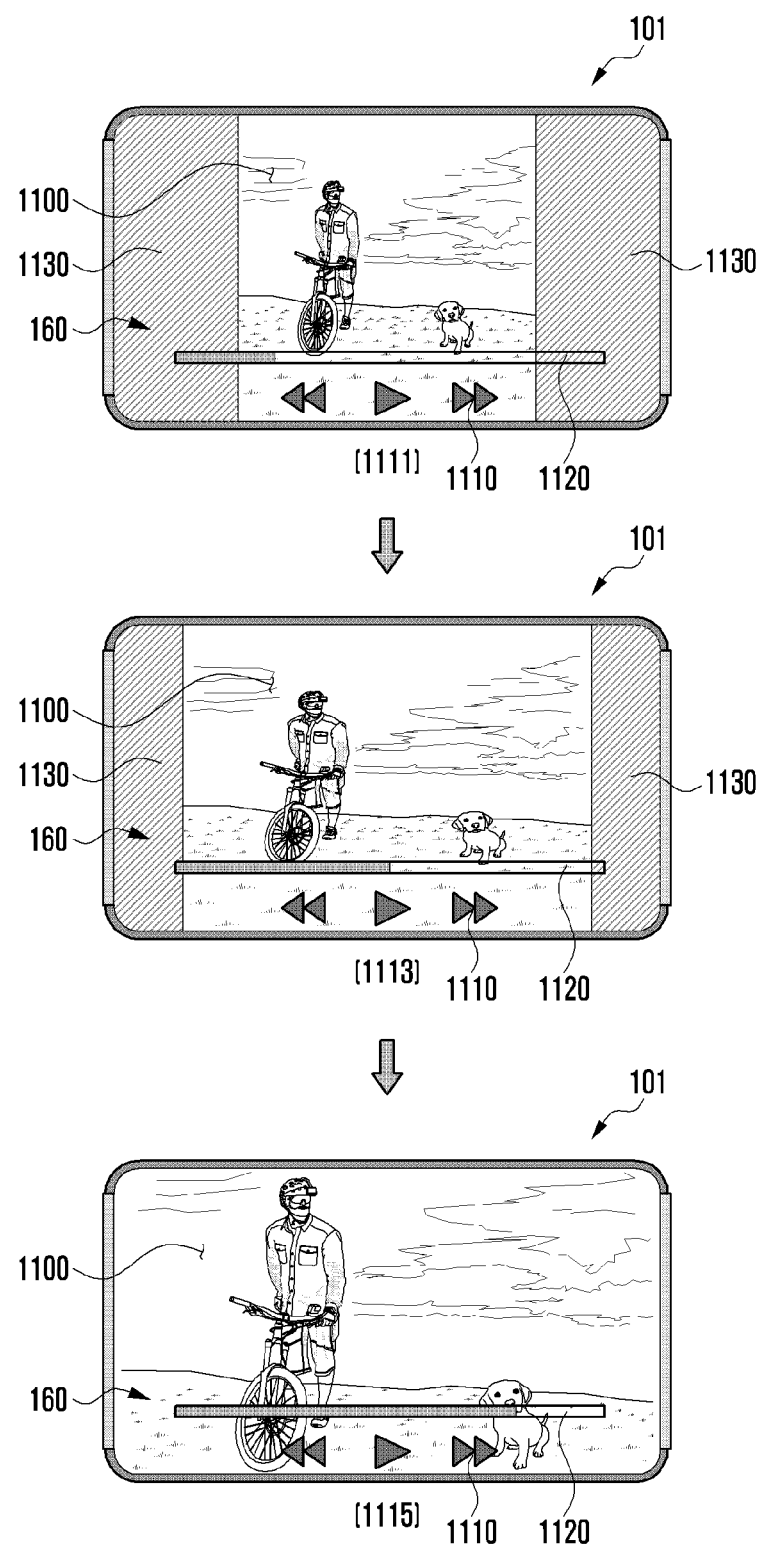

FIGS. 11A 11B are views illustrating playback examples of the images captured according to a state change of a display, in an electronic device according to various embodiments of the disclosure.

According to an embodiment, as illustrated in FIG. 9B, FIGS. 11A and 11B may represent examples in which the electronic device 101 starts image capturing in the horizontal direction in an open state of the display module 160, and the image captured as the display module 160 is switched from an open state to a closed state in the vertical direction (e.g., direction C and/or direction D in FIG. 9B) during image capturing is reproduced. According to another embodiment, FIG. 11A may represent an example in which the electronic device 101 reproduces an image in an open state. According to an embodiment, FIG. 11B may represent an example in which the electronic device 101 reproduces an image in a closed state.

Referring to FIG. 11A, in example <1101>, the electronic device 101 may perform image playback, in an open state of the display module 160 according to a user input. According to an embodiment, when image playback is performed, the electronic device 101 may provide various objects 1110 and 1120 associated with the image playback through a playback screen 1100. For example, the electronic device 101 arranges, in a designated area on the playback screen 1000, a third object 1110 (e.g., a control object) capable of controlling functions such as pause, restart, rewinding, and/or forward winding, and/or a fourth object 1120 (e.g., a progress bar object) representing a state (e.g., a recording state) in which image is reproducing, and then may provide same.

Example <1103> may represent an example in which the electronic device 101 reproduces a portion corresponding to the image captured in an intermediate state where the display module 160 is switching from an open state to a closed state. Example <1105> may represent an example in which the electronic device 101 reproduces a portion corresponding to the image captured in a closed state of the display module 160.

In example <1103> and example <1105>, the electronic device 101 may provide the playback screen 1100 in which a display area of an image is variable, based on photographing according to a state change (e.g., rolling or slide) of the display module 160. According to another embodiment, in example <1101>, the electronic device 101 may display the playback screen 1100, based on the full screen (e.g., the full screen corresponding to the display area of the display module 160) of the display module 160. According to yet another embodiment, in example <1103> and example <1105>, the electronic device 101 may provide a correction image (e.g., a reduced screen of the display area of the display module 160, which has a blank) corresponding to the preview screen 900 (or a display ratio of the display area) reduced during photographing, except for (or effect-processing) an area (e.g., the correction area 1130 or the blank area) set as the hidden area 930 of the entire area corresponding to the output resolution. According to yet another embodiment, the correction area 1130 may correspond to the size of the hidden area 930, which is differently set according to a variance (e.g., a contraction amount or an expansion amount) of the display module 160 during image capturing. For example, as illustrated in FIG. 11A, in an open state of the display module 160, the correction area 1130 is variable (e.g., expanded) to correspond to a change in the hidden area 930.

According to yet another embodiment, in case that the image captured according to the switching from an open state to a closed state of the display module 160 is reproduced in an open state, as illustrated in FIG. 11A, the electronic device 101 may display the playback screen 1100 as the entire screen (e.g., example <1101>) of the display module 160, and for example, displays as if focus were concentrated on a specific subject while both edge areas (e.g., the correction area 1130) of the playback screen 1100 are processed by blackout (or processed by a designated effect) and then gradually expanded, as playback progresses.

Referring to FIG. 11B, in example <1111>, the electronic device 101 may perform image playback, in a closed state of the display module 160 according to a user input. According to an embodiment, when image playback is performed, the electronic device 101 may provide various objects 1110 and 1120 associated with the image playback through a playback screen 1100. For example, the electronic device 101 arranges, in a designated area on the playback screen 1000, a third object 1110 (e.g., a control object) capable of controlling functions such as pause, restart, rewinding, and/or forward winding, and/or a fourth object 1120 (e.g., a progress bar object) representing a state (e.g., a recording state) in which image is reproducing, and then provide same.

Example <1113> may represent an example in which the electronic device 101 reproduces a portion corresponding to the image captured in an intermediate state where the display module 160 is switching from an open state to a closed state. Example <1115> may represent an example in which the electronic device 101 reproduces a portion corresponding to the image captured in a closed state of the display module 160.

In example <1113> and example <1115>, the electronic device 101 may provide the playback screen 1100 in which a display area of an image is variable, based on photographing according to a state change (e.g., rolling or slide) of the display module 160. According to another embodiment, in example <1111>, the electronic device 101 may display the playback screen 1100, based on a screen (e.g., a reduced screen of the display area of the display module 160, which has a blank) of the display module 160. According to yet another embodiment, in example <1113> and example <1115>, the electronic device 101 may provide a correction image (e.g., the full screen corresponding to the display area of the display module 160) corresponding to the preview screen 900 (or a display ratio of the display area) reduced during photographing, except for (or effect-processing) an area (e.g., the correction area 1130) set as the hidden area 930 of the entire area corresponding to the output resolution.

According to yet another embodiment, the correction area 1130 may correspond to the size of the hidden area 930, which is differently set according to a variance (e.g., a contraction amount or an expansion amount) of the display module 160 during image capturing. For example, as illustrated in FIG. 11B, in a closed state of the display module 160, the correction area 1130 is variable (e.g., reduced) to correspond to a change in the hidden area 930.

According to yet another embodiment, in case that the image captured as the display module 160 is switched from an open state to a closed state is reproduced in a closed state, as illustrated in FIG. 11B, the electronic device 101 may perform blackout processing (or designated effect processing) on both edge areas (e.g., the correction area 1130) of the playback screen 1100, and thus may display same as a screen (e.g., the example <1111>) of the display module 160 (e.g., may display a reduced screen resized to fit the width of the display module 160 in a closed state), and for example, displays as if focus were concentrated on a specific subject (e.g., may display a full screen resized to fit the width of the display module 160 in a closed state) while both edge areas (e.g., the correction area 1130) of the playback screen 1100 are gradually reduced, as playback progresses.

Referring to FIGS. 11A and 11B, the electronic device 101 may adaptively provide the playback screen 1100 according to an open state or a closed state of the display module 160 when the captured image is reproduced as illustrated in FIG. 9B. For example, the electronic device 101 resizes the playback screen 1100 to fit a display ratio (e.g., the width) of the display area of the display module 160, so that the entire playback screen 1100 is displayed within the display area. For example, the electronic device 101 maintains and resize (e.g., reduce or expand) the ratio of the playback screen 1100 to correspond to the initial output resolution and then may provide same.

Figure 12A:
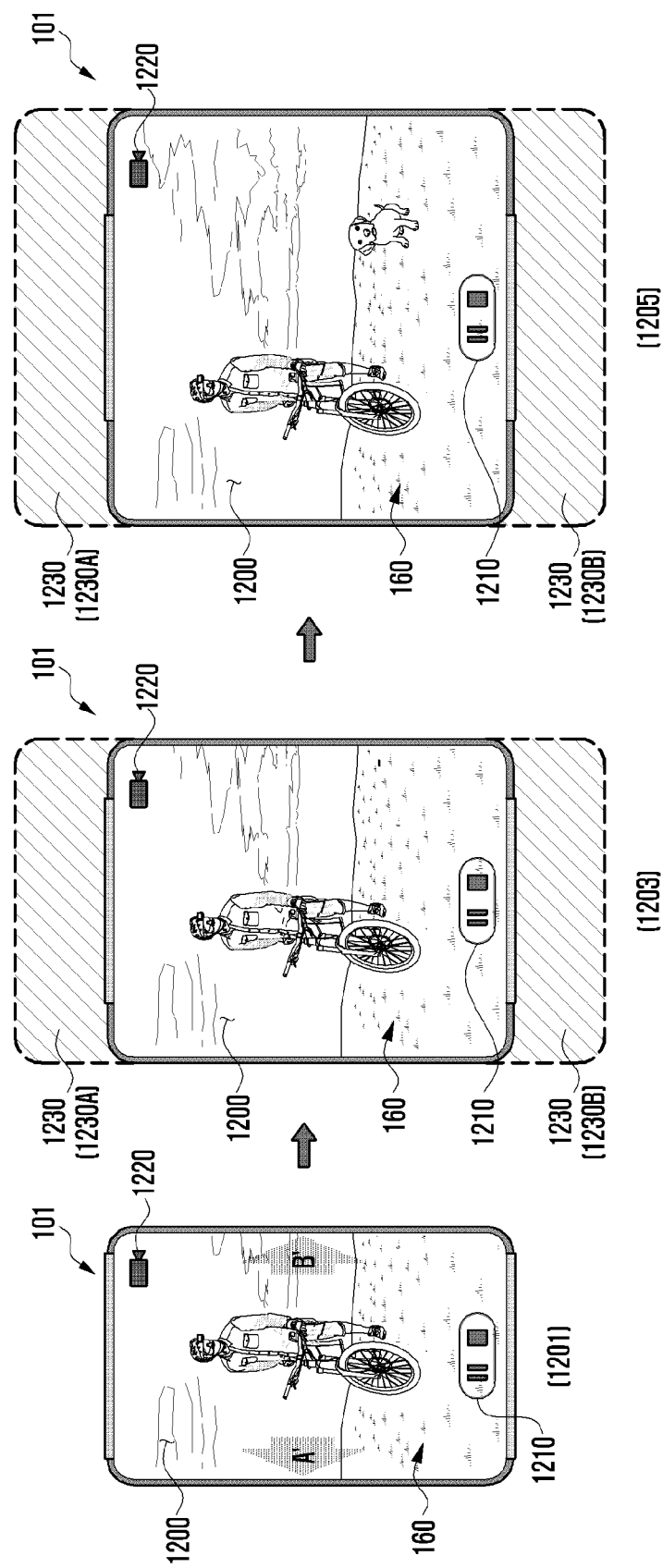
FIGS. 12A and 12B are views illustrating state changes of a display while photographing is performed and photographing examples according thereto, in an electronic device according to various embodiments of the disclosure.
Figure 12B:
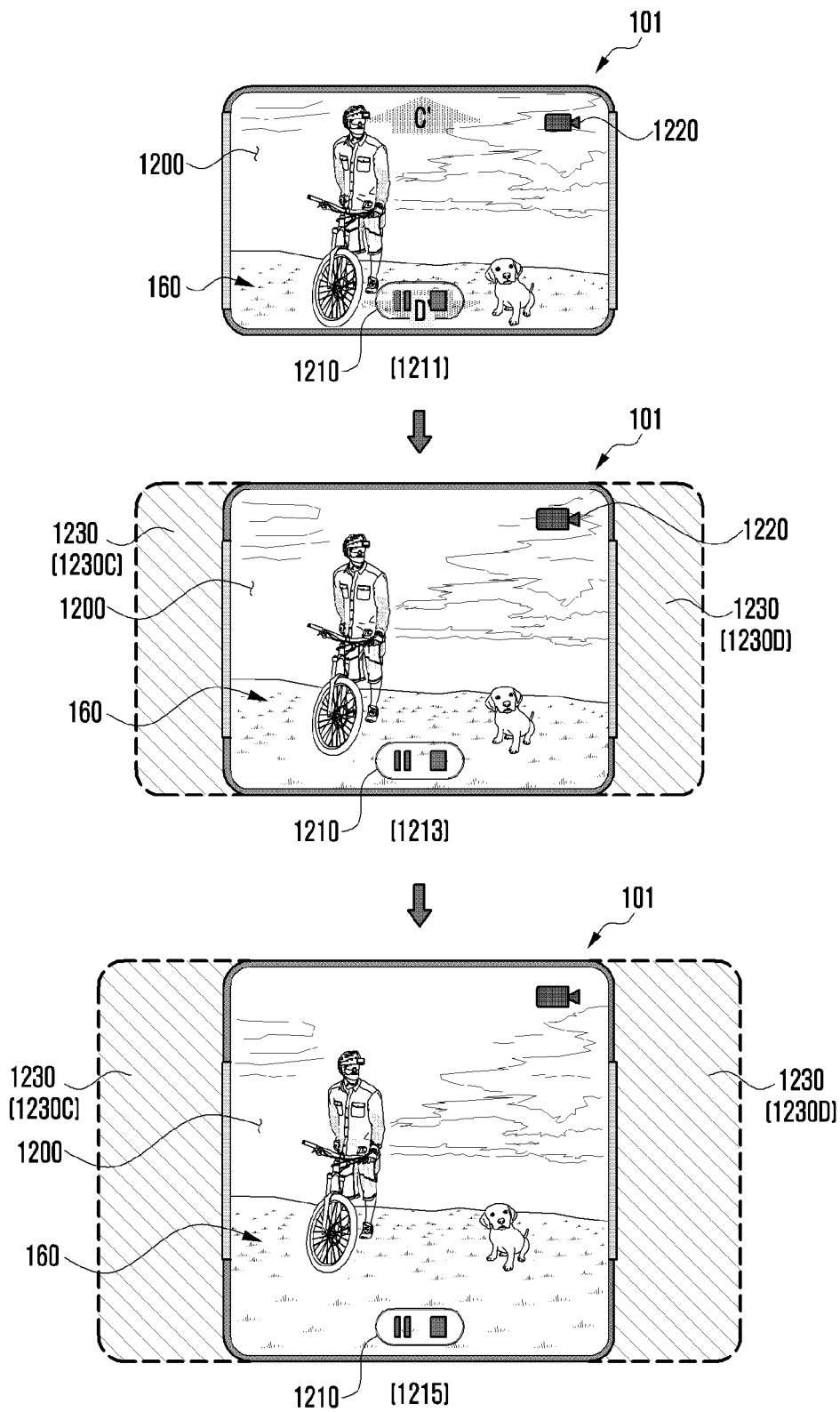

FIGS. 12A and 12B are views illustrating state changes of a display while photographing is performed and photographing examples according thereto, in an electronic device according to various embodiments of the disclosure.

According to an embodiment, FIGS. 12A and 12B may represent examples in which the electronic device 101 starts image capturing in a closed state of the display module 160, and a preview screen is changed and photographing is performed as the display module 160 is switched from a closed state to an open state during image capturing. According to another embodiment, FIG. 12A may represent examples in which the display module 160 of the electronic device 101 is expanded (slid-out) in the horizontal direction, based on image capturing in the horizontal direction in a closed state. According to yet another embodiment, FIG. 12B may represent examples in which the display module 160 of the electronic device 101 is expanded in the vertical direction, based on image capturing in the vertical direction in a closed state.

Referring to FIG. 12A, in example <1201>, the electronic device 101 may perform image capturing, based on the horizontal direction in a closed state of the display module 160 according to a user intention. According to yet another embodiment, when image capturing is performed, the electronic device 101 may provide various objects 1210 and 1220 associated with the image capturing through a preview screen 1200. For example, the electronic device 101 arranges, in a designated area on the preview screen 1200, a first object 1210 (e.g., a control object) capable of controlling functions such as pause, restart, and/or end of image capturing and/or a second object 1220 (e.g., a recording object) representing a state (e.g., a recording state) in which image is capturing, and then may provide same.

According to yet another embodiment, the electronic device 101 may be switched from a closed state to an open state, based on a user input. For example, in the electronic device 101, the area of the display is expanded in a rolling manner and/or a sliding manner in direction A' and/or direction B'. In a state change (e.g., the switching from a closed state to an open state) of the display module 160, the electronic device 101 may be manually switched by a user, or be automatically switched through a drive mechanism (e.g., a drive motor, a reduction gear module, and/or a gear assembly) disposed inside a housing.

Example <1203> may represent an intermediate state in which the electronic device 101 is switching from a closed state to an open state. Example <1205> may represent an open state of the electronic device 101. In yet another embodiment, an intermediate state may represent all operable states between the closed state of example <1201> and the open state of example <1205>.

In example <1203> and example <1205>, the electronic device 101 may expand the preview screen 1200 in the horizontal direction according to a state change (e.g., rolling or slide) of the display module 160. According to yet another embodiment, in case that a state of the display module 160 is changed, the electronic device 101 may maintain an output resolution (e.g., a resolution corresponding to an area of the entire preview screen 1200 in an open state) in actual photographing as it is, and may not display the remaining areas (e.g., an invisible area) excluding an area of the preview screen 1200, among the entire area corresponding to the output resolution.

According to yet another embodiment, as in example <1201>, the electronic device 101 may be set to have an output resolution, based on the preview screen 1200 of the full screen size at the time point of image capturing (e.g., recording start). According to yet another embodiment, as in example <1203> and example <1205>, when a state changes, the electronic device 101 may internally process (or may background-process) the hidden area 1230 for a correction image in response to the preview screen 1200 (or a display ratio of the display area) expanded according to a user intention while continuously performing photographing in a state of fixing the output resolution set at the time point of the image capturing. According to yet another embodiment, the hidden area 1230 may have a size differently set according to a variance (e.g., a contraction amount or an expansion amount) of the display module 160. For example, as illustrated in FIGS. 12A and 12B, the hidden area 1230 is variable (e.g., expanded) in proportion to the expansion amount of the display module 160.

According to yet another embodiment, the hidden area 1230 may be variously set according to the form factor (or rolling or sliding) type of the electronic device 101. For example, in case that the electronic device 101 has a form factor in which the electronic device slides in any one direction, the hidden area 1230 is integrated into one area (e.g., an area corresponding to the first hidden area 1230A or the second hidden area 1230B) in one direction or in a direction opposite to the one direction, in response to a state change in any one direction of the display module 160. For another example, in case that the electronic device 101 has a form factor in which the electronic device slides in both directions, the hidden area 1230 is divided into two areas (e.g., areas corresponding to the first hidden area 1230A and the second hidden area 1230B) in both directions, in response to a state change in both directions of the display module 160.

According to yet another embodiment, in case that the display module 160 is switched from a closed state to an open state, the electronic device 101 may display the preview screen 1200 excluding an area corresponding to the hidden area 1230 in response to the preview resolution of the display module 160 expanded in the horizontal direction, while continuously performing photographing, based on the output resolution set at the time point of image capturing.

According to yet another embodiment, when being switched from a closed state to an open state while photographing is performed, the electronic device 101, while maintaining the original output resolution, through hidden processing according to the preview ratio, may photograph (record), as it is, the preview screen 1200 according to a user intention and then provide same. For example, based on a state change from a closed state to an open state, the electronic device 101 displays a corresponding preview screen 1200 while virtually performing zoom (e.g., zoom-out) processing in the background. According to yet another embodiment, the electronic device 101 may expand the preview ratio according to the expansion of the display module 160, and may process to hide the remaining areas (e.g., the hidden area 1230) got out of the preview screen 1200. According to some embodiments, as in example <1201>, in case that image capturing is performed in a closed state of the display module 160, the electronic device 101 may photograph with a resolution (e.g., the initial output resolution) corresponding to an open state, may process to hide the remaining areas (e.g., the hidden area 1230) got out of the preview screen 1200, and may change the hidden area 1230 by the ratio according to the state change in an open state.

Referring to FIG. 12B, in example <1211>, the electronic device 101 may perform image capturing, based on the vertical direction in a closed state of the display module 160 according to a user intention. According to yet another embodiment, when image capturing is performed, the electronic device 101 may provide various objects 1210 and 1220 associated with the image capturing through a preview screen 1200. For example, the electronic device 101 arranges, in a designated area on the preview screen 1200, a first object 1210 (e.g., a control object) capable of controlling functions such as pause, restart, and/or end of image capturing and/or a second object 1220 (e.g., a recording object) representing a state (e.g., a recording state) in which image is capturing, and then provide same.

According to yet another embodiment, the electronic device 101 may be switched from a closed state to an open state, based on a user input. For example, in the electronic device 101, the area of the display is expanded in a rolling manner and/or a sliding manner in direction C' and/or direction D'. In a state change (e.g., the switching from a closed state to an open state) of the display module 160, the electronic device 101 may be manually switched by a user, or be automatically switched through a drive mechanism (e.g., a drive motor, a reduction gear module, and/or a gear assembly) disposed inside a housing.

Example <1213> may represent an intermediate state in which the electronic device 101 is switching from a closed state to an open state. Example <1215> may represent an open state of the electronic device 101. In an embodiment, an intermediate state may represent all operable states between the closed state of example <1211> and the open state of example <1215>.

In example <1213> and example <1215>, the electronic device 101 may expand the preview screen 1200 in the vertical direction according to a state change (e.g., rolling or slide) of the display module 160. According to yet another embodiment, in case that a state of the display module 160 is changed, the electronic device 101 may maintain an output resolution (e.g., a resolution corresponding to an area of the entire preview screen 900 in an open state) in actual photographing as it is, and may not display the remaining areas (e.g., an invisible area) excluding an area of the preview screen 1200, among the entire area corresponding to the output resolution. According to yet another embodiment, as in example <1211>, the electronic device 101 may be set to have an output resolution, based on the preview screen 1200 of the full screen size at the time point of image capturing (e.g., recording start). According to yet another embodiment, as in example <1213> and example <1215>, when a state changes, the electronic device 101 may internally process (or may background-process) the hidden area 1230 for a correction image in response to the preview screen 1200 (or a display ratio of the display area) expanded according to a user intention while continuously performing photographing in a state of fixing the output resolution set at the time point of the image capturing. According to yet another embodiment, the hidden area 1230 may have a size differently set according to a variance (e.g., a contraction amount or an expansion amount) of the display module 160. For example, as illustrated in FIGS. 12A and 12B, the hidden area 1230 is variable (e.g., expanded) in proportion to the expansion amount of the display module 160.

According to yet another embodiment, the hidden area 1230 may be variously set according to the form factor (or rolling or sliding) type of the electronic device 101. For example, in case that the electronic device 101 has a form factor in which the electronic device slides in any one direction, the hidden area 1230 is integrated into one area (e.g., an area corresponding to the third hidden area 1230C or the fourth hidden area 1230D) in one direction or in a direction opposite to the one direction, in response to a state change in any one direction of the display module 160. For another example, in case that the electronic device 101 has a form factor in which the electronic device slides in both directions, the hidden area 1230 may be divided into two areas (e.g., areas corresponding to the third hidden area 1230C and the fourth hidden area 1230D) in both directions, in response to a state change in both directions of the display module 160.

According to yet another embodiment, in case that the display module 160 is switched from a closed state to an open state, the electronic device 101 may display the preview screen 1200 excluding an area corresponding to the hidden area 1230 in response to the preview resolution of the display module 160 expanded in the vertical direction, while continuously performing photographing, based on the output resolution set at the time point of image capturing.

According to yet another embodiment, when being switched from a closed state to an open state while photographing is performed, the electronic device 101, while maintaining the original output resolution, through hidden processing according to the preview ratio, may capture (record), as it is, the preview screen 1200 according to a user intention and then provide same. For example, based on a state change in which the display module 160 is switched from a closed state to an open state, the electronic device 101 displays a corresponding preview screen 1200 while virtually performing zoom (e.g., zoom-out) processing in the background. According to yet another embodiment, the electronic device 101 may expand the preview ratio according to the expansion of the display module 160, and may process to hide the remaining areas (e.g., the hidden area 1230) got out of the preview screen 1200. According to some embodiments, as in example <1211>, in case that image capturing is performed in a closed state of the display module 160, the electronic device 101 may photograph with a resolution (e.g., the initial output resolution) corresponding to an open state, may process to hide the remaining areas (e.g., the hidden area 1230) got out of the preview screen 1200, and may change the hidden area 1230 by the ratio according to the state change in an open state.

Figure 13:
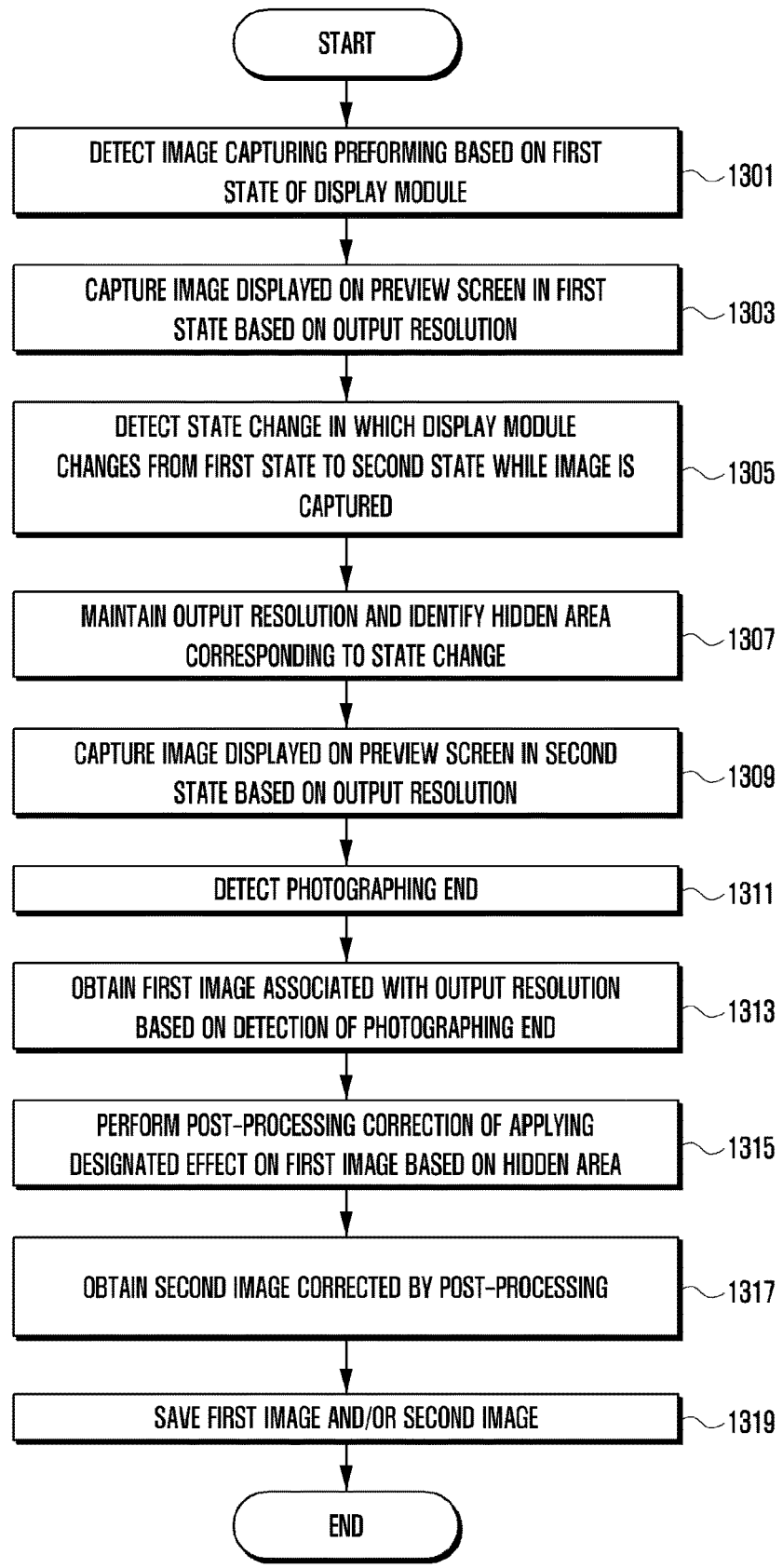
FIG. 13 is a flowchart illustrating an operation method of an electronic device according to an embodiment of the disclosure.

FIG. 13 is a flowchart illustrating an operation method of an electronic device according to an embodiment of the disclosure.

Referring to FIG. 13, in operation 1301, the processor 120 of the electronic device 101 may detect the performing of image capturing, based on a state change of the display module 160. According to yet another embodiment, the processor 120 may detect a state in which an execution screen (or a user interface) (e.g., a preview) of an application (e.g., a camera application) associated with image capturing is displayed through the display module 160. According to yet another embodiment, the processor 120 may detect the performing of image capturing, based on a user input for executing image capturing (e.g., video capturing) while the execution screen of the application is displayed through the display module 160.

In operation 1303, the processor 120 may capture an image displayed on the preview screen in the first state (e.g., an open state, an intermediate state, or a closed state) of the display module 160, based on the designated output resolution (or the initial resolution). According to yet another embodiment, in case that image capturing is executed, the processor 120 may control the camera module 180 so as to capture an image, based on the output resolution (e.g., a resolution corresponding to the entire preview screen corresponding to an open state of the display module 160, or the initial image resolution set in response to the current state at the time point of initial photographing) corresponding to the first state. According to yet another embodiment, while an image is captured, the processor 120 may process a timestamp indicating a point on a time axis in the captured image. According to yet another embodiment, the processor 120 may process a continuous timestamp to correspond to the state change of the display module 160.

In operation 1305, when an image is captured, the processor 120 may detect a state change in which the display module 160 is changed from the first state (or a current state) (e.g., an open state, an intermediate state, or a closed state) to the second state (or a state different from the first state) (e.g., a closed state, an intermediate state, or an open state). For example, the processor 120 detects a state change in which the preview resolution of the display module 160 is changed (or the display ratio of the display area is changed) while image capturing is performed. According to yet another embodiment, the processor 120 may identify that the display module 160 is switched from an open state to a closed state or from a closed state to an open state while image capturing is performed.

In operation 1307, the processor 120 may maintain the output resolution and identify a hidden area corresponding to the state change. According to yet another embodiment, the processor 120 may identify a hidden area, based on a variance (e.g., an expansion amount or a contraction amount) of the display module 160. According to an embodiment, in case that the change from the first state to the second state is a change from an open state to a closed state, the processor 120 may generate a hidden area, based on (or in proportion to) an expansion amount (or a preview ratio expanded and thus changed) of the display module 160. According to another embodiment, in case that the change from the first state to the second state is a change from a closed state to an open state, the processor 120 may generate a hidden area, based on (or in proportion to) a contraction amount (or a preview ratio reduced and thus changed) of the display module 160.

According to yet another embodiment, the hidden area may be generated based on an output resolution in actual photographing and a preview resolution (e.g., a preview ratio), and in the entire area corresponding to the output resolution, may include the remaining areas (or an area which is not visible as a preview) which are variable according to the variance of the display module 160, in addition to an area corresponding to the preview screen. According to yet another embodiment, the hidden area may indicate a processing object area in which a designated effect (e.g., blackout, blur, and/or mono) is processed.

In operation 1309, the processor 120 may capture an image displayed on a preview image in the second state of the display module 160, based on the designated output resolution. According to yet another embodiment, the processor 120 may continuously (or consecutively) capture an image (e.g., a raw image), based on the output resolution (or an initial resolution) which is initially set at the time point of image capturing. According to yet another embodiment, while an image is captured, the processor 120 may process a timestamp indicating a point on a time axis in the captured image. According to yet another embodiment, the processor 120 may process a continuous timestamp to correspond to the state change of the display module 160.

In operation 1311, the processor 120 may detect the end of photographing while an image is captured. According to yet another embodiment, while image capturing (e.g., video capturing or recording) is performed, the processor 120 may detect the end of image capturing, based on a user input for ending image capturing.

In operation 1313, the processor 120 may obtain a first image (e.g., a raw image) associated with the output resolution, based on the detection of photographing end. According to yet another embodiment, the processor 120 may obtain the first image captured according to the output resolution, in the first state, the intermediate state in which a state thereof is switching from the first state to the second state, and the second state of the display module 160.

In operation 1315, the processor 120 may perform a post-processing correction in which a designated effect is applied to the first image, based on the hidden area. For example, the processor 120 obtains a second image, based on a post-processing correction of an area corresponding to the hidden area in the first image. According to yet another embodiment, the processor 120 may process a designated effect (e.g., blackout, blur, and/or mono) on the hidden area, in the first image. According to yet another embodiment, the processor 120 may process an effect according to the size of the hidden area, which is changed to correspond to a state change of the display module 160. According to yet another embodiment, based on a timestamp processed during image capturing, the processor 120 may classify hidden areas for each state of the display module 160, and may process an effect, based on the classified hidden areas.

In operation 1317, the processor 120 may obtain a second image (e.g., a correction image) corrected by post-processing, based on the first image. According to yet another embodiment, the second image may include an image portion corresponding to the output resolution, and an image portion (e.g., an image corresponding to the preview screen) in which an effect has been processed on the hidden area according to the state change of the display module 160.

In operation 1319, the processor 120 may store a first image based on the output resolution, and/or a second image based on the hidden area. According to yet another embodiment, as an image actually obtained at the time of image capturing (or storage), the processor 120 may generate a first image (e.g., a raw image) captured according to the output resolution, and a second image (e.g., a correction image) in which the first image is processed using post-processing (e.g., designated effect processing) according to the hidden area, and may save the first image and/or the second image. According to yet another embodiment, the processor 120 may simultaneously capture (e.g., record) the first image and the second image excluding the hidden area at the time of image capturing, and also separately save the first image and the second image at the time of ending (or saving).

Figure 14:
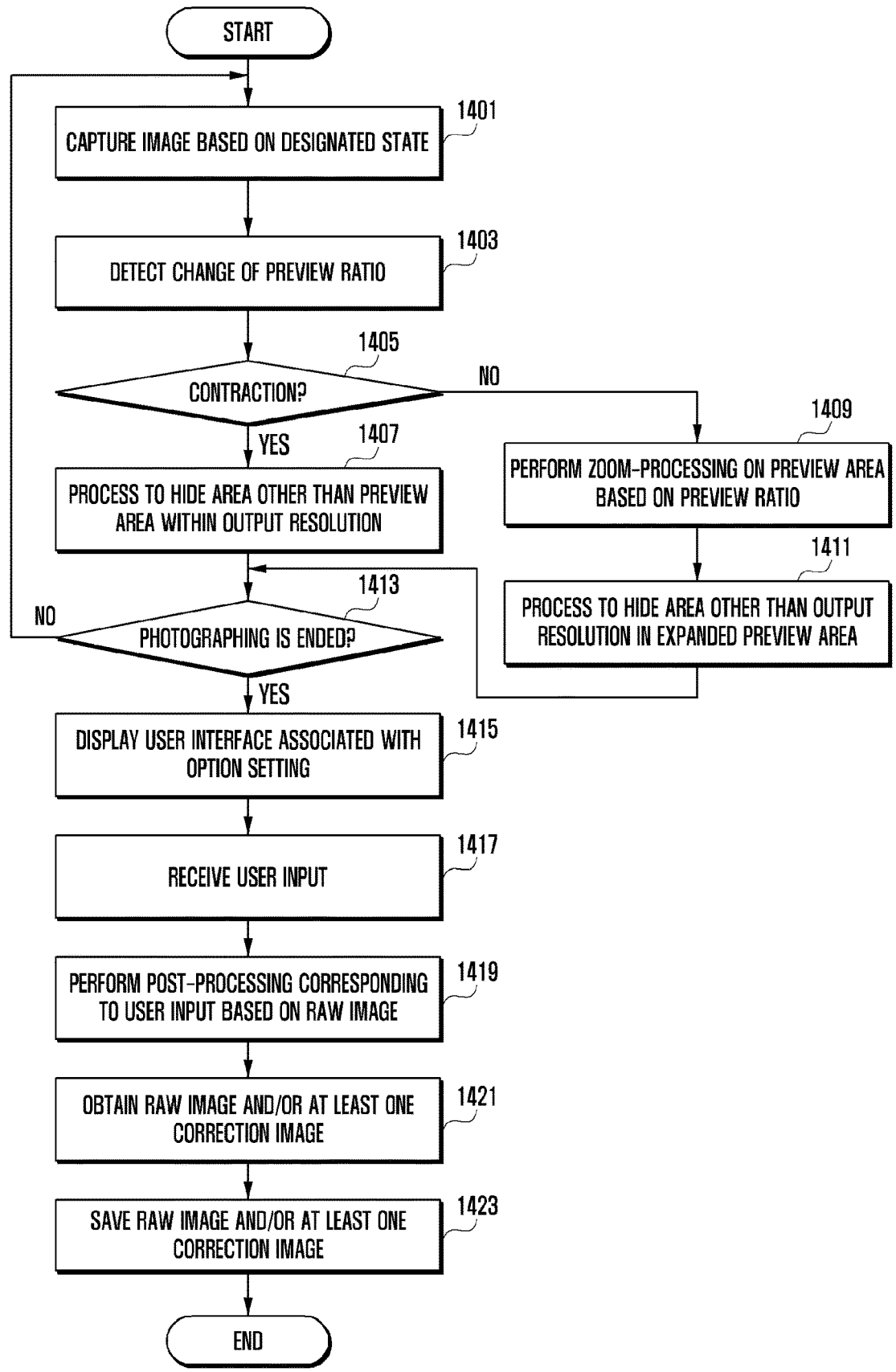
FIG. 14 is a flowchart illustrating an operation method of an electronic device according to an embodiment of the disclosure.

FIG. 14 is a flowchart illustrating an operation method of an electronic device according to an embodiment of the disclosure.

Referring to FIG. 14, in operation 1401, the processor 120 of the electronic device 101 may perform image capturing, based on a designated state. According to an embodiment, the processor 120 may capture an image, based on a designated output resolution (or an initial resolution) in an open state, intermediate state, or a closed state of the display module 160.

In operation 1403, the processor 120 may detect that the preview ratio of the display module 160 is changed. According to another embodiment, the processor 120 may detect that an area of a display is changed according to the switching of the display module 160 from an open state to a closed state or from a closed state to an open state while image capturing is performed.

In operation 1405, the processor 120 may determine whether the change of a preview ratio corresponds to a contraction or an expansion, based on the detection of change of a preview ratio. According to yet another embodiment, the processor 120 may determine whether an area of a display is reduced as the display module 160 is switched from an open state to a closed state, or an area of a display is expanded as the display module 160 is switched from a closed state to an open state.

In operation 1405, in case that the change of a preview ratio is a contraction (e.g., "Yes" in operation 1405), in operation 1407, the processor 120 may process to hide areas other than the preview area within the output resolution. For example, while an image is captured, the processor 120 identifies (or generate) a hidden area corresponding to a state change of the display module 160.

In operation 1405, in case that the change of a preview ratio is an extension (e.g., "No" in operation 1405), in operation 1409, the processor 120 may perform zoom (e.g., zoom-out) processing on the preview area, based on the preview ratio. According to yet another embodiment, the processor 120 may display a corresponding preview screen while virtually performing zoom processing in the background, based on the state change in which the display module 160 is switched from a closed state to an open state. According to yet another embodiment, the processor 120 may expand the preview area within an output resolution area, and may process to hide the expanded preview area.

In operation 1411, the processor 120 may process to hide an area other than the output resolution in the expanded preview area. For example, while an image is captured, the processor 120 identifies (or generate) a hidden area corresponding to a state change of the display module 160.

In operation 1413, the processor 120 may determine whether photographing is ended. According to yet another embodiment, while image capturing (e.g., video capturing or recording) is performed, the processor 120 may determine whether image capturing is ended, based on a user input for ending image capturing sequentially or in parallel, in the hidden processing operation according to operation 1407 or operation 1411.

In operation 1413, in case that the end of image capturing is not detected (e.g., "No" in operation 1413), the processor 120 may proceed to operation 1401 and then may perform operations following operation 1401.

In operation 1413, in case that the end of image capturing is detected (e.g., "Yes" in operation 1413), in operation 1415, the processor 120 may display a user interface associated with option setting. According to yet another embodiment, at the end of image capturing, the processor 120 may provide a user interface including various selection options for selecting an image storage method through a pop-up window (or overlay). According to some embodiments, the image storage method (or option) may be set in advance as a designated storage method by the user, and in case that the designated storage method is set in advance, the processor 120 may store at least one image, which automatically corresponds thereto according to the designated storage method, without performing user interface-based operations such as operation 1415 and operation 1417.

In operation 1417, the processor 120 may receive a user input, based on a user interface. According to yet another embodiment, based on a user input, the processor 120 may identify an option selected by the user, among various options (or storage methods) provided through the user interface. According to yet another embodiment, FIG. 14 illustrates an example in which an option to generate a correction image is selected by a user, based on a hidden area.

In operation 1419, the processor 120 may perform post-processing corresponding to a user input, based on the raw image. According to yet another embodiment, the processor 120 may perform a post-processing correction in which a designated effect is applied to the raw image, based on the hidden area. According to yet another embodiment, the processor 120 may process a designated effect (e.g., blackout, blur, and/or mono) on the hidden area, in the raw image. According to yet another embodiment, the processor 120 may process an effect according to the size of the hidden area, which is changed to correspond to a state change of the display module 160. According to yet another embodiment, based on a timestamp processed during image capturing, the processor 120 may classify hidden areas for each state of the display module 160, and may process an effect, based on the classified hidden areas.

In operation 1421, the processor 120 may obtain a raw image and/or at least one correction image corrected by post-processing, based on the raw image. According to yet another embodiment, the correction image may include an image portion corresponding to the output resolution, and an image portion (e.g., an image corresponding to the preview screen) in which an effect has been processed on the hidden area according to a state change of the display module 160.

In operation 1423, the processor 120 may store a raw image based on the output resolution and/or at least one correction image based on the hidden area. According to yet another embodiment, as an image actually obtained at the time of image capturing (or storage), the processor 120 may generate a raw image captured according to the output resolution, and a correction image in which the raw image is processed using post-processing (e.g., designated effect processing) according to the hidden area, and may save the raw image and/or the correction image. According to yet another embodiment, the processor 120 may simultaneously capture (e.g., record) the raw image and the correction image excluding the hidden area at the time of image capturing, and may also separately save the raw image and the correction image at the time of ending (saving).

FIG. 15 is a view illustrating an example of processing an effect on a raw image, in an electronic device according to an embodiment of the disclosure.

According to an embodiment, the electronic device 101 may provide a raw image and/or a correction image in which the raw image is corrected through post-processing, based on photographing according to a state change of the display module 160. According to another embodiment, the correction image may indicate an image in which a designated effect (e.g., blackout, blur, and/or mono) has been processed on the hidden area.

According to yet another embodiment, example <1501> may represent an example of a raw image 1500. According to yet another embodiment, example <1503>, example <1505>, and/or example <1507> may represent examples in which correction images 1500A, 1500B, and 1500C are corrected through post-processing, based on the raw image 1500. According to yet another embodiment, the correction images may include an image (e.g., an image corresponding to a preview screen) in which an effect (e.g., blackout, blur, and/or mono) is processed on a hidden area 1530 according to a state change of the display module 160.

According to yet another embodiment, example <1503> may represent an example in which a correction image 1500A is corrected through post-processing of applying a blackout effect to the hidden area 1530 by using the raw image 1500. According to yet another embodiment, example <1505> may represent an example in which a correction image 1500B is corrected through post-processing of applying a blur effect to the hidden area 1530 by using the raw image 1500. According to yet another embodiment, example <1507> may represent an example in which a correction image 1500C is corrected through post-processing of applying a mono effect to the hidden area 1530 by using the raw image 1500.

Figure 16:
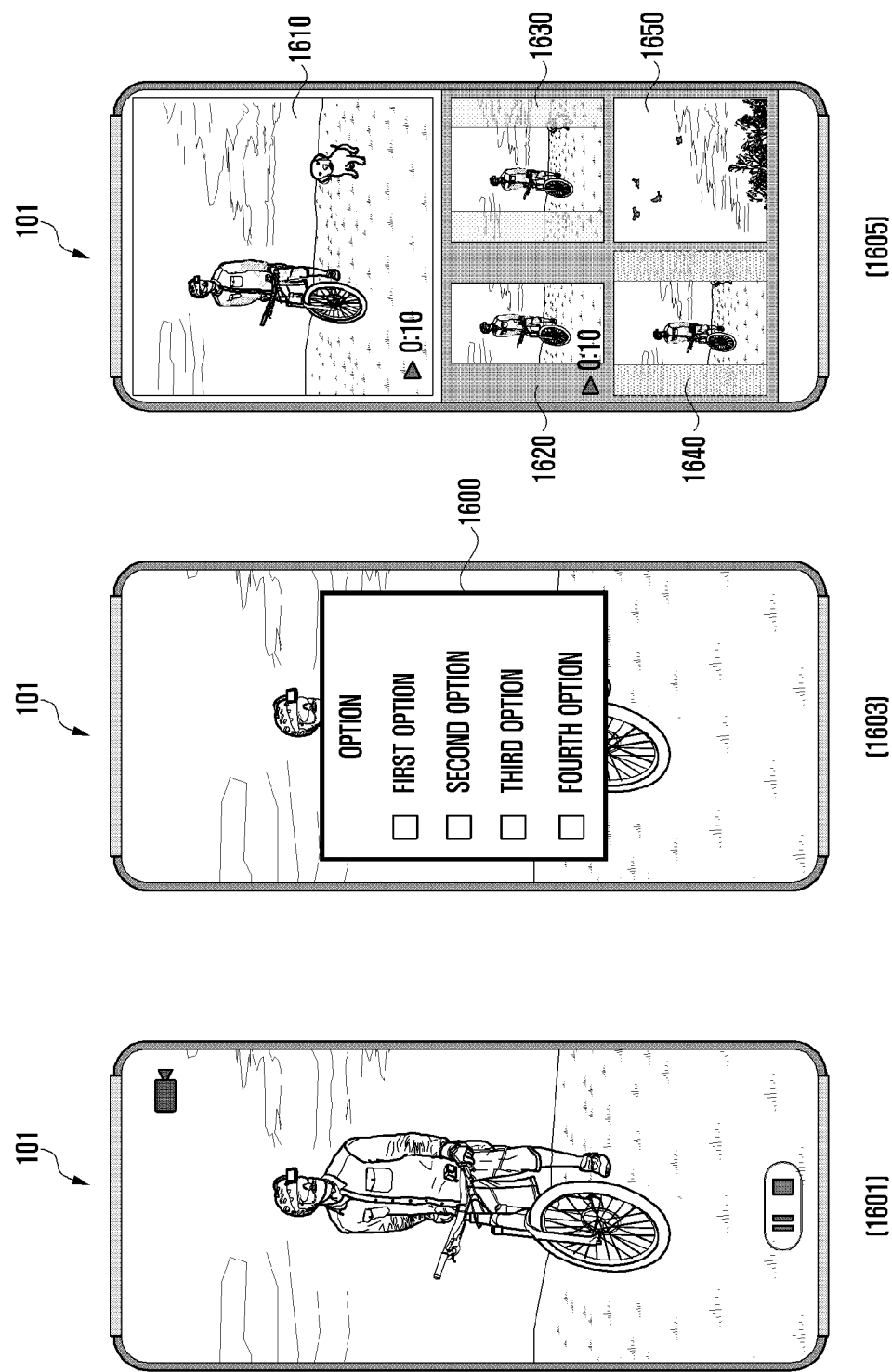
FIG. 16 is a view illustrating an example of saving a captured image in an electronic device according to an embodiment of the disclosure.

FIG. 16 is a view illustrating an example of saving a captured image in an electronic device according to an embodiment of the disclosure.

Referring to FIG. 16, example <1601> may represent an example in which an image is captured. According to an embodiment, example <1601> may represent an example in which the electronic device 101 starts image capturing in an open state of the display module 160, the state of the display module 160 is changed from the open state to a closed state during image capturing, and image capturing is ended in the closed state.

According to another embodiment, example <1603> may represent an example of providing a user interface 1600 associated with option setting, based on the end of image capturing. According to yet another embodiment, the user interface 1600 may be provided so that a user selects (e.g., touches) various options associated with a storage method. According to yet another embodiment, the user interface 1600 may be provided through a pop-up window (or overlay) on a screen (e.g., a preview) at the time point when image capturing is finished.

According to yet another embodiment, options associated with a storage method may include a first option (e.g., save a raw image only), a second option (e.g., save a raw image and a correction image), and a third option (e.g., save a correction image only). According to yet another embodiment, options associated with a storage method may include an option capable of setting the application of an effect (e.g., a first effect, a second effect, and/or a third effect) associated with the correction image. For example, when a correction image is saved, an option capable of designating at least one effect to be applied to the correction image is included therein. For example, a user may select at least one of a first effect (e.g., blackout), a second effect (e.g., blur), or a third effect (e.g., mono) when selecting simultaneous saving of a correction image (e.g., the second option) or saving only a correction image (e.g., the third option).

According to yet another embodiment, example <1605> may represent examples of images 1610, 1620, 1630, 1640, and 1650 stored based on a user selection in example <1603>. According to yet another embodiment, the electronic device 101 may store a raw image 1610, a first correction image 1620, a second correction image 1630, a third correction image 1640, and/or a fourth correction image 1650 together, and may store one or more correction images 1620, 1630, 1640, and 1650 in parallel to or independently of the raw image 1610.

According to yet another embodiment, the first correction image 1620, the second correction image 1630, the third correction image 1640, and/or the fourth correction image 1650 may be images in which different effects are applied to hidden areas, respectively.

According to some embodiments, at the end of image capturing (or at the time of image saving), the electronic device 101 may separately generate and provide images classified (divided) according to a state of the display module 160 and/or images classified according to focus. For example, the electronic device 101 extracts each of an image of a portion corresponding to an open state, an image of a portion corresponding to an intermediate state, and an image of a portion corresponding to a closed state, and then may generate and provide same as a single independent image.

Figure 17:
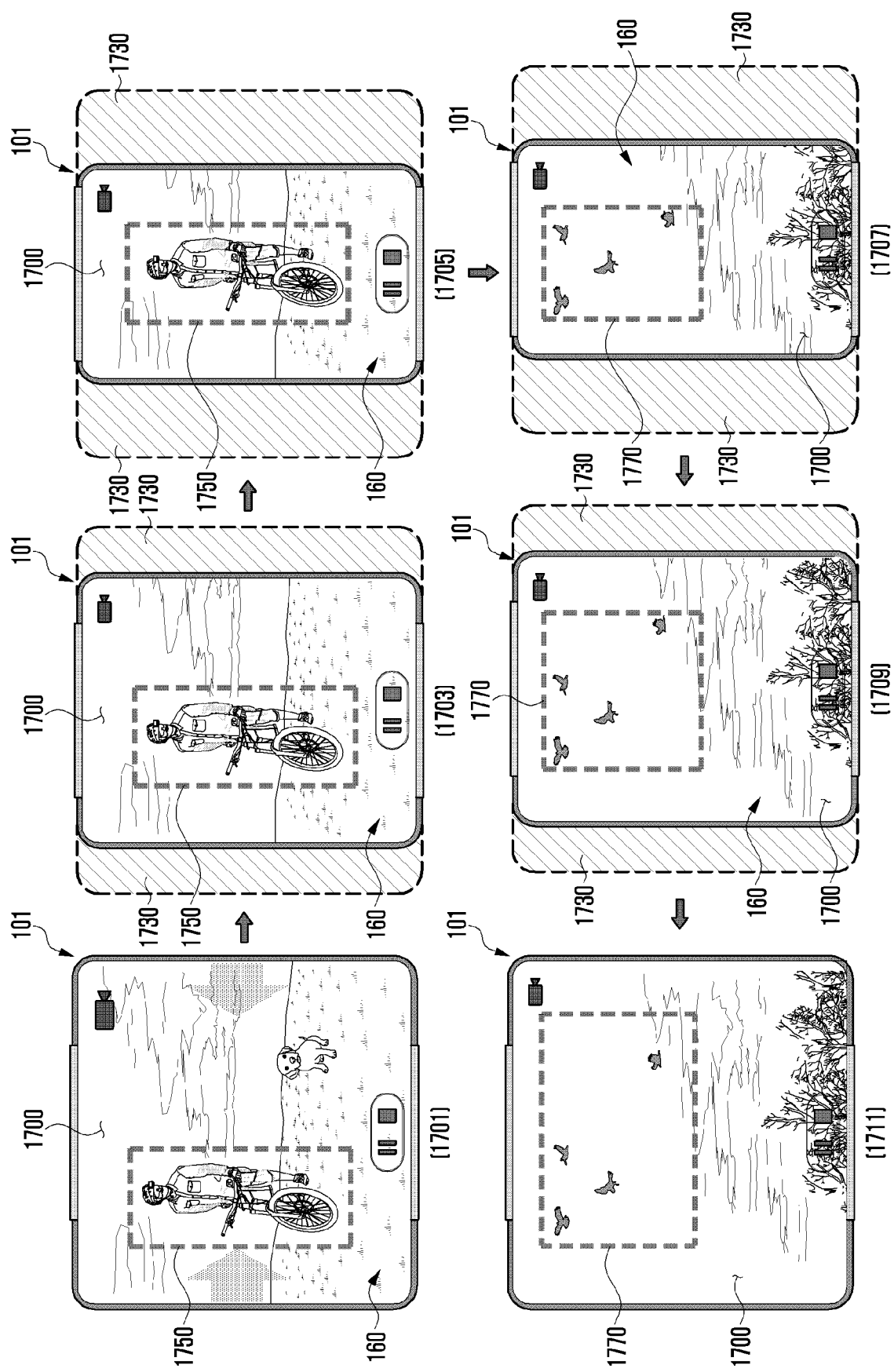
FIG. 17 is a view illustrating a photographing example according to a state change of a display and a focus change in an electronic device according to an embodiment of the disclosure.

FIG. 17 is a view illustrating a photographing example according to a state change of a display and a focus change in an electronic device according to an embodiment of the disclosure.

According to an embodiment, FIG. 17 may illustrate an example of an operation scenario in which a state of the display module 160 is changed and focus is automatically set based on focus tracking, while image capturing is performed in the electronic device 101.

Referring to FIG. 17, as illustrated in example <1701>, the electronic device 101 may capture an image in an open state, and may set first focus 1750 to a specific subject of an image (e.g., an image displayed on the preview screen 1700) to be captured.

According to an embodiment, in the open state in example <1701>, based on a user input, the electronic device 101 may be configured such that a display area of the display module 160 is gradually reduced in a designated direction and thus is switched to the closed state as example <1703> and example <1705>. According to another embodiment, in the closed state in example <1707>, based on a user input, the electronic device 101 may be configured such that a display area of the display module 160 is gradually expanded in a designated direction and thus is switched to the open state as example <1709> and example <1711>.

According to yet another embodiment, the electronic device 101 may reduce (e.g., the contraction in example <1703> and example <1705>) or expand (e.g., the extension in example <1709> and example <1711>) a preview screen 1700 according to a state change of the display module 160. According to yet another embodiment, in case that a state of the display module 160 is changed, the electronic device 101 may maintain an output resolution (e.g., a resolution corresponding to an area of the entire preview screen 1700 in an open state) in actual photographing as it is, and may set the remaining areas (e.g., an invisible area) excluding an area of the preview screen 1700, among the entire area corresponding to the output resolution, as the hidden area 1730. According to yet another embodiment, the hidden area 1730 may be generated based on a preview resolution (e.g., a preview ratio) and an output resolution in actual photographing. According to yet another embodiment, the hidden area 1730 may include the remaining areas (or an area which is not visible as a preview) which are variable according to the variance of the display module 160, in addition to an area corresponding to the preview screen, in the entire area corresponding to the output resolution.

According to yet another embodiment, as illustrated in example <1703> and example <1705>, the electronic device 101 may maintain the focus 1750 set on the preview screen 1700 displayed according to a state change (e.g., a preview ratio change) of the display module 160. According to yet another embodiment, during a state change of the display module 160, the electronic device 101 may set the designated focus 1750 to a subject so as to capture an image.

According to yet another embodiment, as illustrated in example <1707>, the electronic device 101 may continue image capturing in a closed state, and in case that an image (an image displayed on the preview screen 1700) to be captured is changed (the change of a subject), may set second focus 1770 to the changed subject. For example, a user changes the direction of the electronic device 101 so as to change a subject to be captured. According to yet another embodiment, while image capturing is performed, the electronic device 101 may perform focus tracking, and may set focus to the changed subject so as to capture an image, based on the change of a subject.

According to yet another embodiment, as illustrated in example <1709> and example <1707>, the electronic device 101 may maintain the focus 1770 set on the preview screen 1700 displayed according to a state change (e.g., a preview ratio change) of the display module 160. According to yet another embodiment, during a state change of the display module 160, the electronic device 101 may set the designated focus 1770 to a subject so as to capture an image.

According to yet another embodiment, for example, in case that the focused subject is changed during image capturing, and in case that the initially focused subject is not within the preview screen 1700, the electronic device 101 recognizes a new subject, based on a designated topic, and may automatically set focus to the new subject. For example, the electronic device 101 recognizes a subject, based on various topics such as at least one of person, motion, sound, or user designation.

An operation method performed by the electronic device 101 according to yet another embodiment of the disclosure may include capturing an image, based on a designated output resolution in a first state of a display module (e.g., the display module 160 in FIG. 1), displaying a preview screen, based on a first preview resolution according to the first state of the display module 160, detecting a state change in which the display module 160 is switched from the first state to a second state, displaying a preview screen, based on a second preview resolution according to the second state of the display module 160, identifying a hidden area, based on a variance of the display module 160, and obtaining a first image based on the output resolution and a second image based on the hidden area, based on the state change of the display module 160 while image capturing is performed.

According to yet another embodiment, the capturing an image may include capturing an image, based on the designated output resolution while image capturing is performed. According to various embodiments of the disclosure, the output resolution may include a resolution corresponding to the entire preview screen corresponding to an open state of the display module 160, or an initial image resolution configured in response to the first state at the time point of photographing.

According to yet another embodiment, the capturing an image may include controlling the display module 160 so as to display a preview screen associated with an image obtained through a camera module (e.g., the camera module 180 in FIG. 1), based on a first preview resolution according to the first state in case that image capturing is executed. According to various embodiments of the disclosure, the capturing an image may include, based on the state change while image capturing is performed, controlling the display module 160 so as to display a preview screen associated with an image obtained through the camera module 180, based on a second preview resolution according to the second state.

According to yet another embodiment, the state change may include a change in which a display ratio of a display area of the display module is changed, based on the switching of the display module from an open state to a closed state or from a closed state to an open state while the image capturing is performed.

According to yet another embodiment, the identifying a hidden area may include generating the hidden area, based on a contraction amount of the display module 160 in case that the display module 160 is in a state change of the switching from an open state to a closed state. According to various embodiments of the disclosure, the identifying a hidden area may include generating the hidden area, based on an expansion amount of the display module 160 in case that the display 160 module is in a state change of the switching from a closed state to an open state.

According to yet another embodiment, the identifying a hidden area may include processing to hide the remaining areas other than a preview area within the output resolution area in case that the display module 160 is in a state change of the switching from an open state to a closed state. According to various embodiments of the disclosure, the identifying a hidden area may include expanding a preview area within the output resolution area and processing to hide the expanded preview area, in case that the display module 160 is in a state change of the switching from a closed state to an open state.

According to yet another embodiment, the identifying a hidden area may include maintaining the output resolution, based on the state change, and generating a hidden area corresponding to the state change of the display module. According to various embodiments of the disclosure, the hidden area may include an area which is variable according to the variance of the display module 160 and is not visible as a preview, in addition to an area corresponding to the preview screen, and may be an object area in which at least one of a designated effect of blackout, blur, or mono is processed.

According to yet another embodiment, the obtaining may include obtaining a first image captured according to the output resolution while image capturing is performed, and obtaining a second image, based on a post-processing correction of an area corresponding to the hidden area in the first image.

According to yet another embodiment, the first image may include an image captured based on the output resolution. According to various embodiments of the disclosure, the second image may include an image portion captured based on the output resolution, and an image portion in which a designated effect has been processed on the hidden area according to the state change of the display module.

According to an embodiment, the obtaining may include, while the image capturing is performed, simultaneously capturing a first image captured according to the output resolution and a second image excluding the hidden area, and separately saving the first image and second image at the end of image capturing.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera;
   a display;
   memory storing instructions; and
   at least one processor, wherein the instructions, when executed by the at least one processor, cause the electronic device to:
   in response to a user input for executing video capturing, capture a video,
   display a screen of the captured video obtained through the camera, based on a first resolution of the display,
   detect a change of a resolution of the display, while performing the video capturing,
   display a screen of the captured video obtained through the camera, based on a second resolution of the display according to the detected change of the resolution of the display,
   identify a hidden area of the captured video, the hidden area being a portion of the captured video which is not displayed in the screen of the captured video based on the first resolution of the display, and
   generate an adjusted video by processing the captured video using information of the identified hidden area, and
   store the captured video and the adjusted video.

2. The electronic device of claim 1,
   wherein the instructions, when executed by the at least one processor, further cause the electronic device to control the camera so as to capture the video, based on an output resolution while the video capturing is performed, and
   wherein the output resolution comprises a resolution corresponding to one of an entire screen corresponding to an open state of the display, or an initial resolution configured in response to a first state at a time point of photographing.

3. The electronic device of claim 1, wherein the instructions, when executed by the at least one processor, further cause the electronic device to:
   control the display so as to display the screen, based on the first resolution according to a first state of the display, and
   based on the change of the resolution of the display while the video capturing is performed, control the display so as to display a screen, based on the second resolution according to a second state of the display.

4. The electronic device of claim 1, wherein the change of the resolution of the display comprises a change in which a display ratio of a display area of the display is changed, based on a switching of the display from an open state to a closed state or from a closed state to an open state while the video capturing is performed.

5. The electronic device of claim 4, wherein the instructions, when executed by the at least one processor, further cause the electronic device to:
   process to hide the remaining areas other than an area within an output resolution area in case that the display is in a state change of the switching from an open state to a closed state, and
   expand an area within the output resolution area and process to hide the expanded area, in case that the display is in a state change of the switching from a closed state to an open state.

6. The electronic device of claim 1, wherein the instructions, when executed by the at least one processor, further cause the electronic device to:
   identify the hidden area, based on a contraction amount of the display in case that the display is in a state change of a switching from an open state to a closed state, and
   identify the hidden area, based on an expansion amount of the display in case that the display is in a state change of a switching from a closed state to an open state.

7. The electronic device of claim 1,
   wherein the instructions, when executed by the at least one processor, further cause the electronic device to:
   maintain an output resolution of the display, based on the change of the resolution of the display, and
   generate the hidden area corresponding to the change of the resolution of the display,
   wherein the hidden area is an object area in which at least one designated effect of blackout, blur, or mono is processed.

8. The electronic device of claim 1, wherein the adjusted video comprises:
   a video portion captured based on an output resolution of the display, and a video portion in which a designated effect has been processed on the hidden area according to the change of the display.

9. The electronic device of claim 1, wherein the instructions, when executed by the at least one processor, further cause the electronic device to:
    simultaneously capture the video captured according to an output resolution of the display, and generate the adjusted video excluding the hidden area while performing the video capturing, and
    separately store the captured video and the adjusted video at an end of the video capturing.

10. A method for operating an electronic device, the method comprising:
    in response to a user input for executing video capturing, capturing a video;
    displaying a screen of the captured video obtained through a camera, based on a first resolution of the display;
    detecting a change of a resolution of the display, while performing the video capturing;
    displaying a screen of the captured video obtained through the camera, based on a second resolution of the display according to the detected change of the resolution of the display;
    identifying a hidden area of the captured video, the hidden area being a portion of the captured video which is not displayed in the screen of the captured video based on the first resolution of the display;
    generate an adjusted video by processing the captured video using information of the identified hidden area; and
    storing the captured video and the adjusted video.

11. The method of claim 10,
    wherein the capturing of the video comprises capturing the video, based on an output resolution while the video capturing is performed, and
    wherein the output resolution comprises one of:
        a resolution corresponding to an entire screen corresponding to an open state of the display, or
        an initial resolution configured in response to a first state at a time point of photographing.

12. The method of claim 10, wherein the capturing of the video comprises:
    controlling the display so as to display the screen, based on the first resolution according to a first state of the display; and
    based on the change of the resolution of the display while the video capturing is performed, controlling the display so as to display a screen, based on the second resolution according to a second state of the display.

13. The method of claim 10, wherein the change comprises a change of the resolution of the display in which a display ratio of a display area of the display is changed, based on a switching of the display from an open state to a closed state or from a closed state to an open state while the video capturing is performed.

14. The method of claim 10, wherein the identifying of the hidden area comprises:
    identifying the hidden area, based on a contraction amount of the display in case that the display is in a change of a switching from an open state to a closed state; and
    identifying the hidden area, based on an expansion amount of the display in case that the display is in a change of a switching from a closed state to an open state.

15. The method of claim 14, wherein the identifying of the hidden area comprises:
    processing to hide the remaining areas other than an area within an output resolution area in case that the display is in a state change of the switching from an open state to a closed state; and
    expanding an area within the output resolution area and processing to hide the expanded area, in case that the display is in a state change of the switching from a closed state to an open state.

16. The method of claim 10,
    wherein the identifying of the hidden area comprises:
        maintaining an output resolution of the display, based on the change of the resolution of the display, and
        generating the hidden area corresponding to the change of the resolution of the display, and
    wherein the hidden area is an object area in which at least one of designated effect of blackout, blur, or mono is processed.

17. The method of claim 10,
    wherein the adjusted video comprises;
        a video portion captured based on an output resolution of the display, and
        a video portion in which a designated effect has been processed on the hidden area according to the change of the display.

18. The method of claim 10, wherein the obtaining comprises:
    simultaneously capturing the video captured according to an output resolution of the display, and generating the adjusted video excluding the hidden area while performing the video capturing, and
    separately storing the captured video and the adjusted video at an end of the video capturing.

* * * * *